US008711488B2

(12) United States Patent
Kubota

(10) Patent No.: US 8,711,488 B2
(45) Date of Patent: Apr. 29, 2014

(54) ZOOM LENS

(75) Inventor: Yoji Kubota, Nagano (JP)

(73) Assignees: Optical Logic Inc., Nagano (JP); Kantatsu Co., Ltd., Tochigi (JP)

( * ) Notice: Subject to any disclaimer, the term of this patent is extended or adjusted under 35 U.S.C. 154(b) by 0 days.

(21) Appl. No.: 13/547,555

(22) Filed: Jul. 12, 2012

(65) Prior Publication Data

US 2013/0021677 A1 Jan. 24, 2013

Related U.S. Application Data

(60) Provisional application No. 61/509,325, filed on Jul. 19, 2011.

(51) Int. Cl.
*G02B 15/14* (2006.01)

(52) U.S. Cl.
USPC ............................ 359/678; 359/682; 359/686

(58) Field of Classification Search
CPC ................................ G02B 15/14; G02B 15/16
USPC ......................... 359/676, 678, 682, 686, 687; 396/72–88; 348/240.99–240.3, 348/335–369
See application file for complete search history.

(56) References Cited

U.S. PATENT DOCUMENTS

| | | | | |
|---|---|---|---|---|
| 7,529,035 | B2 * | 5/2009 | Yamamoto | 359/686 |
| 2003/0214726 | A1 * | 11/2003 | Mihara | 359/676 |
| 2010/0315545 | A1 * | 12/2010 | Tamura | 348/349 |

FOREIGN PATENT DOCUMENTS

| | | | |
|---|---|---|---|
| JP | 2001-343588 | | 12/2001 |
| JP | 2004-348082 | A | 12/2004 |
| JP | 2006-251037 | A | 9/2006 |
| JP | 2007-052273 | A | 3/2007 |
| JP | 2008-033208 | A | 2/2008 |
| JP | 2009-025800 | A | 2/2009 |
| JP | 2012-511735 | A | 5/2012 |

* cited by examiner

*Primary Examiner* — Darryl J Collins
(74) *Attorney, Agent, or Firm* — Kubotera & Associate, LLC

(57) ABSTRACT

A zoom lens includes a first lens group that has a lens having negative refractive power and a light path changing member; a second lens group that includes a lens having positive refractive power and a lens having negative refractive power, and has negative refractive power as a whole; a third lens group that includes a stop, a front group lens having positive refractive power, and a rear group lens having negative refractive power, and has positive refractive power as a whole; and a fourth lens group having positive or negative refractive power. Upon changing magnification from a wide-angle end to a telephoto end, the first lens group and the fourth lens group are fixed. The second lens group moves to the object side after the second lens group moves to an image side, and the third lens group linearly moves to the object side.

8 Claims, 55 Drawing Sheets

Numerical Data Example 1

Numerical Data Example 6

(Wide-angle end)

(Mid point)

(Telephoto end)

ZOOM LENS

CROSS-REFERENCE TO RELATED APPLICATIONS

The application claims the benefit under 35 U.S.C. 119(e) of the provisional application No. 61/509,325, filed on Jul. 19, 2011.

BACKGROUND OF THE INVENTION AND RELATED ART STATEMENT

The present invention relates to a zoom lens for forming an image on an imaging element such as a CCD sensor and a CMOS sensor.

In recent days, a zoom lens has been more frequently mounted on a small device such as a cellular phone, a portable information terminal, and an internet camera as well as a digital still camera for another additional value. In the zoom lens, a part of lenses or lens groups that compose a lens system moves along an optical axis thereof. Accordingly, it is possible to continuously change imaging magnification and successively increase and/or decrease an image of an object to various sizes.

In case of mounting the zoom lens onto a small-sized device, the whole length of the zoom lens is preferably as short as possible. However, since a zoom lens needs to have a configuration so as to move at least two of lens groups that compose the zoom lens upon changing magnification and focusing, it is necessary to secure a space within the zoom lens to move the lens groups therein. For this reason, it is difficult to attain miniaturization of the zoom lens.

Also in recent days, the number of pixels in an imaging element for capturing an image of an object as electrical signals has increased each year, and therefore the zoom lens has also been required to exhibit high performances such as satisfactory aberration correction performance and compatibility to high resolution.

Patent Reference describes a conventional zoom lens. The conventional zoom lens includes a first lens group that is composed of a lens having negative refractive power; a second lens group that is composed of two lenses, i.e., a positive and a negative lenses, so as to have negative refractive power as a whole; a third lens group having positive refractive power; and a fourth lens group having positive refractive power.

According to the zoom lens disclosed in Patent Reference, a composite focal length of the first lens group and the second lens group at a wide-angle end is limited within a certain range. Accordingly, it is possible to attain relatively satisfactory miniaturization in spite of a high magnification range, which is as high as three times.

Patent Reference Japanese Patent Publication No. 2001-343588

The zoom lens described in Patent Reference does not fully satisfy the demands for high performances and miniaturization, although it is possible to relatively satisfactorily correct aberrations with a small number of lenses.

Here, such demands for high performances and miniaturization are not demanded only in small-sized devices such as cellular phones. Even in devices such as digital still cameras for general users, there is the demand for changing a magnification of an image, especially changing an optical magnification with less image deterioration, whereas there is also a demand for a smaller thickness to enhance portability.

In view of the above-described problems, an object of the invention is to provide a small-sized zoom lens with high performances that can provide satisfactory high image quality.

SUMMARY OF THE INVENTION

In order to attain the object described above, according to the present invention, a zoom lens includes a first lens group that has a lens having negative refractive power and a light path changing member that changes a traveling direction of an incident light beam; a second lens group that includes two lenses, i.e. a lens having positive refractive power and a lens having negative refractive power, and has negative refractive power as a whole; a third lens group that includes a stop, a front group lens having positive refractive power, and a rear group lens having negative refractive power, arranged in the order, and has positive refractive power as a whole; and a fourth lens group having positive or negative refractive power, arranged in the order from an object side.

In addition, the zoom lens of the invention is configured so that, upon changing magnification from a wide-angle end to a telephoto end, the first lens group and the fourth lens group are fixed and at the same time, the second lens group moves to the object side after the second lens group moves to an image side, and the third lens group linearly moves to the object side.

According to the configuration, the lens groups that move upon changing magnification and focusing are only two lens groups, i.e. the second lens group and the third lens group. Furthermore, among them, the second lens group is composed of two lenses, a positive lens and a negative lens. Therefore, a chromatic aberration of magnification and distortion incurred in the first lens group are satisfactorily corrected with the two lenses of the second lens group. Accordingly, with such configuration, the zoom lens can have both high performances and small size.

For the light path changing member in the first lens group, for example, it is possible to use a lens having positive or negative refractive power, a prism that reflects an incident light beam to bend a light path, or the like.

According to the above-described configuration, in view of attaining small size and light weight of the zoom lens, it is preferred to compose the front group lens and the rear group lens in the third lens group respectively from one lens.

In addition, it is also possible to attain small size and light weight of the zoom lens even by composing the fourth lens group from one lens.

With the above-described configuration, according to the invention, the zoom lens is configured to satisfy the following conditional expression (1) when the first lens group has a focal length f1 and the third lens group has a focal length f3:

$$-0.5<f3/f1<-0.1 \quad (1)$$

The conditional expression (1) defines a moving mode of the second lens group. When the zoom lens satisfies the conditional expression (1), upon changing magnification, a position of the second lens group on an optical axis at the wide-angle end substantially agrees with that on the optical axis at the telephoto end. In other words, when the zoom lens satisfies the conditional expression (1), the spacing between the first lens group and the second lens group is substantially the same at the wide-angle end and the telephoto end.

Generally, even if satisfactory aberration is obtained when a distance from the zoom lens to an object (hereinafter referred to as "object distance") is infinite, once the object distance changes, e.g., if it is point-blank range, aberration is deteriorated. When the conditional expression (1) is satisfied, the difference (a moving distance of a lens for focusing) between a position of the second lens group on the optical axis when the object distance is infinite and a position of the second lens group on the optical axis when the object distance is point-blank range is substantially the same at the wide-angle end and at the telephoto end. For this reason, according to the zoom lens of the invention, it is possible to satisfactorily restrain deterioration of aberration over the whole magnification change range from the point-blank range to infinity (∞).

In the above conditional expression (1), when the value is below the lower limit "−0.5", the second lens group significantly moves to the object side at the telephoto end, so that it is difficult to attain miniaturization of the zoom lens. On the other hand, when the value exceeds the upper limit "−0.1", the second lens group significantly moves to the image plane side at the telephoto end, so that it is difficult to attain miniaturization of the zoom lens. Furthermore, in this case, since the third lens group has strong refractive power in relative to that of the first lens group, it is also difficult to restrain a spherical aberration and an off-axis coma aberration in a balanced manner over the whole magnification change range.

Moreover, according to the invention, when the second lens group has a focal length f2 and the lens having positive refractive power in the second lens group has a focal length f2*p*, the zoom lens is configured to satisfy the following conditional expression (2):

$$-1.0<f2/f2p<-0.1 \quad (2)$$

Here, when the zoom lens satisfies the conditional expression (2), it is possible to satisfactorily correct aberrations occurred in the second lens group over the whole magnification change range. When the value is below the lower limit "−1.0", since the lens having positive refractive power in the second lens group has strong refractive power, the chromatic aberration of magnification at the wide-angle end at a short wavelength is in a positive direction in relative to that at a reference wavelength, and the aberration correction is excessive. On the other hand, since the axial chromatic aberration at a short wavelength is in a negative direction, the aberration correction is insufficient. Furthermore, the image surface at the wide-angle end curves to the object side (in a negative direction). Therefore, it is difficult to obtain satisfactory image-forming performance.

On the other hand, when the value exceeds the upper limit "−0.1", since the lens having positive refractive power in the second lens group has weak refractive power, the chromatic aberration of magnification at the wide-angle end at a short wavelength is in a negative direction in relative to that at a reference wavelength, the correction is insufficient. On the other hand, the axial chromatic aberration is in a positive direction at a short wavelength in relative to that at a reference wavelength, and the correction is excessive. Furthermore, the distortion also increases in the negative direction. Therefore, also in this case, it is difficult to obtain satisfactory image-forming performance.

In the above-described configuration, according to the invention, when the third lens group has a focal length f3, a composite focal length of the first to the fourth lens groups at the wide-angle end is fw, the zoom lens is configured to satisfy the following conditional expression (3):

$$1.0<f3/fw<2.0 \quad (3)$$

The conditional expression (3) defines the size of the whole zoom lens and refractive power of each lens group.

In the conditional expression (3), when the value is below the lower limit "1.0", the third lens group that moves upon changing magnification has strong refractive power, so that it is advantageous for miniaturization of the zoom lens, but it is difficult to stably keep balance among the spherical aberration, coma aberration, and field curvature over the whole magnification change range. In addition, since the lenses that compose each lens group has (have) small curvature radius, the fabrication performance of the lens is poor, which results in cost increase of the zoom lens. On the other hand, when the value exceeds the upper limit "2.0", the third lens group has weak refractive power, which is advantageous for correction of each aberration, but it is difficult to attain miniaturization and light weight of the zoom lens.

In addition, according to the invention, in the third lens group, when the front group lens having positive refractive power has a focal length f3*p* and the rear group lens having negative refractive power has a focal length f3*n*, the zoom lens is configured to satisfy the following conditional expression (4):

$$|f3p/f3n|<0.7 \quad (4)$$

When the zoom lens satisfies the conditional expression (4), it is possible to attain further miniaturization of the zoom lens and to satisfactorily correct aberrations occurred in the third lens group.

When the zoom lens satisfies the conditional expression (4), it is possible to constrain residual aberrations of the third lens group within certain ranges and obtain satisfactory image-forming performance. In addition, since a position of a principal point of the third lens group moves to the object side, it is also possible to attain further miniaturization of the zoom lens.

When the value is outside the range of the conditional expression (4), the negative refractive power of the rear group lens in the third lens group is strong and the composite focal length of the third lens group is long, so that it is difficult to attain miniaturization of the zoom lens. In addition, since aberrations such as the spherical aberration, field curvature, astigmatism, and axial chromatic aberration, which are occurred in the third lens group, are excessively corrected, it is difficult to satisfactorily correct aberrations over the whole magnification change range.

According to the zoom lens of the invention, it is possible to provide a small-sized zoom lens with satisfactorily high image quality and high performances.

DETAILED DESCRIPTION OF PREFERRED EMBODIMENTS

Hereunder, referring to the accompanying drawings, embodiments of the present invention will be fully described.

FIGS. 1, 6, 11, 16, 21, and 26 are sectional views of zoom lenses in Numerical Data Examples 1 to 6 according to a first to third embodiments, respectively. The respective figures show a lens sectional view at a wide-angle end, a lens sectional view at a midpoint between the wide-angle end and a telephoto end, and a lens sectional view at the telephoto end, respectively.

Any of zoom lenses in each embodiment has a four-lens group configuration, and includes a first lens group that includes a lens having negative refractive power and a light path changing member to change a traveling direction of an incident light beam; a second lens group that includes two lenses, i.e., a lens having positive refractive power and a lens having negative refractive power and has negative refractive power as a whole; a third lens group that includes a stop, a front group lens having positive refractive power, and a rear group lens having negative refractive power, arranged in the order, and has positive refractive power as a whole; and a fourth lens group having positive or negative refractive power, arranged in the order from the object side.

In any of zoom lenses of the embodiments, the first lens group and the fourth lens group are fixed and the second lens group and the third lens group move along an optical axis upon changing magnification. More specifically, upon changing magnification from the wide-angle end to the telephoto end, the second lens group first moves to the image plane side and then to the object side, and the third lens group linearly moves to the object side.

Hereunder, the zoom lens of each embodiment will be described in details.

(First Embodiment)

Figure 1:
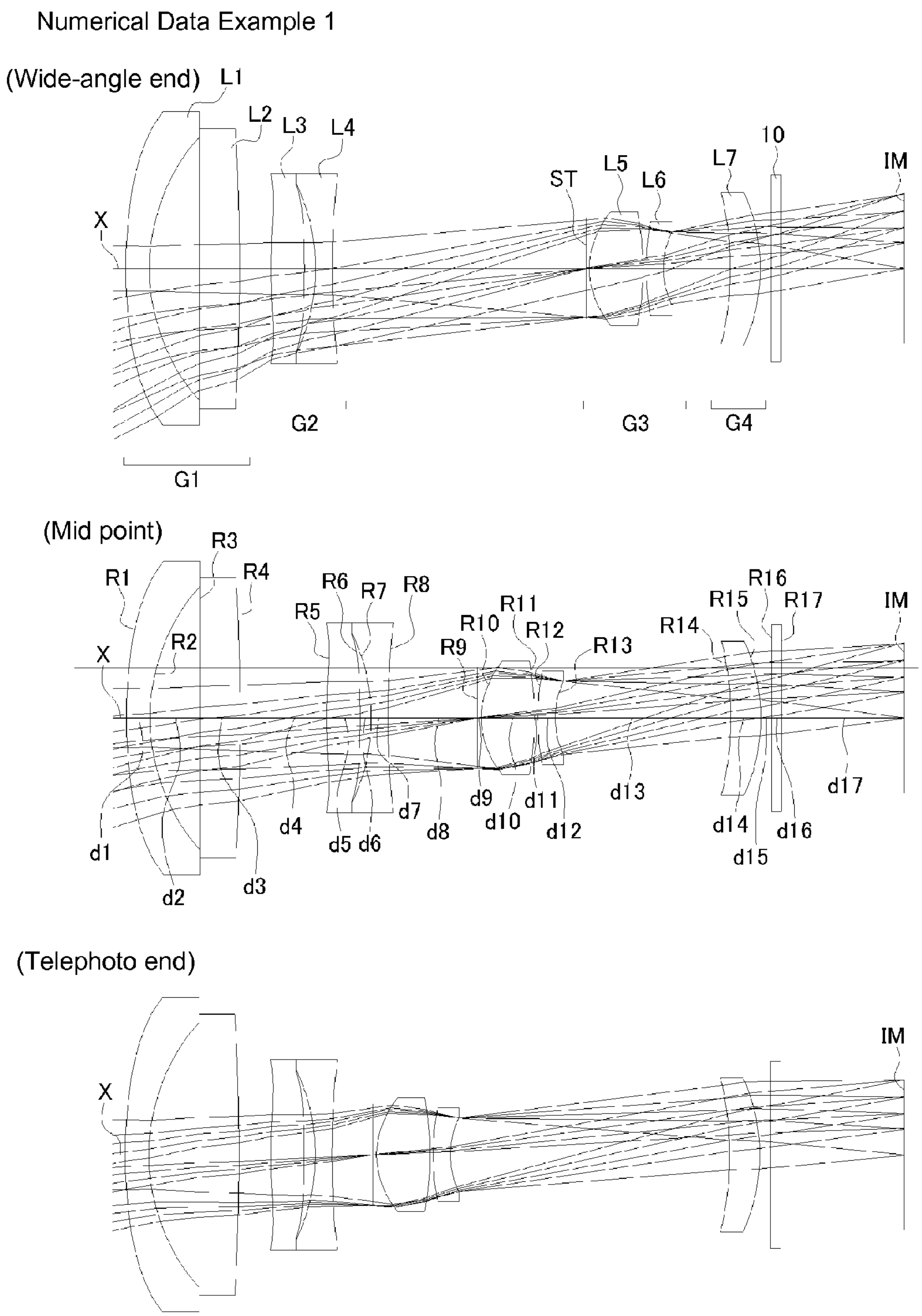
FIG. 1 shows sectional views of a zoom lens at a wide-angle end, a midpoint, and a telephoto end in Numerical Data Example 1 according to an embodiment of the invention.

As shown in FIG. 1, the zoom lens of a first embodiment includes a first lens group G1 having negative refractive power; a second lens group G2 having negative refractive power; a third lens group G3 having positive refractive power; and a fourth lens group G4 having positive refractive power, arranged in the order from the object side. There is provided a cover glass 10 between the fourth lens group G4 and an image plane of an imaging element. The cover glass 10 may be optionally omitted (which will be also the same in a second and a third embodiments.)

In addition, in the zoom lens of the embodiment, the first lens group G1 and the fourth lens group G4 are fixed and the second lens group G2 and the third lens group G3 can move along the optical axis. Upon changing magnification from the wide-angle end to the telephoto end, the second lens group G2 first moves to the image plane side and then to the object side, and the third lens group G3 moves to the object side along the optical axis. More specifically, the second lens group G2 moves along the optical axis so that the moving track thereof is concave to the object side (see FIG. 31), and the third lens group G3 moves along the optical axis so that the track of movement thereof is linear in a direction to get close to the second lens group G2.

As described above, according to the zoom lens of the embodiment, the magnification changes as the third lens group G3 moves, and focusing and back focus adjustment work as the second lens group G2 moves, so that an image point is kept constant over the whole magnification change range.

According to the configuration of the zoom lens, the first lens group G1 is composed of a first lens L1 that is a negative meniscus lens directing a convex surface thereof to the object side and a second lens L2 that is a plano-convex lens directing a convex surface thereof to the image plane side, arranged in the order from the object side. The second lens group G2 is composed of two lenses, i.e. a third lens L3 that is a biconvex lens and a fourth lens L4 that is a biconcave lens. Among them, the third lens L3 is formed in an aspheric shape so that a surface thereof on the object side has a convex shape to the object side near the optical axis and has a concave shape to the object side at the periphery, i.e. an aspheric shape having an inflection point. Here, according to the zoom lens of the embodiment, the second lens L2 serves as the light path changing member.

The third lens group G3 includes a stop ST, a front group lens L5 that is a biconvex lens, and a rear group lens L6 that is a negative meniscus lens directing a convex surface thereof to the object side, arranged in the order from the object side. Furthermore, the fourth lens group G4 includes a seventh lens L7 that is a positive meniscus lens directing a concave surface thereof to the object side.

In the embodiment, each lens has a lens surface that is formed to be an aspheric surface as necessary. When the aspheric surfaces applied to the lens surfaces have an axis Z in the optical axis direction, a height H in a direction perpendicular to the optical axis, a conical coefficient k, and aspheric coefficients $A_4$, $A_6$, $A_8$, $A_{10}$, $A_{12}$, $A_{14}$, and $A_{16}$, a shape of the aspheric surfaces of the lens surfaces may be expressed as follows. Here, even in the second and the third embodiments that will be described later, each lens has a lens surface that is formed to be an aspheric surface as necessary and a shape of the aspheric surfaces of the lens surfaces may be expressed as follows:

[Formula 1]

$$Z = \frac{\frac{H^2}{R}}{1+\sqrt{1-(k+1)\frac{H^2}{R^2}}} + A_4H^4 + A_6H^6 + A_8H^8 + A_{10}H^{10} + A_{12}H^{12} + A_{14}H^{14} + A_{16}H^{16}$$

In addition, when the first lens group G1 has a focal length f1 and the third lens group G3 has a focal length f3, the zoom lens of the embodiment is possible to restrain deterioration of aberrations and to satisfactorily maintain balance of the spherical aberration and coma aberration over the whole magnification change range from point-blank range to infinity, satisfying the following conditional expression (1):

$$-0.5<f3/f1<-0.1 \quad (1)$$

Furthermore, in order to satisfactorily correct aberrations occurred in the second lens group G2 over the whole magnification change range and also obtain satisfactory image-forming performance, when the second lens group G2 has a focal length f2 and the third lens L3 has a focal length f2*p*, the zoom lens of the embodiment is configured to satisfy the following conditional expression (2):

$$-1.0<f2/f2p<-0.1 \quad (2)$$

Moreover, when the third lens group G3 has the focal length f3 and a composite focal length of the first lens group G1 to the fourth lens group G4 at the wide-angle end is fw, it is possible to keep the balance of the spherical aberration, the coma aberration, and the field curvature over the whole magnification change range stable and attain miniaturization of the whole zoom lens, satisfying the following conditional expression (3):

$$1.0<f3/fw<2.0 \quad (3)$$

In addition, according to the zoom lens of the embodiment, in order to attain further miniaturization of the zoom lens and satisfactorily correct aberrations occurred in the third lens group G3, when the front group lens L5 having positive refractive power has a focal length f3*p* and the rear group lens L6 having negative refractive power has a focal length f3*n* in the third lens group G3, the zoom lens is configured to satisfy the following conditional expression (4):

$$|f3p/f3n|<0.7 \quad (4)$$

Here, it is not necessary to satisfy all of the conditional expressions (1) to (4). When any single one of the conditional expressions (1) to (4) is individually satisfied, it is possible to obtain an effect corresponding to the respective conditional expression and configure a small-sized zoom lens that can provide high image quality and high performance in comparison with a conventional zoom lens.

Next, Numerical Data Example 1 of the zoom lens of the embodiment will be described. In Numerical Data Example 1, a back focal length BF is a distance from an image plane-side surface of the seventh lens L7 to a paraxial image plane, which is indicated as a length in air, and a total optical track length L is obtained by adding the back focal length BF to a distance from an object-side surface of the first lens L1 to the surface of the seventh lens L7 on the image plane side, which will be the same in each Numerical Data Example described below.

In addition, i represents a surface number counted from the object side, R represents a curvature radius, d represents a distance between lens surfaces (surface spacing) on the optical axis, Nd represents a refractive index for a d line, and νd represents Abbe's number for the d line, respectively. Here, aspheric surfaces are indicated with surface numbers i affixed with * (asterisk), which will be also the same in each Numerical Data Example described below.

NUMERICAL DATA EXAMPLE 1

Basic lens data are shown below.

Unit: mm

Surface Data

| Surface Number i | R | d | Nd | νd |
|---|---|---|---|---|
| (Object) | ∞ | ∞ | | |
| 1* | 15.237 | 0.7000 | 1.52470 | 56.2 |
| 2* | 5.737 | 1.5000 | | |
| 3 | 0.000 | 1.2000 | 1.84666 | 23.8 |
| 4 | −75.000 | Variable | | |
| 5* | 17.685 | 1.0000 | 1.62090 | 24.0 |
| 6* | −33.575 | 0.3300 | | |
| 7 | −5.948 | 0.5000 | 1.62000 | 62.2 |
| 8 | 25.102 | Variable | | |
| 9 (Stop) | ∞ | 0.1040 | | |
| 10* | 2.426 | 1.6000 | 1.49700 | 81.6 |
| 11* | −8.840 | 0.1000 | | |
| 12* | 7.012 | 0.5200 | 1.58500 | 29.0 |
| 13* | 2.678 | Variable | | |
| 14 | −9.700 | 0.9000 | 1.52470 | 56.2 |
| 15* | −5.501 | 0.3200 | | |
| 16 | ∞ | 0.3000 | 1.51633 | 64.1 |
| 17 | ∞ | 3.6970 | | |
| (Image Plane) | ∞ | | | |

-continued

Other Data
Zoom Ratio: 2.802

| | Wide-Angle End | Midpoint | Telephoto End |
|---|---|---|---|
| Whole System Focal Length f | 3.899 | 7.199 | 10.924 |
| F number | 2.886 | 4.029 | 5.210 |
| Half Angle of View ω (°) | 29.99 | 17.36 | 11.64 |
| Image Height | 2.250 | 2.250 | 2.250 |
| Total Optical Track Length L | 23.22 | 23.22 | 23.22 |
| Back Focal Length BF | 4.215 | 4.215 | 4.215 |
| d4 | 0.950 | 2.603 | 0.960 |
| d8 | 7.600 | 2.687 | 1.229 |
| d13 | 2.000 | 5.260 | 8.361 |

f1 = −23.192
f2 = −14.077
f3 = 5.915
f2p = 18.797
f3p = 4.020
f3n = −7.750
fw = 3.899

Aspheric Surface Data

First Surface $k = 7.326989$, $A_4 = -1.485115E-04$, $A_6 = 1.764811E-05$

Second Surface $k = -1.139682$, $A_4 = 6.962799E-05$, $A_6 = 3.917991E-05$

Fifth Surface $k = -3.736785E+01$, $A_4 = -1.871094E-03$, $A_6 = -1.483507E-04$

Sixth Surface $k = 6.344190E+01$, $A_4 = -3.331952E-03$, $A_6 = -4.118240E-05$

Tenth Surface $k = -7.662455E-01$, $A_4 = 2.361634E-03$, $A_6 = 2.225963E-04$

Eleventh Surface $k = -1.866194$, $A_4 = 3.997106E-04$, $A_6 = 1.382619E-04$

Twelfth Surface $k = -2.711727$, $A_4 = -4.938584E-04$, $A_6 = -2.533721E-04$, $A_8 = -1.007973E-04$, $A_{10} = -4.268523E-05$ Thirteenth Surface $k = 9.378494E-01$, $A_4 = 4.240434E-03$, $A_6 = 1.138424E-03$, $A_8 = -7.430571E-05$, $A_{10} = -1.687414E-04$, $A_{12} = -1.010466E-04$, $A_{14} = -2.258784E-05$, $A_{16} = 3.513228E-05$ Fifteenth Surface $k = -4.067028$, $A_4 = -3.057350E-03$, $A_6 = 5.258600E-05$ The values of the respective conditional expressions are as follows:

$$f3/f1=-0.255$$

$$f2/f2p=-0.749$$

$$f3/fw=1.517$$

$$|f3p/f3n|=0.519$$

Accordingly, the zoom lens of Numerical Data Example 1 satisfies the conditional expressions (1) to (4).

Figure 2:
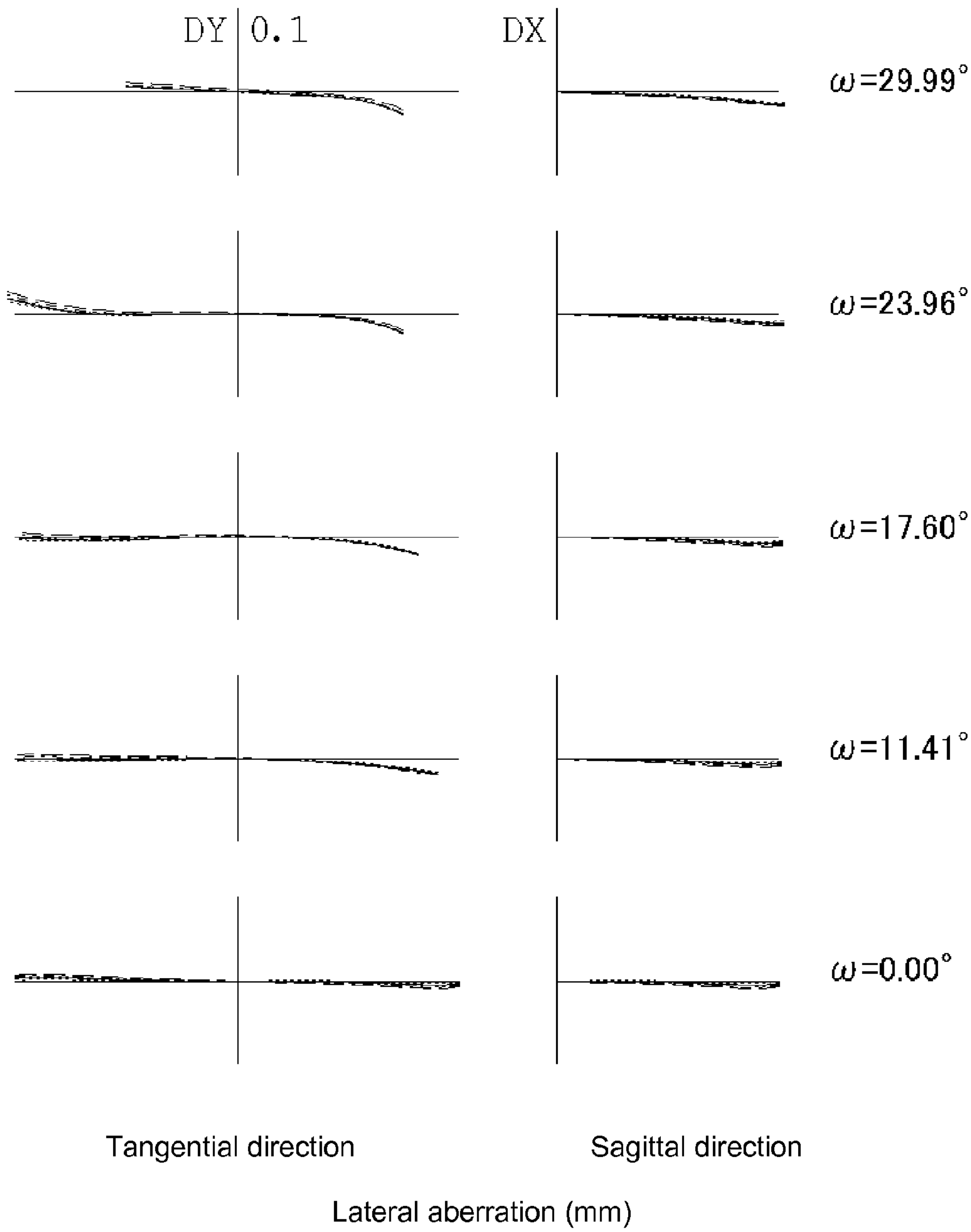
FIG. 2 is an aberration diagram showing a lateral aberration of the zoom lens shown in FIG. 1 at the wide-angle end.
Figure 3:
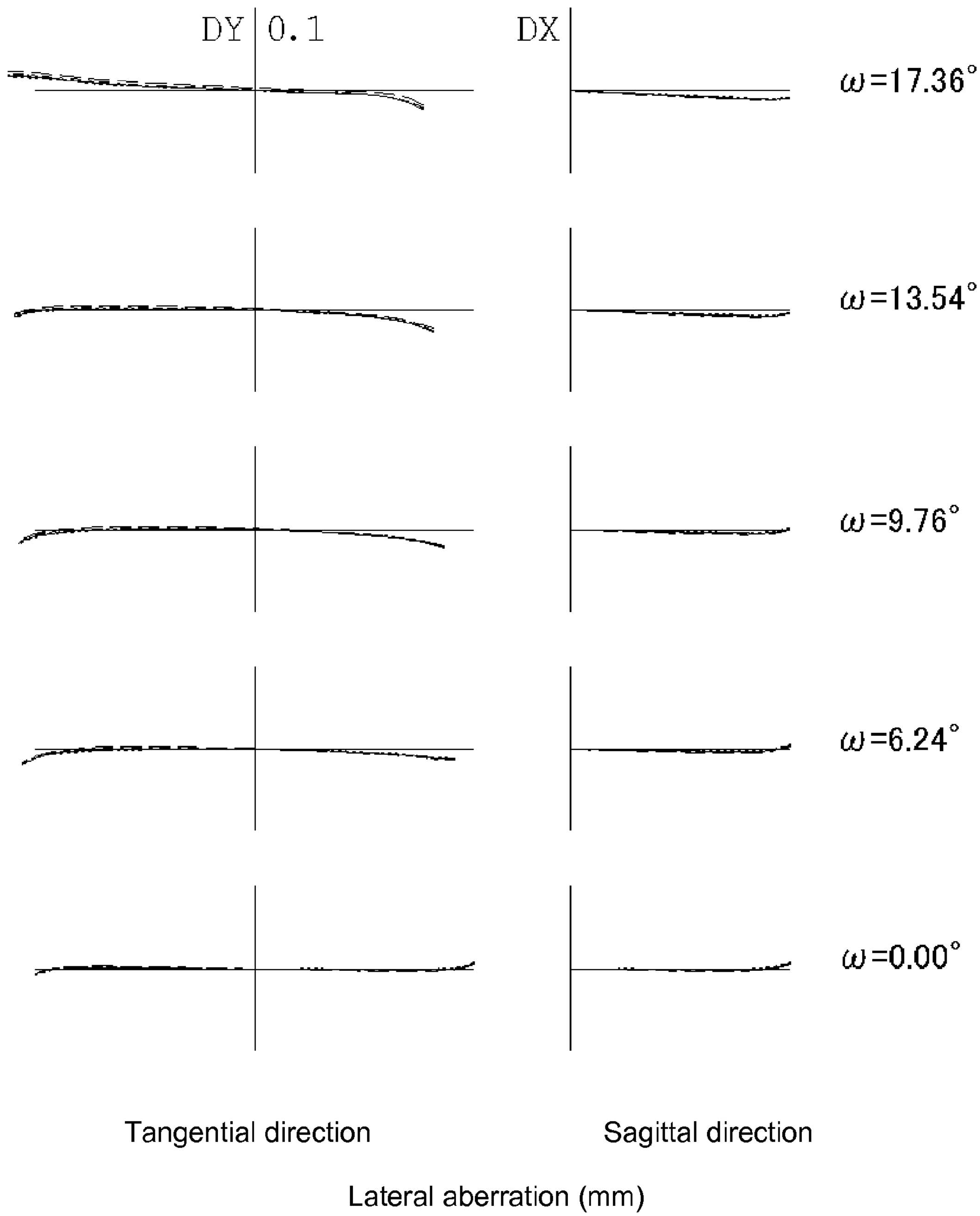
FIG. 3 is an aberration diagram showing a lateral aberration of the zoom lens shown in FIG. 1 at the midpoint.
Figure 4:
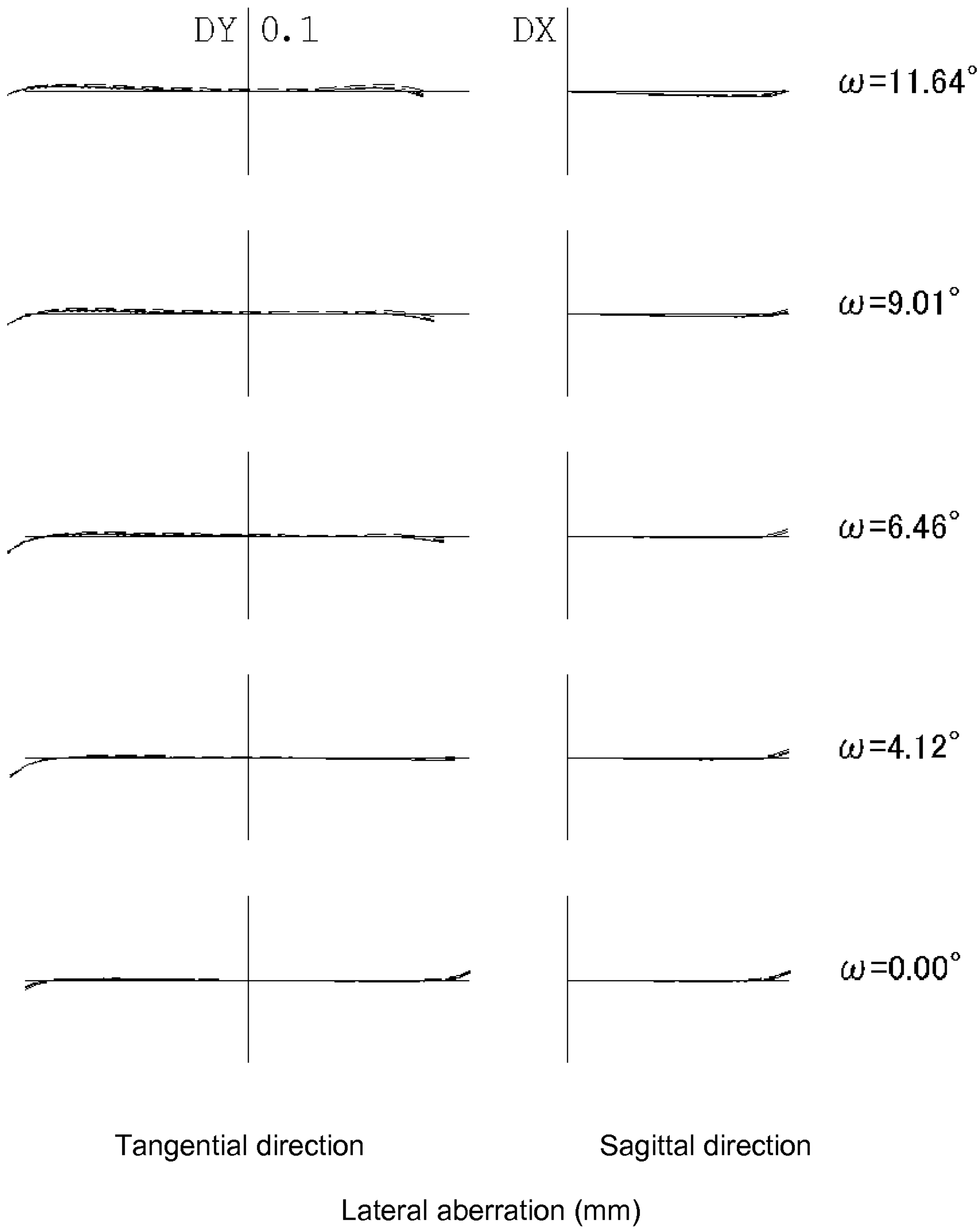
FIG. 4 is an aberration diagram showing a lateral aberration of the zoom lens shown in FIG. 1 at the telephoto end.

FIGS. 2 to 4 show a lateral aberration that corresponds to a half angle of view ω in the zoom lens of Numerical Data Example 1 by dividing into a tangential direction and sagittal direction in case of the object distance=infinity (∞), which will be also the same in FIGS. 7 to 9, FIGS. 12 to 14, FIGS. 17 to 19, FIGS. 22 to 24, and FIGS. 27 to 29.

Figure 5:
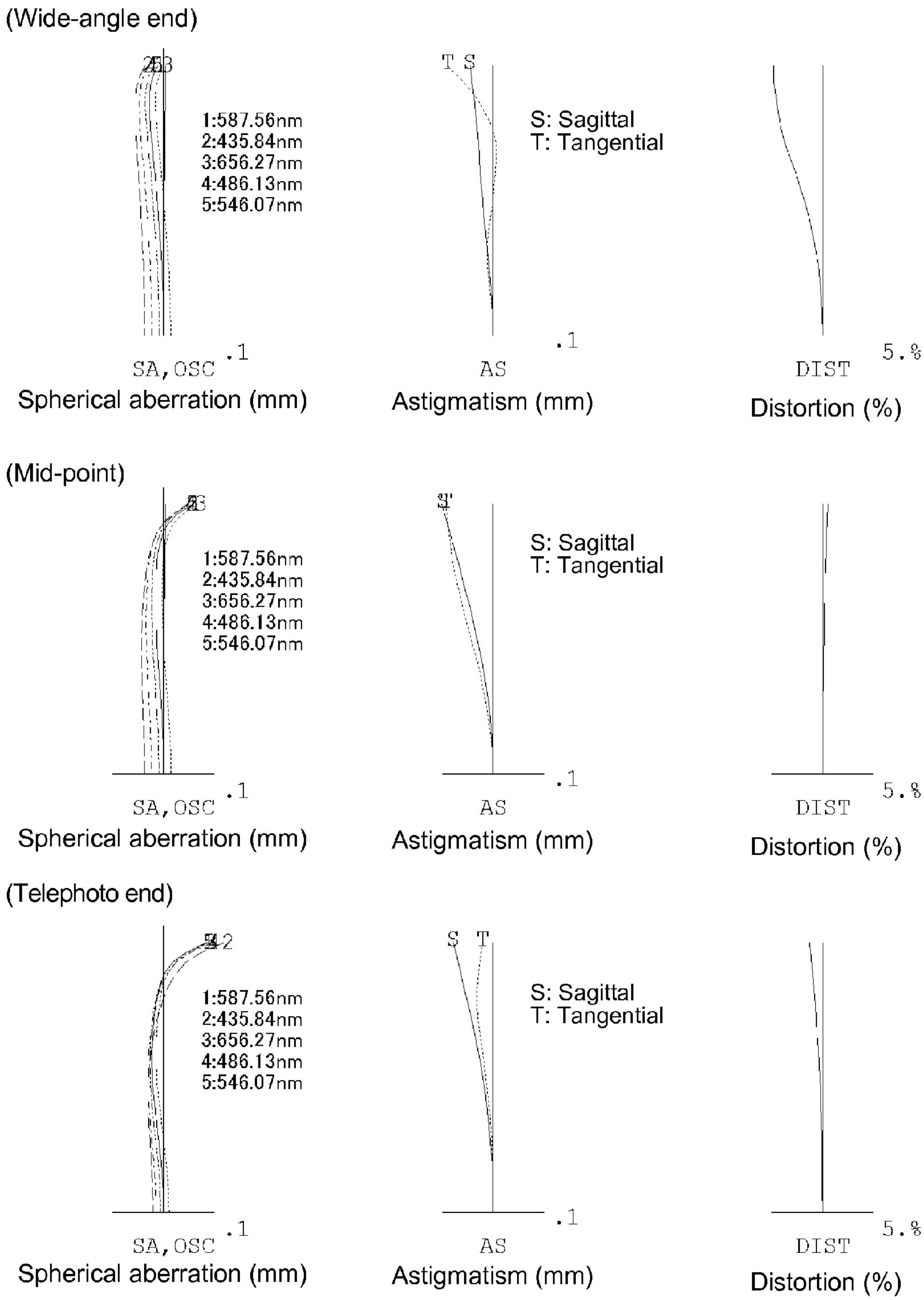
FIG. 5 is an aberration diagram showing a spherical aberration, an astigmatism, and a distortion of the zoom lens shown in FIG. 1.

In addition, FIG. 5 shows a spherical aberration SA (mm), an astigmatism AS (mm), and a distortion DIST (%) of the zoom lens of Numerical Data Example 1, respectively. In the aberration diagrams, the Offence against the Sine Condition (OSC) is also indicated for the spherical aberration diagram in addition to the aberrations at the respective wavelengths of 587.56 nm, 435.84 nm, 656.27 nm, 486.13 nm, and 546.07 nm. Further, in the astigmatism diagram, the aberration on the sagittal image surface S and the aberration on tangential image surface T are respectively indicated (which are the same in FIGS. 10, 15, 20, 25, and 30). Therefore, according to the zoom lens of Numerical Data Example 1, it is possible to satisfactorily correct aberrations.

Next, Numerical Data Example 2 of the zoom lens according to the embodiment will be described.

Figure 6:
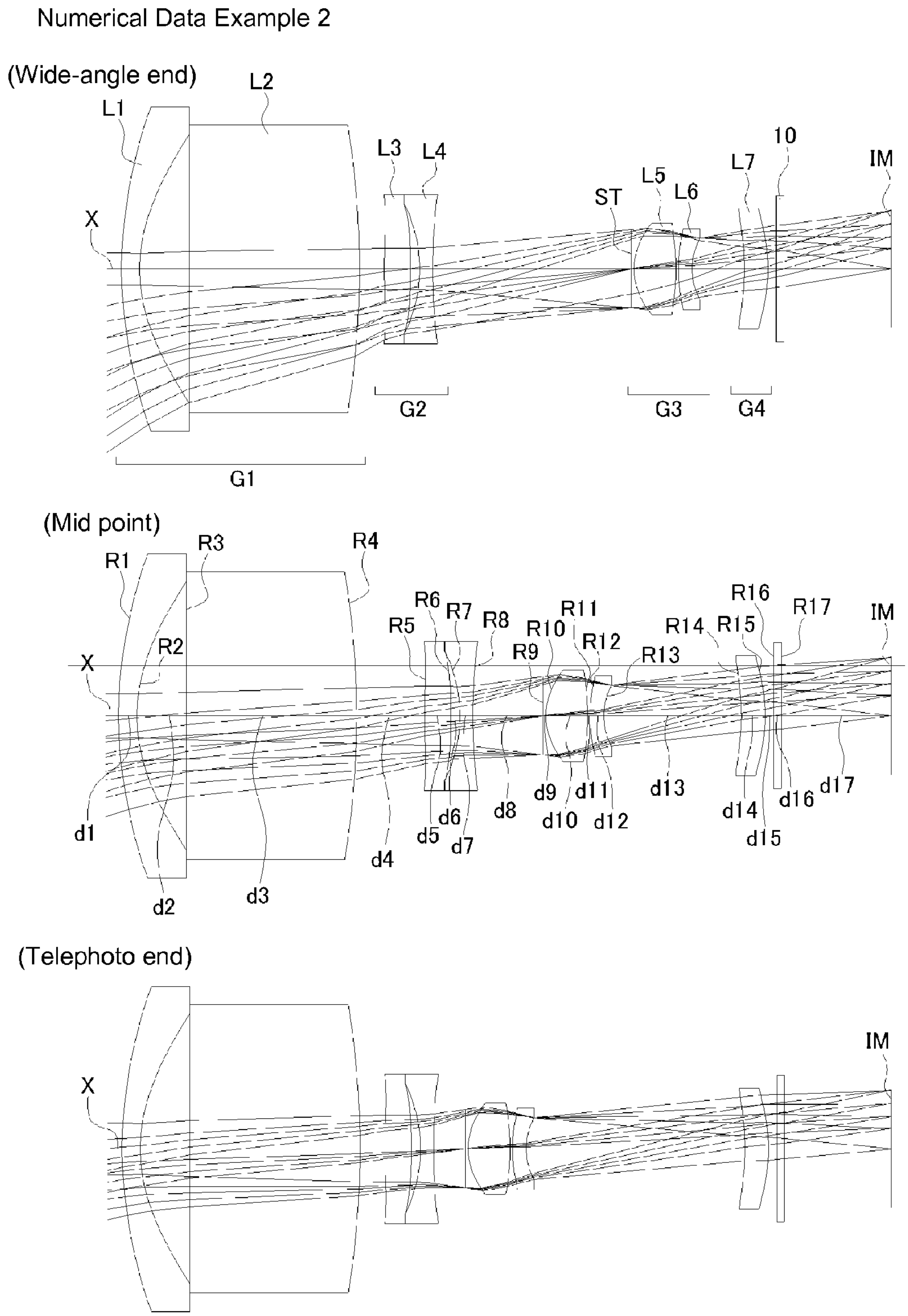
FIG. 6 shows sectional views of a zoom lens at a wide-angle end, a midpoint, and a telephoto end in Numerical Data Example 2 according to the embodiment.

As shown in FIG. 6, the zoom lens of Numerical Data Example 2 has a similar basic lens configuration to the one in Numerical Data Example 1. According to the zoom lens of Numerical Data Example 2, however, the second lens L2 has a larger thickness in an optical axis direction than that of the second lens L2 of Numerical Data Example 1 in the optical axis direction. For this reason, it is possible to form a bent-type (L-shaped) zoom lens using a prism that reflects an incident light beam to perpendicularly bend the light path, e.g. as a right-angle prism, as the second lens L2. Especially, in case of small-sized portable devices such as cellular phones, space to mount a zoom lens is typically very limited. Accordingly, applying the zoom lens of the invention as a bent-type zoom lens, it is possible to significantly reduce a thickness of a device to mount the zoom lens and suitably attain small size and small thickness of the portable devices.

Moreover, in the zoom lens of Numerical Data Example 2, the seventh lens L7 is formed as an aspheric shape having an inflection point. More specifically, a surface of the seventh lens L7 on the image plane side is formed in an aspheric shape so as to be convex to the image plane side near the optical axis and concave to the image plane side at the periphery.

NUMERICAL DATA EXAMPLE 2

Basic lens data are shown below.

Unit: mm

Surface Data

| Surface Number i | R | d | Nd | νd |
|---|---|---|---|---|
| (Object) | ∞ | ∞ | | |
| 1* | 15.000 | 0.7000 | 1.52470 | 56.2 |
| 2* | 6.200 | 1.9000 | | |
| 3 | 0.000 | 6.5000 | 1.61420 | 26.0 |
| 4 | −34.000 | Variable | | |
| 5* | 25.446 | 1.0000 | 1.61420 | 26.0 |
| 6* | −32.666 | 0.3500 | | |
| 7 | −5.622 | 0.5000 | 1.61800 | 63.4 |
| 8 | 22.667 | Variable | | |
| 9 (Stop) | ∞ | 0.1040 | | |
| 10* | 2.451 | 1.6000 | 1.49700 | 81.6 |
| 11* | −8.507 | 0.1000 | | |
| 12 | 6.878 | 0.5200 | 1.58500 | 29.0 |
| 13* | 2.677 | Variable | | |
| 14* | −9.017 | 0.9000 | 1.52470 | 56.2 |
| 15* | −6.645 | 0.3200 | | |
| 16 | ∞ | 0.3000 | 1.51633 | 64.1 |
| 17 | ∞ | 4.0682 | | |
| (Image Plane) | ∞ | | | |

Other Data
Zoom Ratio: 2.810

| | Wide-Angle End | Midpoint | Telephoto End |
|---|---|---|---|
| Whole System Focal Length f | 3.768 | 7.206 | 10.589 |
| F number | 3.066 | 4.262 | 5.343 |
| Half Angle of View ω (°) | 30.84 | 17.34 | 12.00 |
| Image Height | 2.250 | 2.250 | 2.250 |
| Total Optical Track Length L | 29.31 | 29.31 | 29.31 |
| Back Focal Length BF | 4.586 | 4.586 | 4.586 |
| d4 | 0.950 | 2.603 | 0.960 |
| d8 | 7.600 | 2.687 | 1.229 |
| d13 | 2.000 | 5.260 | 8.361 |

f1 = −39.455
f2 = −10.993
f3 = 5.891
f2p = 23.442
f3p = 4.024
f3n = −7.851
fw = 3.768

Aspheric Surface Data

First Surface k = 2.629552, $A_4$ = −4.002115E−04, $A_6$ = 2.448554E−06

Second Surface k = −1.516406, $A_4$ = −1.343998E−05, $A_6$ = −3.875597E−06

Fifth Surface k = −8.367098E+01, $A_4$ = −1.835176E−03, $A_6$ = −4.884153E−05

Sixth Surface k = 3.359298E+01, $A_4$ = −3.314266E−03, $A_6$ = −8.647007E−06

Tenth Surface k = −7.856643E−01, $A_4$ = 2.165646E−03, $A_6$ = 2.123357E−04

Eleventh Surface k = −3.363625, $A_4$ = 4.000477E−04, $A_6$ = 1.639557E−04, $A_8$ = 6.355054E−05, $A_{10}$ = 4.548889E−07

Thirteenth Surface k = 9.898369E−01, $A_4$ = 4.940749E−03, $A_6$ = 1.217016E−03, $A_8$ = 6.793014E−05, $A_{10}$ = −3.268747E−05, $A_{12}$ = −2.969065E−05, $A_{14}$ = −1.586147E−05, $A_{16}$ = −1.882039E−06

Fourteenth Surface k = −4.634063, $A_4$ = −1.656245E−03, $A_6$ = 7.890630E−04

Fifteenth Surface k = −7.924586, $A_4$ = −5.090760E−03, $A_6$ = 8.182567E−04

The values of the respective conditional expressions are as follows:

$$f3/f1=-0.149$$

$$f2/f2p=-0.469$$

$$f3/fw=1.563$$

$$|f3p/f3n|=0.513$$

Accordingly, the zoom lens of Numerical Data Example 2 also satisfies the conditional expressions (1) to (4).

Figure 7:
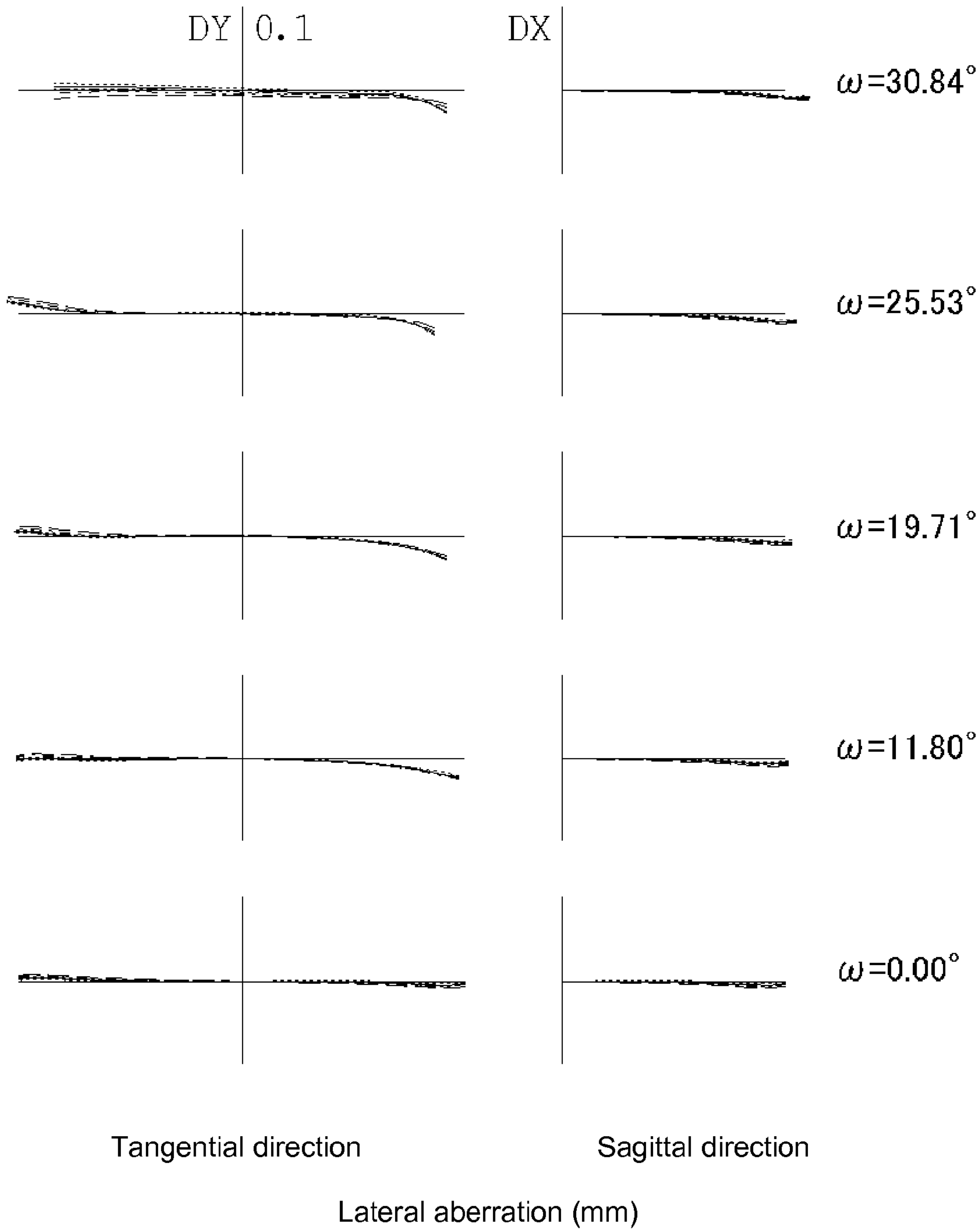
FIG. 7 is an aberration diagram showing a lateral aberration of the zoom lens shown in FIG. 6 at the wide-angle end.
Figure 8:
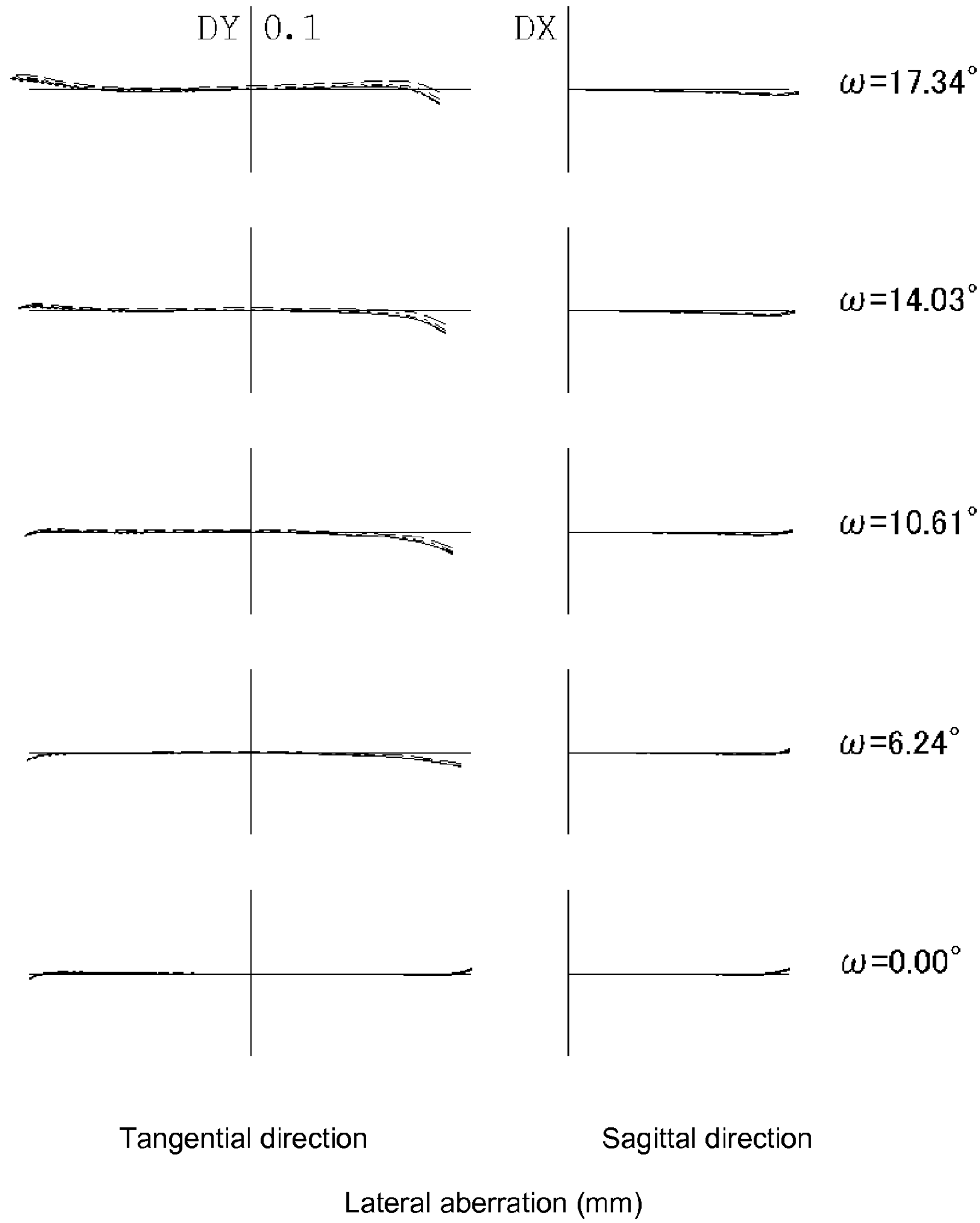
FIG. 8 is an aberration diagram showing a lateral aberration of the zoom lens shown in FIG. 6 at the midpoint.
Figure 9:
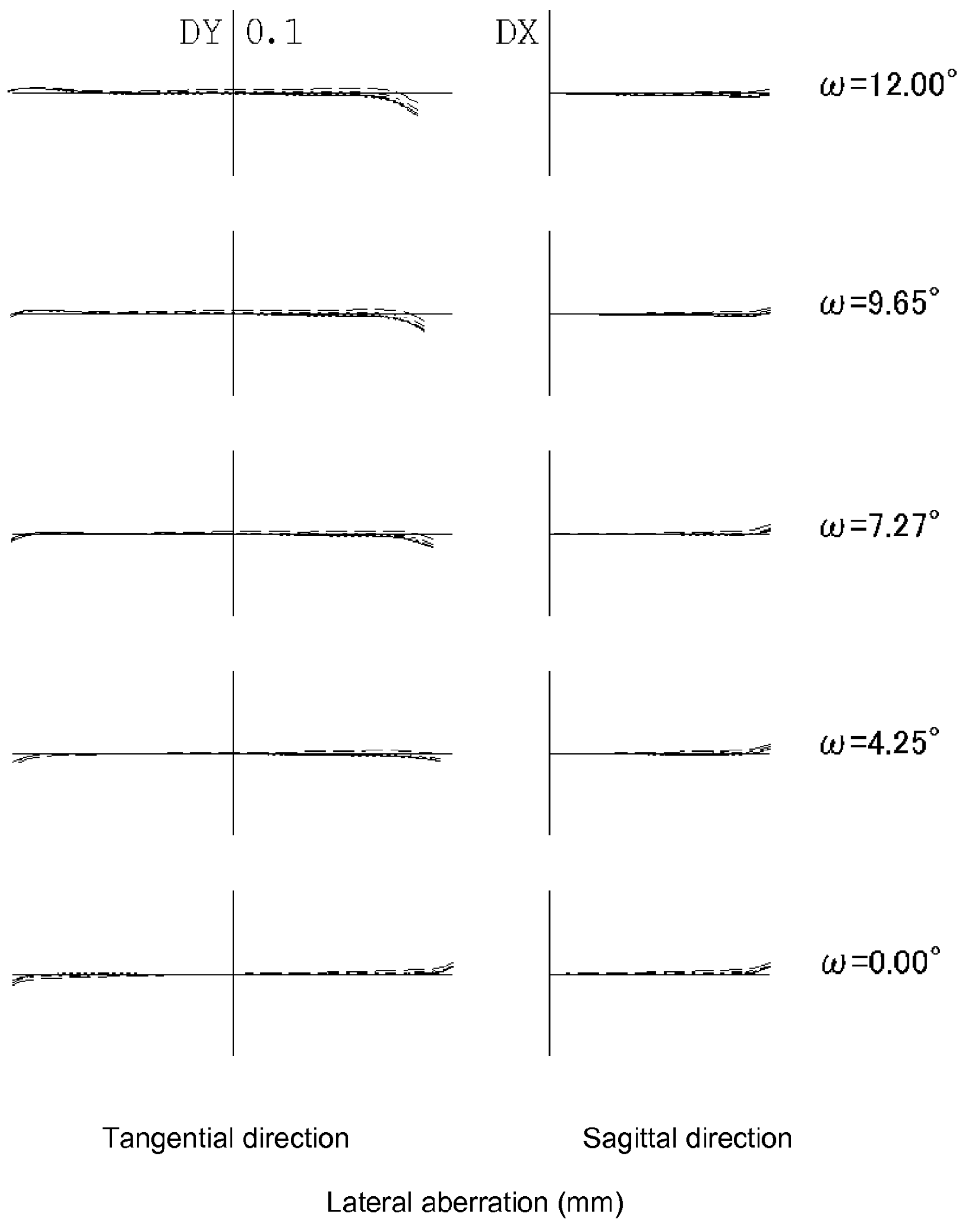
FIG. 9 is an aberration diagram showing a lateral aberration of the zoom lens shown in FIG. 6 at the telephoto end.
Figure 10:
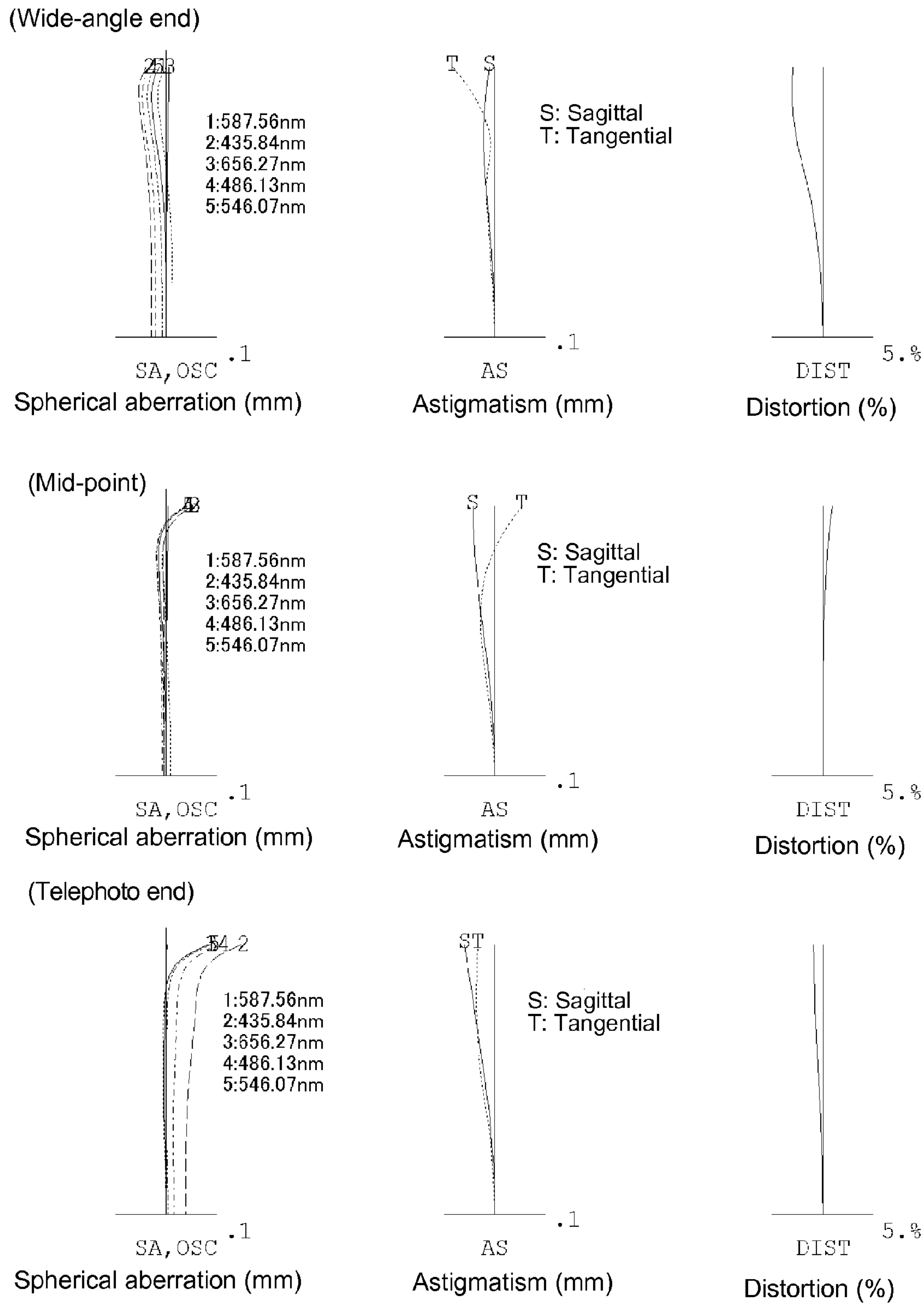
FIG. 10 is an aberration diagram showing a spherical aberration, an astigmatism, and a distortion of the zoom lens shown in FIG. 6.

FIGS. 7 to 9 show a lateral aberration that corresponds to a half angle of view ω in the zoom lens of Numerical Data Example 2. In addition, FIG. 10 shows a spherical aberration SA (mm), an astigmatism AS (mm), and a distortion DIST (%) of the zoom lens of Numerical Data Example 2, respectively. As shown in each diagram, even with the zoom lens of Numerical Data Example 2, it is possible to satisfactorily correct the image surface and suitably correct each aberration.

Here, in Numerical Data Examples 1 and 2, the seventh lens L7 of the fourth lens group G4 is configured as a lens having positive refractive power. However, the refractive power of the seventh lens L7 is not limited to positive, and can be negative, so as to attain miniaturization of the zoom lens and satisfactory correct aberrations by having the above-described configuration and satisfying the conditional expressions.

In addition, in the embodiment, the second lens L2 that serves as a light path changing member has positive refractive power. The refractive power of the second lens L2, however, is not limited to positive as indicated in the embodiment. Even when the second lens L2 has negative refractive power, it is possible to obtain similar effects to those of the zoom lens of the embodiment. In other words, the light path changing member can be any as long as it is a lens having positive or negative refractive power.

Furthermore, according to the embodiment, the second lens group G2 is configured, arranging the third lens L3 that is a biconvex lens and the fourth lens L4 that is a biconcave lens in the order from the object side. The shape of each lens that composes the second lens group G2 is not limited to such shape. For example, it is possible to use a positive meniscus lens or a plano-convex lens for the third lens L3, and use a negative meniscus lens or a plano-concave lens for the fourth lens L4. In addition, the third lens L3 can be a negative lens and the fourth lens L4 can be a positive lens. In other words, it is just necessary to compose the second lens group G2 with two lenses, a lens having positive refractive power and a lens having negative refractive power.

(Second Embodiment)

Figure 11:
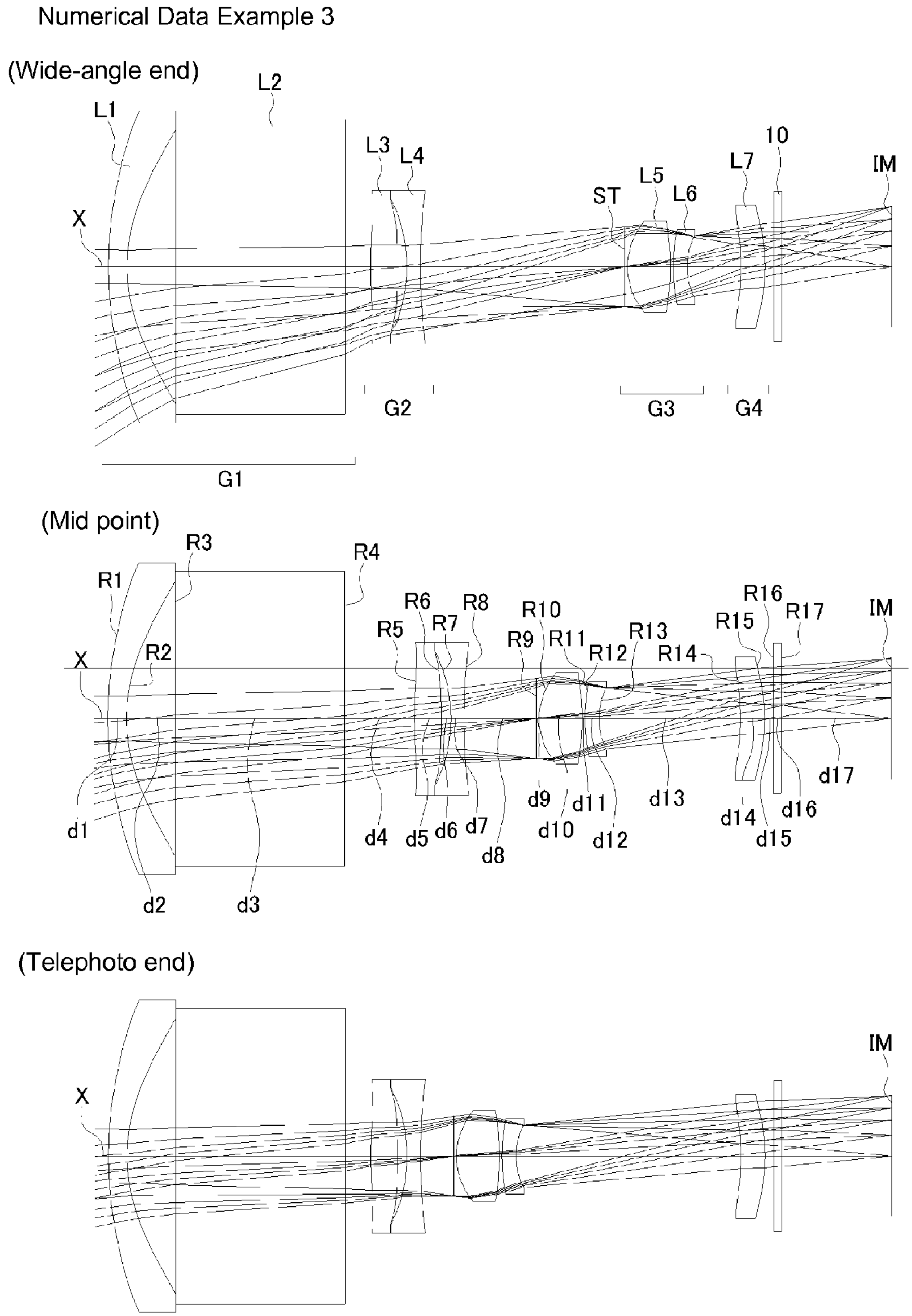
FIG. 11 shows sectional views of a zoom lens at a wide-angle end, a midpoint, and a telephoto end in Numerical Data Example 3 according to a second embodiment.

As shown in FIG. 11, similarly to the zoom lens of the first embodiment, the zoom lens of a second embodiment includes a first lens group G1 having negative refractive power; a second lens group G2 having negative refractive power; a third lens group G3 having positive refractive power; and a fourth lens group G4 having positive or negative refractive power, arranged in the order from the object side. There is provided a cover glass 10 arranged between the fourth lens group G4 and an image plane of an imaging element.

Also in the embodiment, the zoom lens is configured so that the first lens group G1 and the fourth lens group G4 are fixed and the second lens group G2 and the third lens group G3 move along the optical axis. The magnification changes as the third lens group G3 moves, and focusing and back focus adjustment work by moving the second lens group G2.

Here, according to the embodiment, the configuration of the first lens group G1 is different from that in the first embodiment. The first lens group G1 of the zoom lens in the embodiment includes the first lens L1 that is a negative meniscus lens directing a convex surface to the object side and a prism L2 (light path changing member) that reflects an incident light beam to perpendicularly bend the light path. Such light path changing member can be any as long as it can reflect an incident light beam to bend the light path, and for example, it is also possible to use a mirror as well as a prism used in the embodiment. Here, for convenience, in the respective lens sectional views FIGS. 11, 16, 21, and 26, the prism L2 is shown as a parallel flat plate that is equivalent to an optical path length thereof.

As described above, in the zoom lens of the embodiment, since the first lens group G1 includes the first lens L1 that has negative refractive power and the prism L2, it is very suitable to apply as a bent-type zoom lens. Applying the zoom lens of the embodiment as a bent-type zoom lens, it is possible to suitably attain a small size and a small thickness of a portable device.

The lens configurations of those other than the first lens group G1 are similar to that of the zoom lens in the first embodiment. More specifically, the second lens group G2 includes two lenses, i.e. a third lens L3 having positive refractive power and a fourth lens L4 having negative refractive power. The third lens group G3 includes a stop ST; a front group lens L5 that is a biconvex lens; and a rear group lens L6 that is a negative meniscus lens directing a convex surface thereof to the object side. The fourth lens group G4 includes a seventh lens L7 that is a positive or negative meniscus lens directing a concave surface thereof to the object side.

Hereunder, Numerical Data Example 3 of the zoom lens of the embodiment will be described. In Numerical Data Example 3, as shown in FIG. 11, the second lens group G2 includes two lenses, a third lens L3 that is a biconvex lens and a fourth lens L4 that is a biconcave lens. Among them, the third lens L3 is formed so that a surface thereof on the object side has an aspheric shape having an inflection point. The seventh lens L7 that composes the fourth lens G4 has positive refractive power. The seventh lens L7 is formed as an aspheric shape having an inflection point similarly to Numerical Data Example 2.

NUMERICAL DATA EXAMPLE 3

Basic lens data are shown below.

Unit: mm

Surface Data

| Surface Number i | R | d | Nd | νd |
|---|---|---|---|---|
| (Object) | ∞ | ∞ | | |
| 1* | 13.500 | 0.7000 | 1.52470 | 56.2 |
| 2* | 6.200 | 1.8000 | | |
| 3 | 0.000 | 6.3000 | 1.84666 | 23.8 |
| 4 | 0.000 | Variable | | |
| 5* | 16.645 | 1.0000 | 1.62090 | 24.0 |
| 6* | −30.992 | 0.3500 | | |
| 7 | −5.663 | 0.5000 | 1.61800 | 63.4 |
| 8 | 23.109 | Variable | | |
| 9 (Stop) | ∞ | 0.1040 | | |
| 10* | 2.447 | 1.6000 | 1.49700 | 81.6 |
| 11* | −8.572 | 0.1000 | | |
| 12 | 6.906 | 0.5200 | 1.58500 | 29.0 |
| 13* | 2.681 | Variable | | |
| 14* | −9.020 | 0.9000 | 1.52470 | 56.2 |
| 15* | −6.588 | 0.3200 | | |
| 16 | ∞ | 0.3000 | 1.51633 | 64.1 |
| 17 | ∞ | 4.0719 | | |
| (Image Plane) | ∞ | | | |

-continued

| Unit: mm | | | |
|---|---|---|---|
| Other Data<br>Zoom Ratio: 2.811 | | | |
| | Wide-Angle End | Midpoint | Telephoto End |
| Whole System Focal Length f | 3.870 | 7.189 | 10.877 |
| F number | 3.053 | 4.225 | 5.421 |
| Half Angle of View ω (°) | 30.17 | 17.38 | 11.69 |
| Image Height | 2.250 | 2.250 | 2.250 |
| Total Optical Track Length L | 29.01 | 29.01 | 29.01 |
| Back Focal Length BF | 4.590 | 4.590 | 4.590 |
| d4 | 0.950 | 2.603 | 0.960 |
| d8 | 7.600 | 2.687 | 1.229 |
| d13 | 2.000 | 5.260 | 8.361 |
| f1 = −22.598 | | | |
| f2 = −13.595 | | | |
| f3 = 5.893 | | | |
| f2p = 17.582 | | | |
| f3p = 4.024 | | | |
| f3n = −7.848 | | | |
| fw = 3.870 | | | |

| Aspheric Surface Data |
|---|
| First Surface |
| k = 2.312882, $A_4$ = −4.692146E−04, $A_6$ = 3.851697E−06 |
| Second Surface |
| k = −1.716302, $A_4$ = −3.676289E−05, $A_6$ = −3.737482E−06 |
| Fifth Surface |
| k = −4.251369E+01, $A_4$ = −1.685059E−03, $A_6$ = −8.398551E−05 |
| Sixth Surface |
| k = 5.682753E+01, $A_4$ = −3.446558E−03, $A_6$ = 1.288890E−05 |
| Tenth Surface |
| k = −7.804816E−01, $A_4$ = 2.211298E−03, $A_6$ = 2.392996E−04 |
| Eleventh Surface |
| k = −2.956274, $A_4$ = 4.760735E−04, $A_6$ = 1.790089E−04, $A_8$ = 6.582276E−05, $A_{10}$ = 5.631601E−08 |
| Thirteenth Surface |
| k = 1.002572, $A_4$ = 5.120206E−03, $A_6$ = 1.271446E−03, $A_8$ = 8.629448E−05, $A_{10}$ = −2.241258E−05, $A_{12}$ = −2.431634E−05, $A_{14}$ = −1.512805E−05, $A_{16}$ = −4.710862E−06 |
| Fourteenth Surface |
| k = −2.128425, $A_4$ = −1.271118E−03, $A_6$ = 9.060079E−04 |
| Fifteenth Surface |
| k = −5.954339, $A_4$ = −4.565401E−03, $A_6$ = 8.930374E−04 |

The values of the respective conditional expressions are as follows:

$$f3/f1 = -0.261$$

$$f2/f2p = -0.773$$

$$f3/fw = 1.523$$

$$|f3p/f3n| = 0.513$$

Accordingly, the zoom lens of Numerical Data Example 3 satisfies the conditional expressions (1) to (4).

Figure 12:
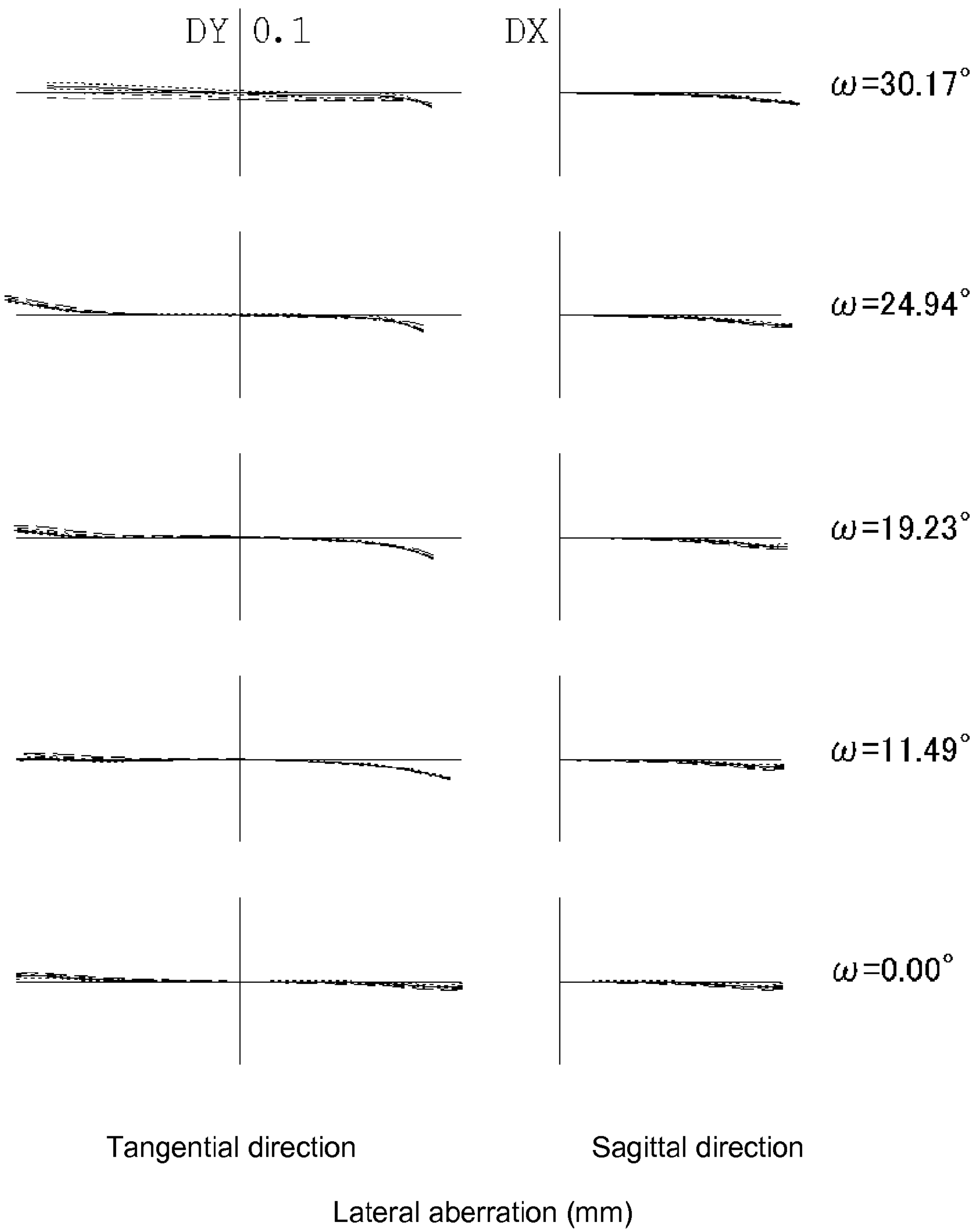
FIG. 12 is an aberration diagram showing a lateral aberration of the zoom lens shown in FIG. 11 at the wide-angle end.
Figure 13:
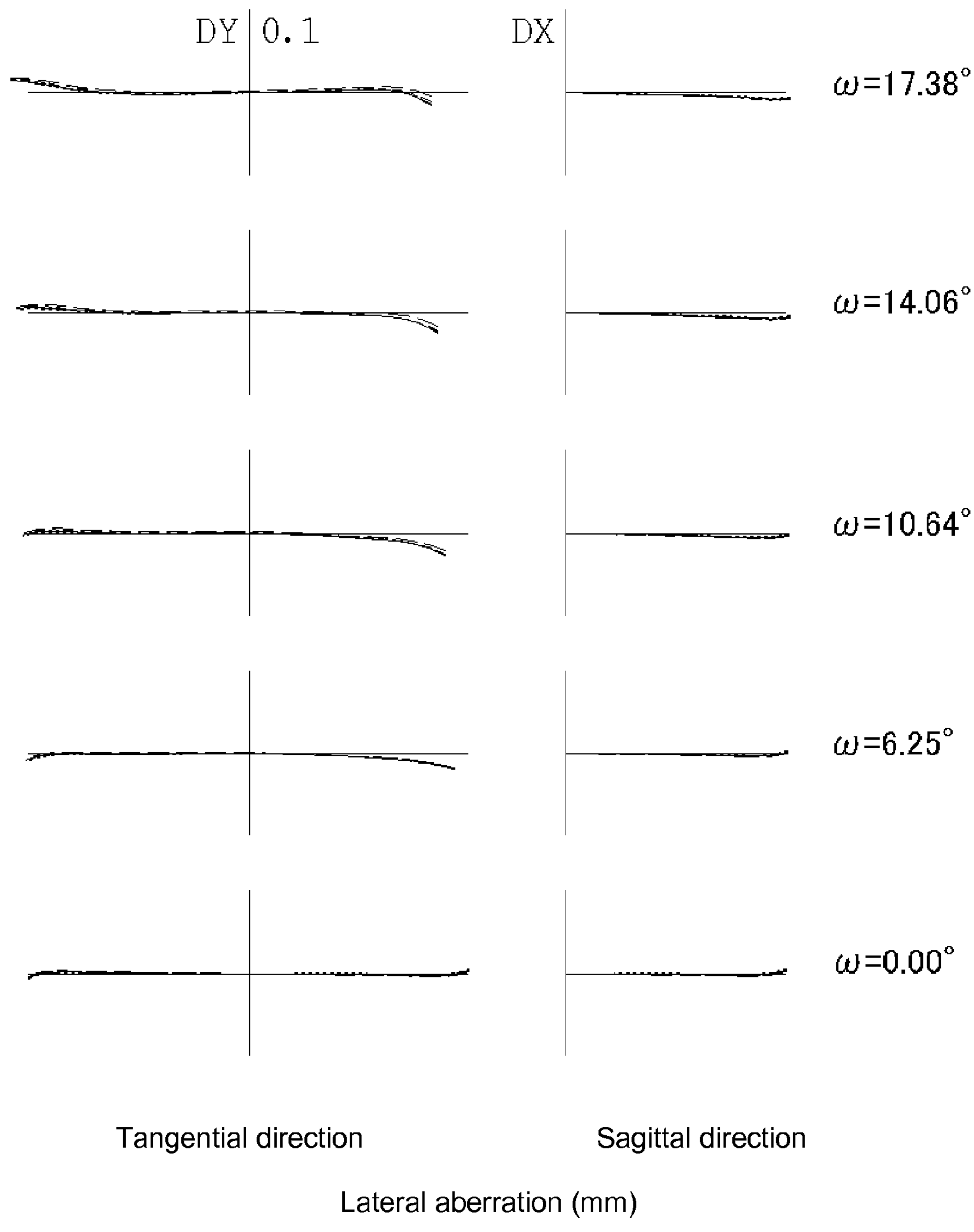
FIG. 13 is an aberration diagram showing a lateral aberration of the zoom lens shown in FIG. 11 at the midpoint.
Figure 14:
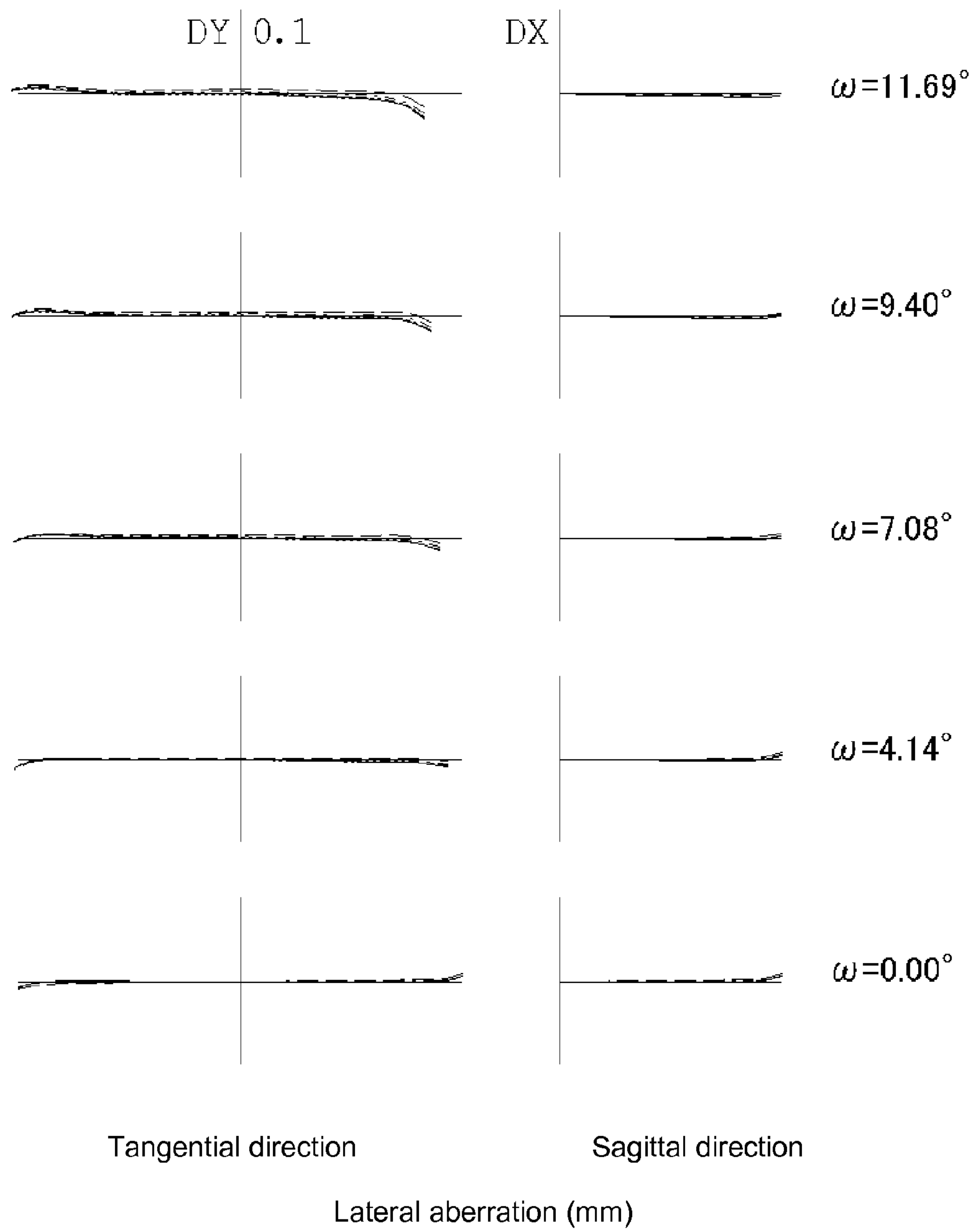
FIG. 14 is an aberration diagram showing a lateral aberration of the zoom lens shown in FIG. 11 at the telephoto end.
Figure 15:
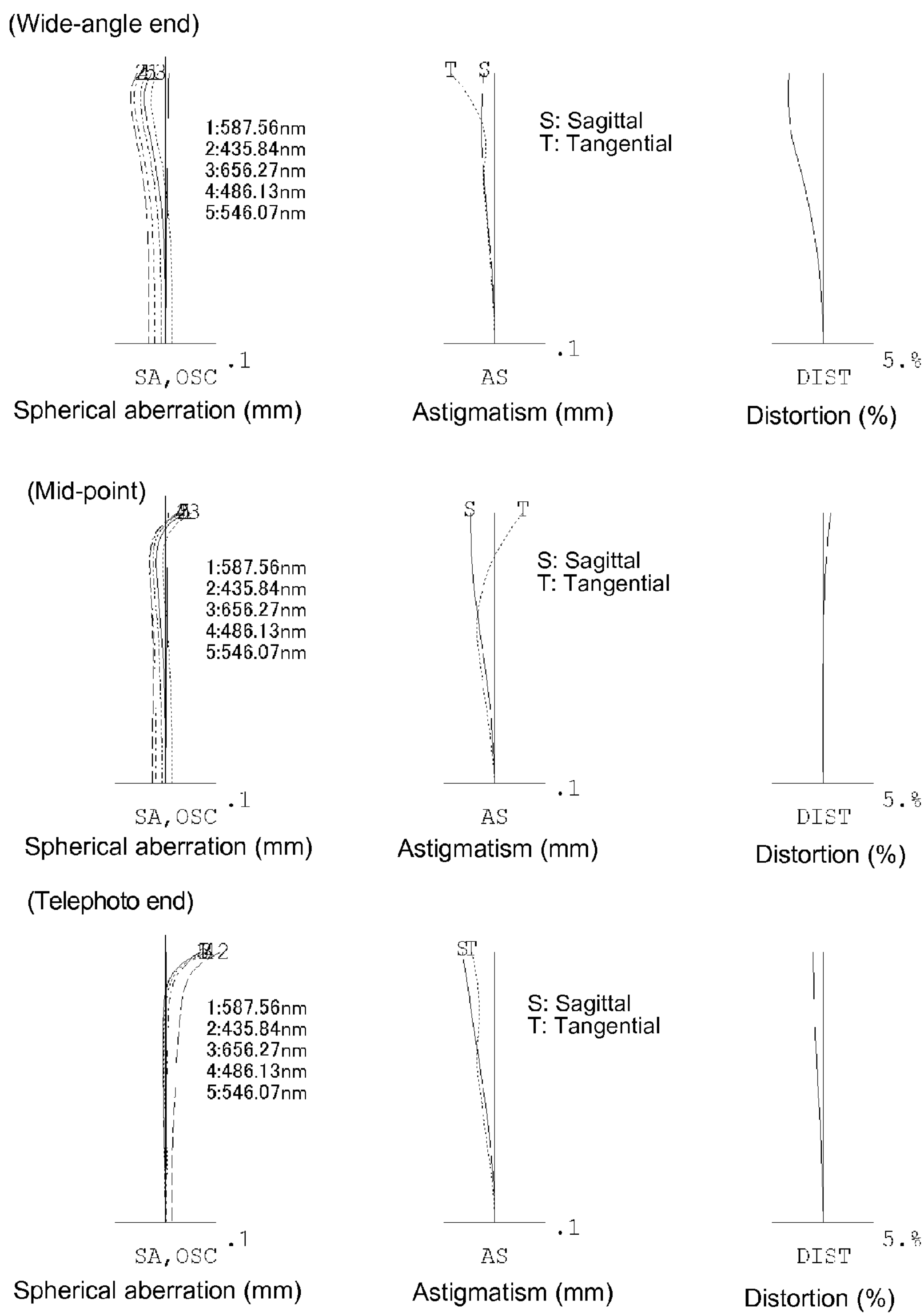
FIG. 15 is an aberration diagram showing a spherical aberration, an astigmatism, and a distortion of the zoom lens shown in FIG. 11.

FIGS. 12 to 14 show a lateral aberration that corresponds to a half angle of view ω in the zoom lens of Numerical Data Example 3, and FIG. 15 shows a spherical aberration SA (mm), an astigmatism AS (mm), and a distortion DIST (%), respectively. As shown in each diagram, even with the zoom lens of Numerical Data Example 3, it is possible to satisfactorily correct the image surface and suitably correct each aberration.

Figure 16:
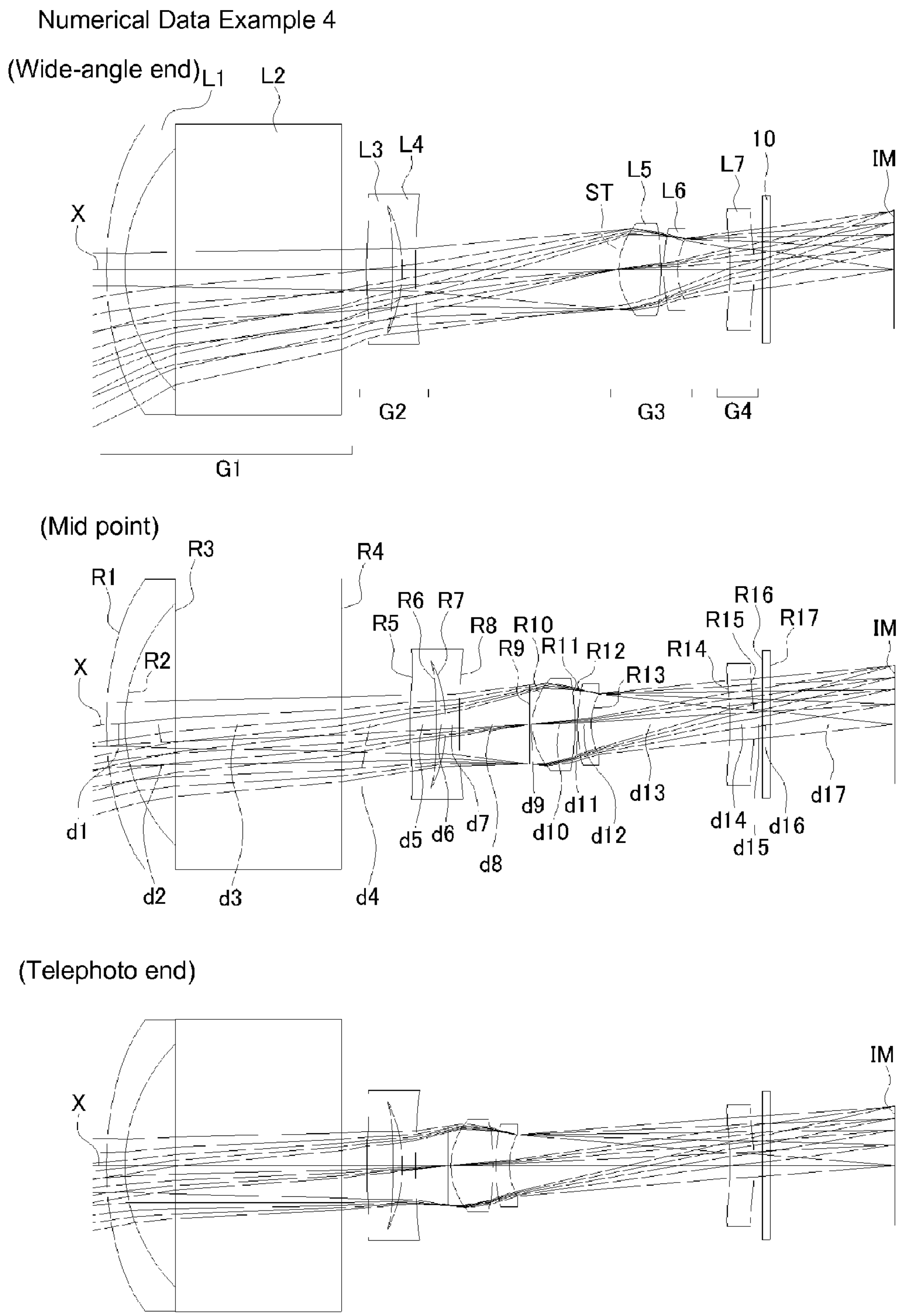
FIG. 16 shows sectional views of a zoom lens at a wide-angle end, a midpoint, and a telephoto end in Numerical Data Example 4 according to the embodiment.

Next, Numerical Data Example 4 of the zoom lens in the embodiment will be described. As shown in FIG. 16, also in Numerical Data Example 4, the second lens group G2 includes two lenses, the third lens L3 that is a biconvex lens and the fourth lens L4 that is a biconcave lens, and a surface of the third lens L3 on the object side is formed as an aspheric shape having an inflection point. On the other hand, the seventh lens L7 of the fourth lens group G4 has negative refractive power. The seventh lens L7 is formed as an aspheric shape having an inflection point similarly to Numerical Data Example 2.

NUMERICAL DATA EXAMPLE 4

Basic lens data are shown below.

| Unit: mm | | | | |
|---|---|---|---|---|
| Surface Data | | | | |
| Surface Number i | R | d | Nd | νd |
| (Object) | ∞ | ∞ | | |
| 1* | 13.500 | 0.7000 | 1.52470 | 56.2 |
| 2* | 6.200 | 1.9000 | | |
| 3 | 0.000 | 6.3000 | 1.84666 | 23.8 |
| 4 | 0.000 | Variable | | |
| 5* | 16.802 | 1.0000 | 1.62090 | 24.0 |
| 6* | −36.260 | 0.3500 | | |
| 7 | −5.639 | 0.5000 | 1.61800 | 63.4 |
| 8 | 26.291 | Variable | | |
| 9 (Stop) | ∞ | 0.1040 | | |
| 10* | 2.485 | 1.6000 | 1.49700 | 81.6 |
| 11* | −8.539 | 0.1000 | | |
| 12 | 6.652 | 0.5200 | 1.58500 | 29.0 |
| 13* | 2.691 | Variable | | |
| 14* | −10.017 | 0.9000 | 1.52470 | 56.2 |
| 15* | −10.883 | 0.3200 | | |
| 16 | ∞ | 0.3000 | 1.51633 | 64.1 |
| 17 | ∞ | 4.6907 | | |
| (Image Plane) | ∞ | | | |

| Other Data<br>Zoom Ratio: 2.807 | | | |
|---|---|---|---|
| | Wide-Angle End | Midpoint | Telephoto End |
| Whole System Focal Length f | 4.348 | 8.076 | 12.206 |
| F number | 3.461 | 4.772 | 6.043 |
| Half Angle of View ω (°) | 27.36 | 15.57 | 10.44 |
| Image Height | 2.250 | 2.250 | 2.250 |
| Total Optical Track Length L | 29.73 | 29.73 | 29.73 |
| Back Focal Length BF | 5.209 | 5.209 | 5.209 |
| d4 | 0.950 | 2.603 | 0.960 |
| d8 | 7.600 | 2.687 | 1.229 |
| d13 | 2.000 | 5.260 | 8.361 |
| f1 = −22.598 | | | |
| f2 = −13.468 | | | |
| f3 = 5.901 | | | |
| f2p = 18.626 | | | |
| f3p = 4.069 | | | |

-continued

| Unit: mm |
|---|
| f3n = −8.118<br>fw = 4.348 |

| Aspheric Surface Data |
|---|
| First Surface |
| k = 2.312882, $A_4$ = −4.692146E−04, $A_6$ = 3.851697E−06 |
| Second Surface |
| k = −1.716302, $A_4$ = −3.676289E−05, $A_6$ = −3.737482E−06 |
| Fifth Surface |
| k = −4.251369E+01, $A_4$ = −1.685059E−03, $A_6$ = −8.398551E−05 |
| Sixth Surface |
| k = 5.682753E+01, $A_4$ = −3.446558E−03, $A_6$ = 1.288890E−05 |
| Tenth Surface |
| k = −7.804816E−01, $A_4$ = 2.211298E−03, $A_6$ = 2.392996E−04 |
| Eleventh Surface |
| k = −2.956274, $A_4$ = 4.760735E−04, $A_6$ = 1.790089E−04, $A_8$ = 6.582276E−05, $A_{10}$ = 5.631601E−08 |
| Thirteenth Surface |
| k = 1.002572, $A_4$ = 5.120206E−03, $A_6$ = 1.271446E−03, $A_8$ = 8.629448E−05, $A_{10}$ = −2.241258E−05, $A_{12}$ = −2.431634E−05, $A_{14}$ = −1.512805E−05, $A_{16}$ = −4.710862E−06 |
| Fourteenth Surface |
| k = −2.128425, $A_4$ = −1.271118E−03, $A_6$ = 9.060079E−04 |
| Fifteenth Surface |
| k = −5.954339, $A_4$ = −4.565401E−03, $A_6$ = 8.930374E−04 |

The values of the respective conditional expressions are as follows:

$$f3/f1=-0.261$$

$$f2/f2p=-0.723$$

$$f3/fw=1.357$$

$$|f3p/f3n|=0.501$$

Accordingly, the zoom lens of Numerical Data Example 4 also satisfies the conditional expressions (1) to (4).

Figure 17:
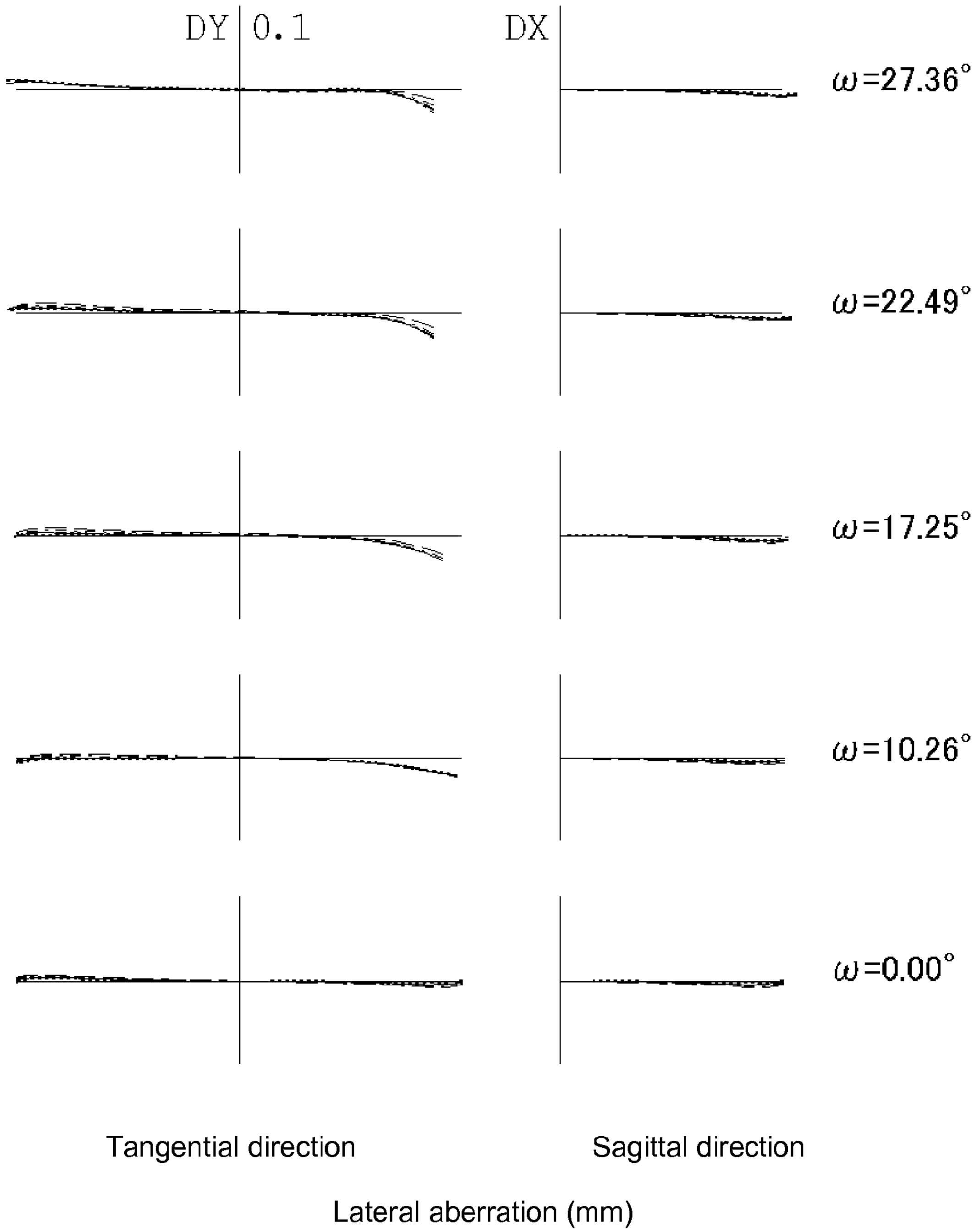
FIG. 17 is an aberration diagram showing a lateral aberration of the zoom lens shown in FIG. 16 at the wide-angle end.
Figure 18:
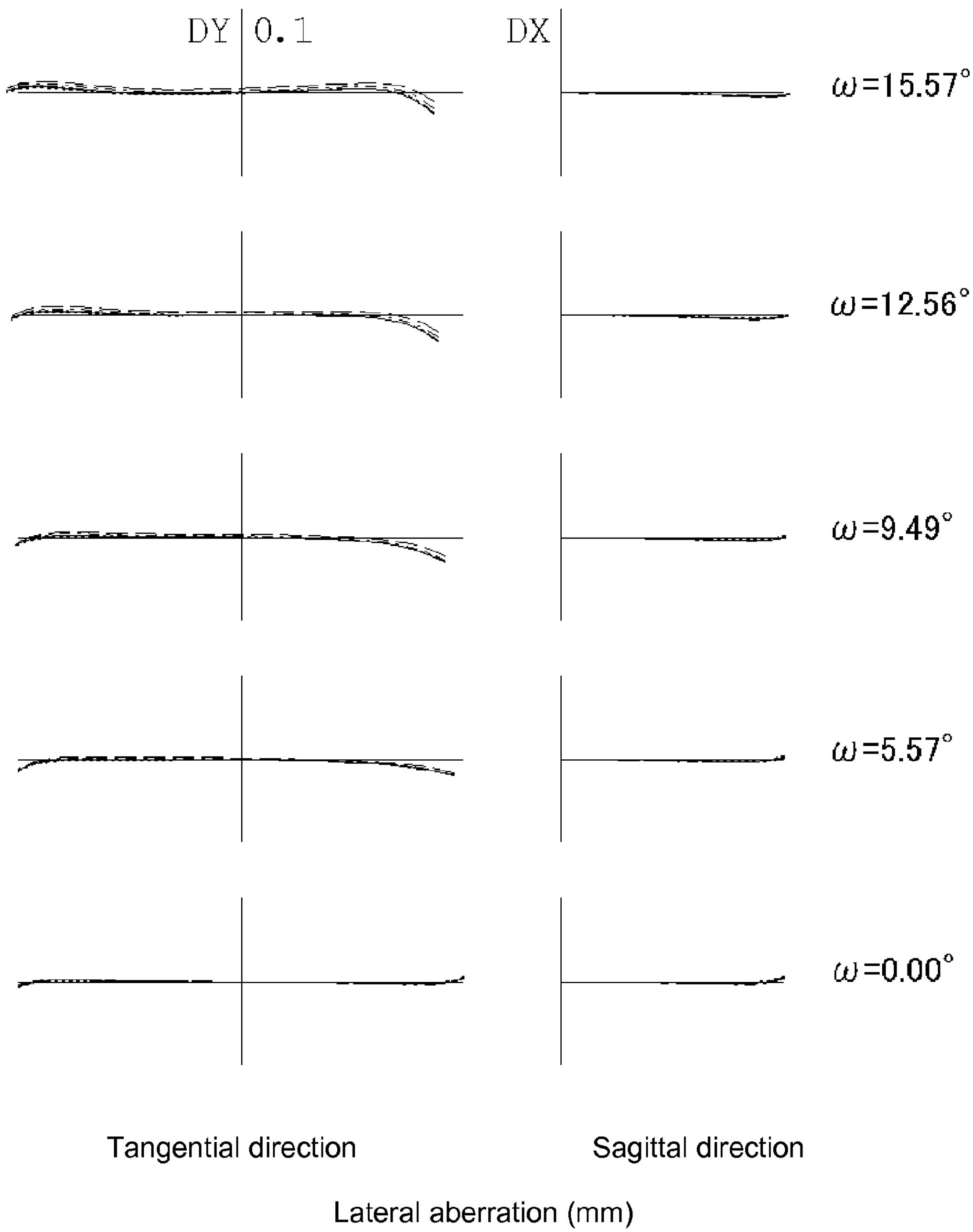
FIG. 18 is an aberration diagram showing a lateral aberration of the zoom lens shown in FIG. 16 at the midpoint.
Figure 19:
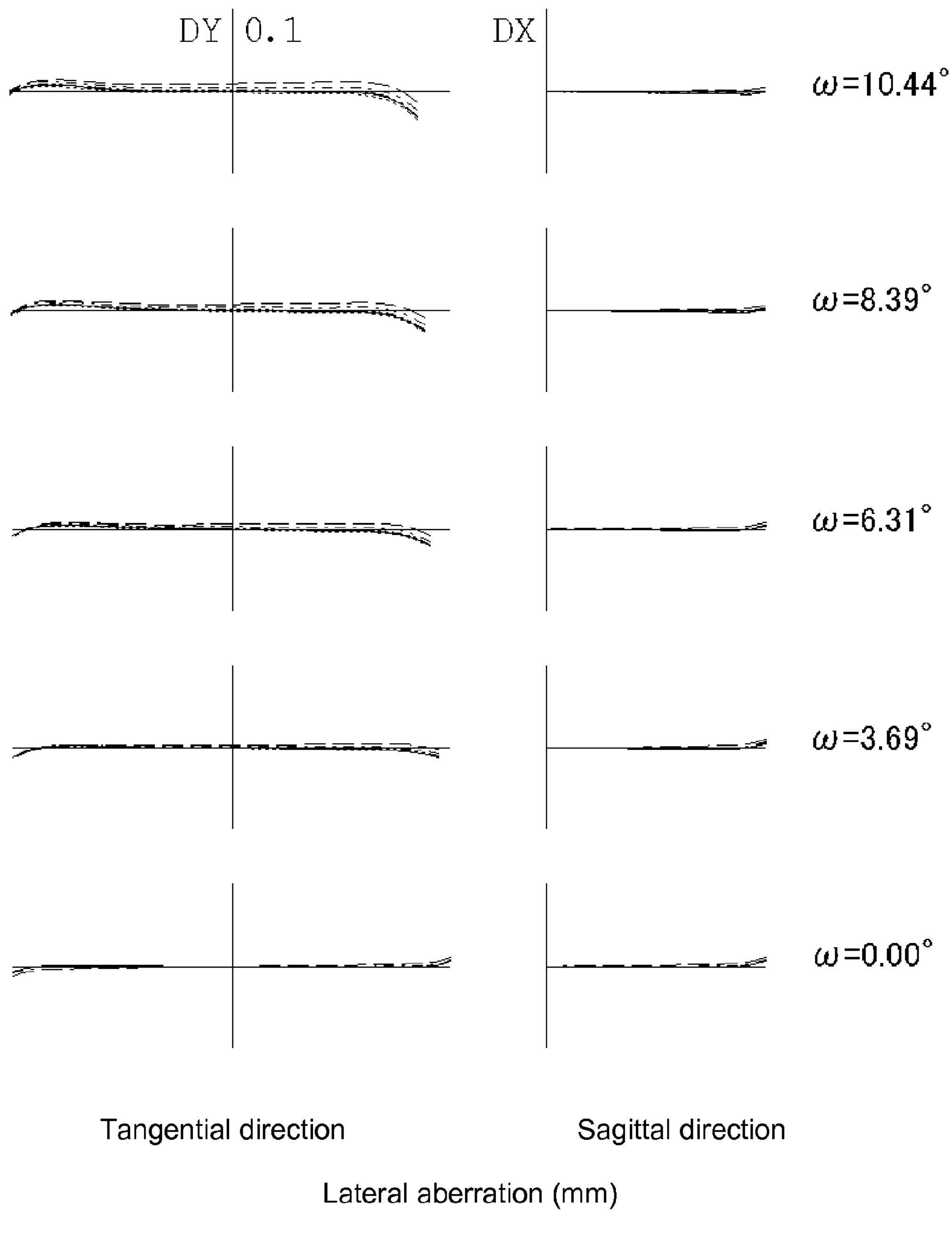
FIG. 19 is an aberration diagram showing a lateral aberration of the zoom lens shown in FIG. 16 at the telephoto end.
Figure 20:
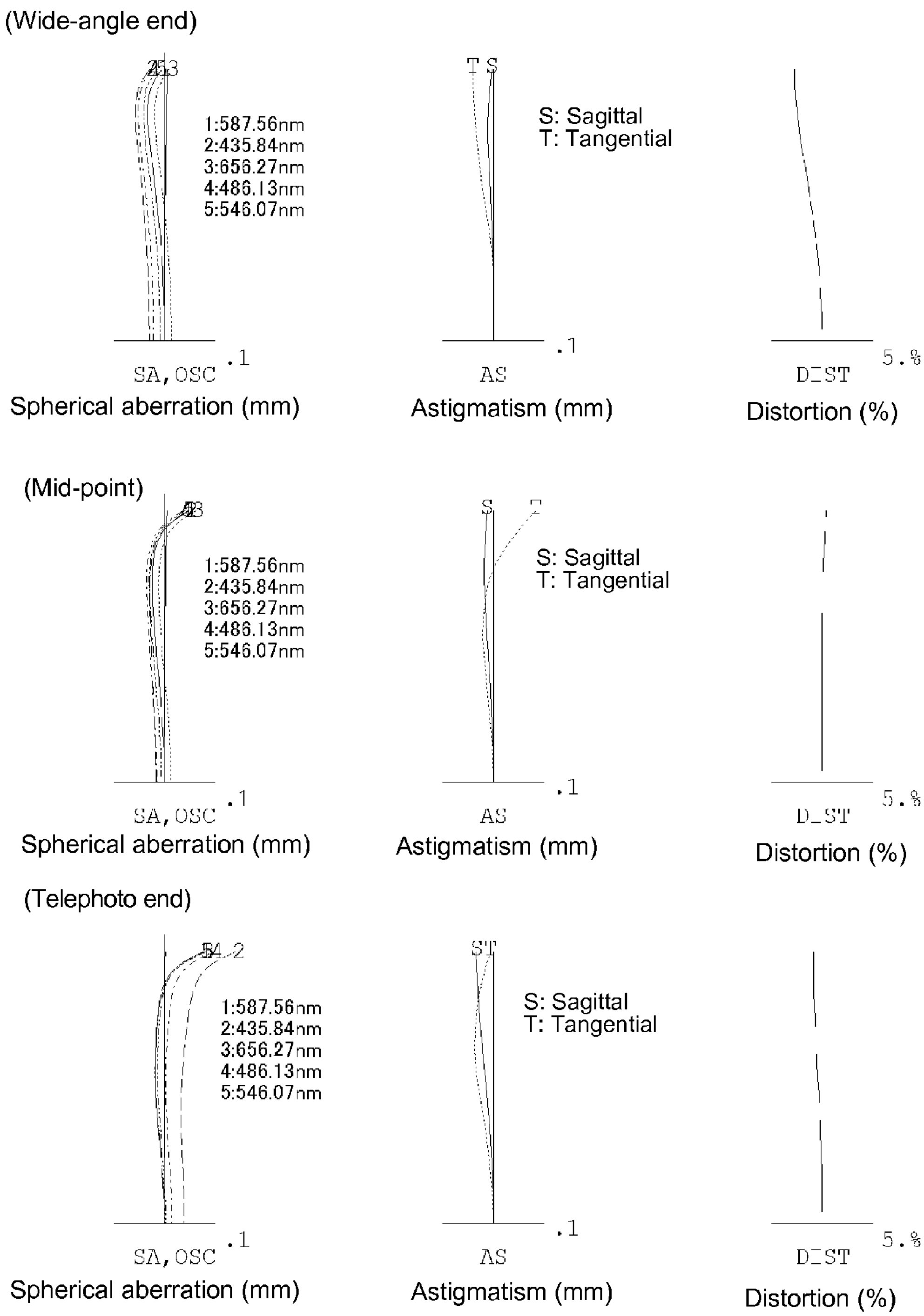
FIG. 20 is an aberration diagram showing a spherical aberration, an astigmatism, and a distortion of the zoom lens shown in FIG. 16.

FIGS. 17 to 19 show a lateral aberration that corresponds to a half angle of view ω in the zoom lens of Numerical Data Example 4, and FIG. 20 shows a spherical aberration SA (mm), an astigmatism AS (mm), and a distortion DIST (%), respectively. As shown in each diagram, even with the zoom lens of Numerical Data Example 4, it is possible to satisfactorily correct the image surface and suitably correct each aberration.

Figure 21:
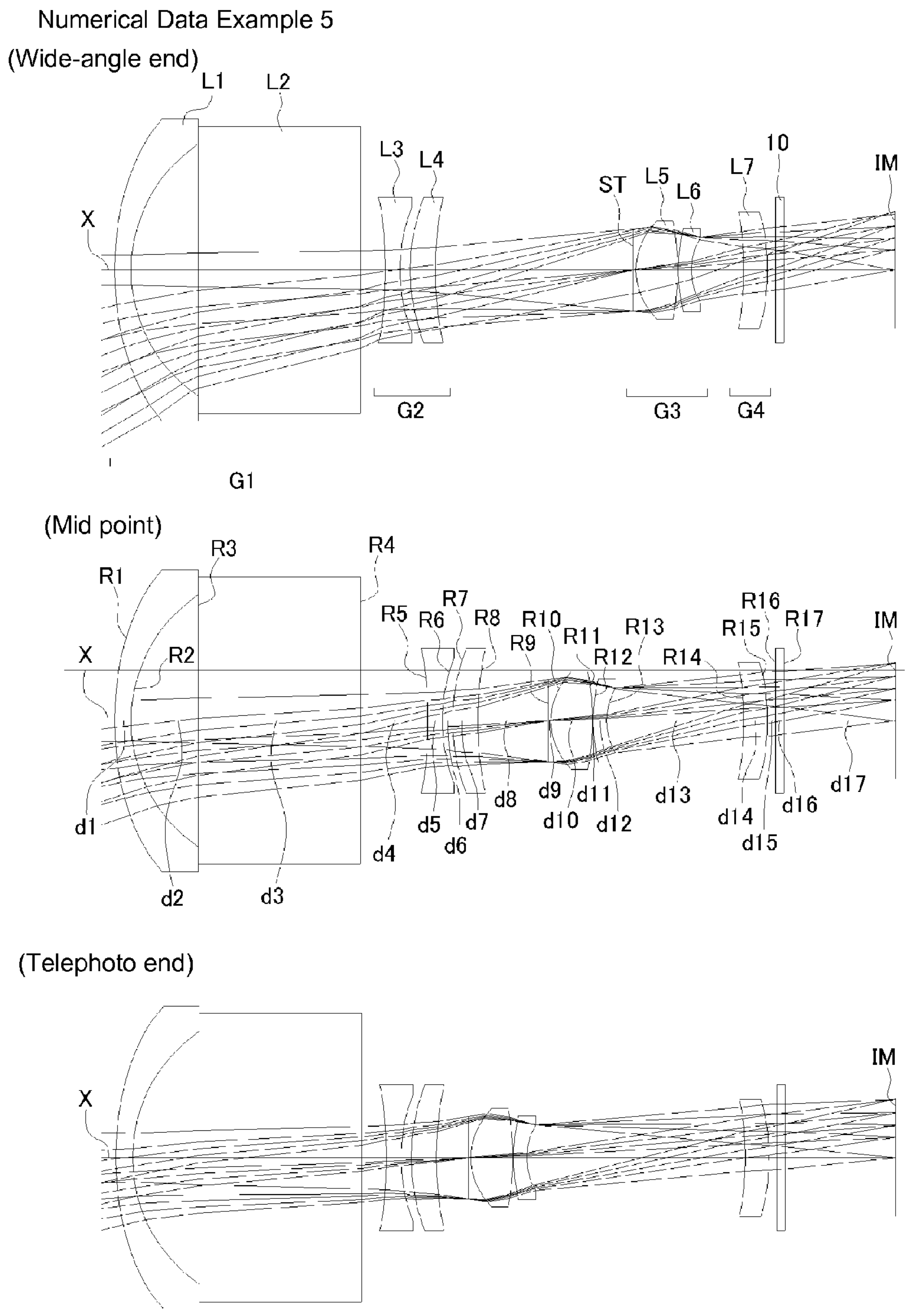
FIG. 21 shows sectional views of a zoom lens at a wide-angle end, a midpoint, and a telephoto end in Numerical Data Example 5 according to the embodiment of the invention.

Next, Numerical Data Example 5 of the zoom lens in the embodiment will be described. As shown in FIG. 21, also in Numerical Data Example 5, the second lens group G2 includes two lenses, the third lens L3 that is a biconcave lens and the fourth lens L4 that is a positive meniscus lens. The seventh lens L7 that composes the fourth lens group G4 has positive refractive power.

NUMERICAL DATA EXAMPLE 5

Basic lens data are shown below.

Unit: mm

Surface Data

| Surface Number i | R | d | Nd | νd |
|---|---|---|---|---|
| (Object) | ∞ | ∞ | | |
| 1* | 15.711 | 0.8000 | 1.52470 | 56.2 |
| 2* | 7.450 | 3.2000 | | |
| 3 | 0.000 | 7.8000 | 1.84666 | 23.8 |
| 4 | 0.000 | Variable | | |
| 5* | −24.818 | 0.7000 | 1.59201 | 67.0 |
| 6* | 8.093 | 0.5000 | | |
| 7 | 9.649 | 1.2000 | 1.62090 | 24.0 |
| 8 | 16.450 | Variable | | |
| 9 (Stop) | ∞ | 0.1300 | | |
| 10* | 3.097 | 2.0000 | 1.49700 | 81.6 |
| 11 | −12.858 | 0.0288 | | |
| 12* | 7.514 | 0.6500 | 1.58500 | 29.0 |
| 13* | 3.354 | Variable | | |
| 14* | −19.360 | 1.1300 | 1.52470 | 56.2 |
| 15* | −12.429 | 0.4000 | | |
| 16 | ∞ | 0.4000 | 1.51633 | 64.1 |
| 17 | ∞ | 5.3186 | | |
| (Image Plane) | ∞ | | | |

Other Data
Zoom Ratio: 2.768

| | Wide-Angle End | Midpoint | Telephoto End |
|---|---|---|---|
| Whole System Focal Length f | 4.342 | 7.999 | 12.017 |
| F number | 2.943 | 4.029 | 5.033 |
| Half Angle of View ω (°) | 32.82 | 19.29 | 13.12 |
| Image Height | 2.800 | 2.800 | 2.800 |
| Total Optical Track Length L | 37.31 | 37.31 | 37.31 |
| Back Focal Length BF | 5.982 | 5.982 | 5.982 |
| d4 | 1.190 | 3.230 | 1.180 |
| d8 | 9.500 | 3.379 | 1.539 |
| d13 | 2.500 | 6.580 | 10.471 |

f1 = −27.934
f2 = −14.201
f3 = 7.490
f2p = 35.209
f3p = 5.240
f3n = −10.990
fw = 4.342

| Aspheric Surface Data |
|---|
| First Surface |
| k = 2.163775, $A_4$ = 9.937235E−05, $A_6$ = −3.248547E−06, $A_8$ = 5.647200E−08, $A_{10}$ = −1.959847E−10 |
| Second Surface |
| k = −9.452414E−02, $A_4$ = 9.470215E−05, $A_6$ = 1.178253E−06 |
| Fifth Surface |
| k = 4.252497, $A_4$ = −1.051598E−04, $A_6$ = −1.515000E−05, $A_8$ = −6.622635E−07, $A_{10}$ = −1.677425E−08, $A_{10}$ = 7.106758E−10, $A_{12}$ = 1.845039E−10 |
| Sixth Surface |
| k = −3.537139E−01, $A_4$ = −1.445196E−04, $A_6$ = −2.129121E−06, $A_8$ = 1.644866E−07, $A_{10}$ = 1.162461E−08 |

-continued

| Unit: mm |
|---|
| Tenth Surface |
| k = −7.167749E−01, $A_4$ = 1.512412E−03, $A_6$ = 3.603297E−05 |
| Twelfth Surface |
| k = −2.704508, $A_4$ = −2.074347E−04, $A_6$ = −6.190862E−05, $A_8$ = −1.491898E−05, $A_{10}$ = −3.398433E−06 |
| Thirteenth Surface |
| k = 9.074216E−01, $A_4$ = 1.917555E−03, $A_6$ = 3.178066E−04, $A_8$ = 1.091077E−05, $A_{10}$ = −4.411835E−06, $A_{12}$ = −3.422084E−06, $A_{14}$ = −1.145360E−06, $A_{16}$ = 3.333784E−07 |
| Fourteenth Surface |
| k = −3.612189E+01, $A_4$ = −2.213052E−03, $A_6$ = 8.538079E−05 |
| Fifteenth Surface |
| k = −4.316267E+01, $A_4$ = −2.753232E−03, $A_6$ = 4.283014E−05 |

The values of the respective conditional expressions are as follows:

$$f3/f1=-0.268$$

$$f2/f2p=-0.403$$

$$f3/fw=1.725$$

$$|f3p/f3n|=0.477$$

Accordingly, the zoom lens of Numerical Data Example 5 satisfies the conditional expressions (1) to (4).

Figure 22:
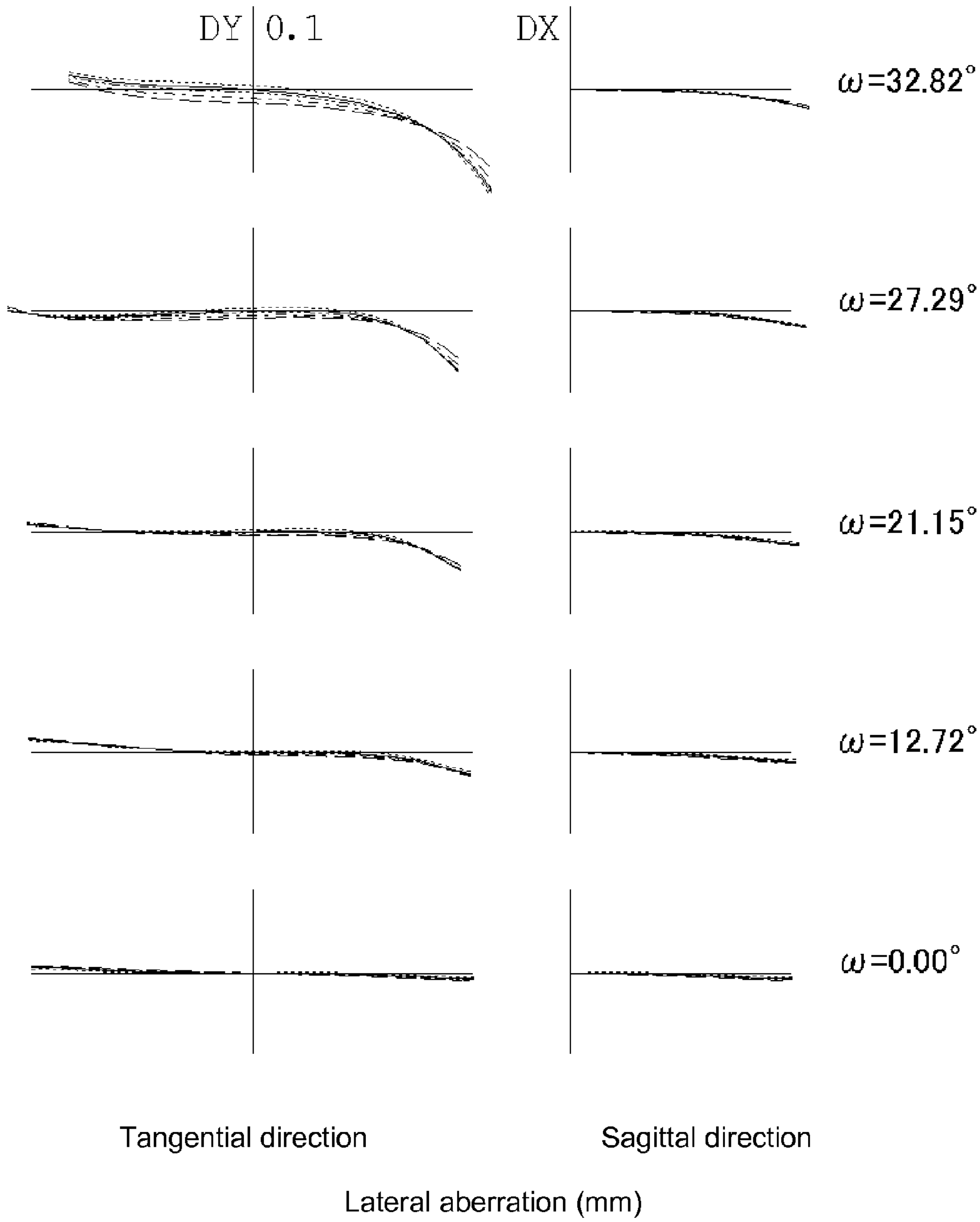
FIG. 22 is an aberration diagram showing a lateral aberration of the zoom lens shown in FIG. 21 at the wide-angle end.
Figure 23:
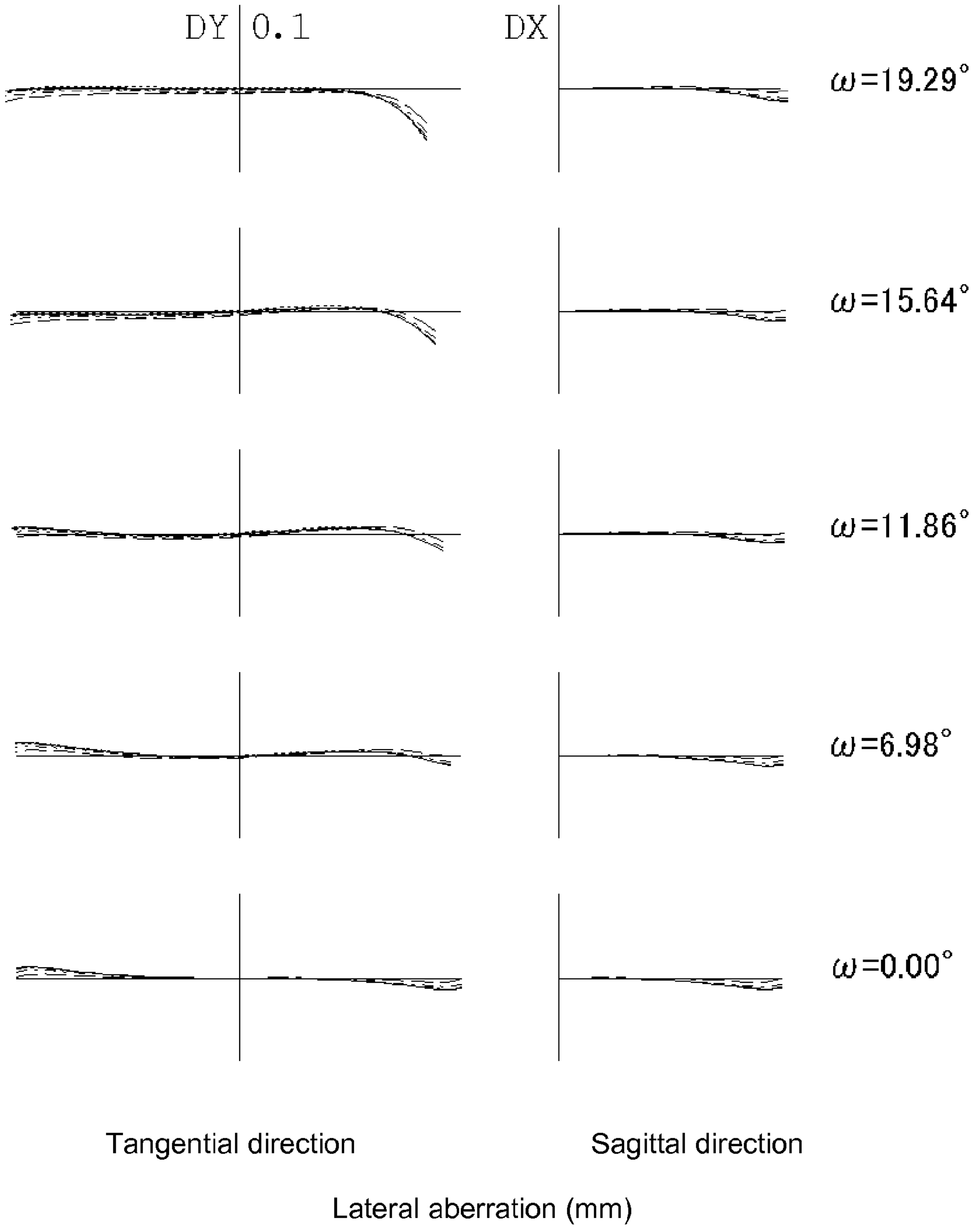
FIG. 23 is an aberration diagram showing a lateral aberration of the zoom lens shown in FIG. 21 at the midpoint.
Figure 24:
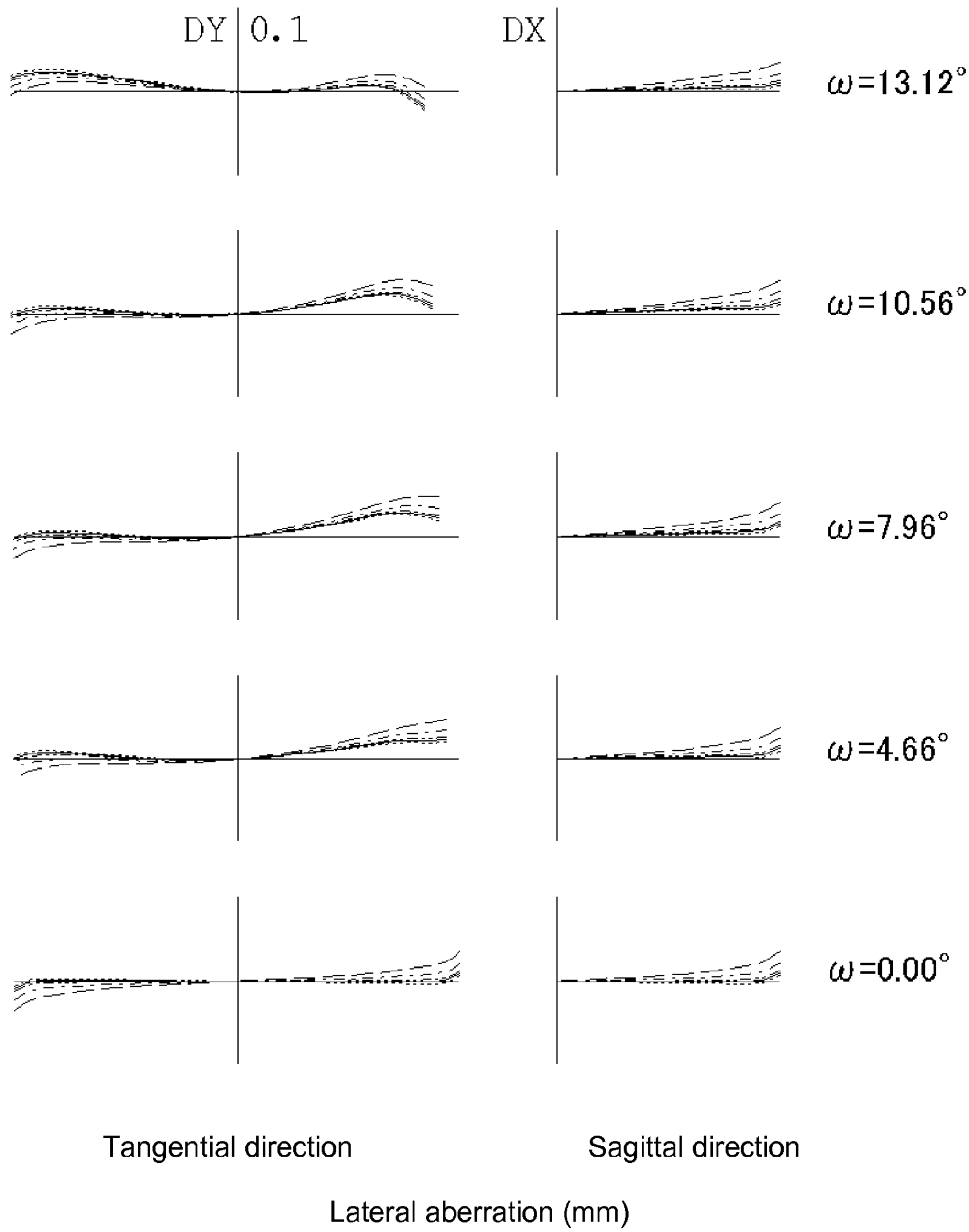
FIG. 24 is an aberration diagram showing a lateral aberration of the zoom lens shown in FIG. 21 at the telephoto end.
Figure 25:
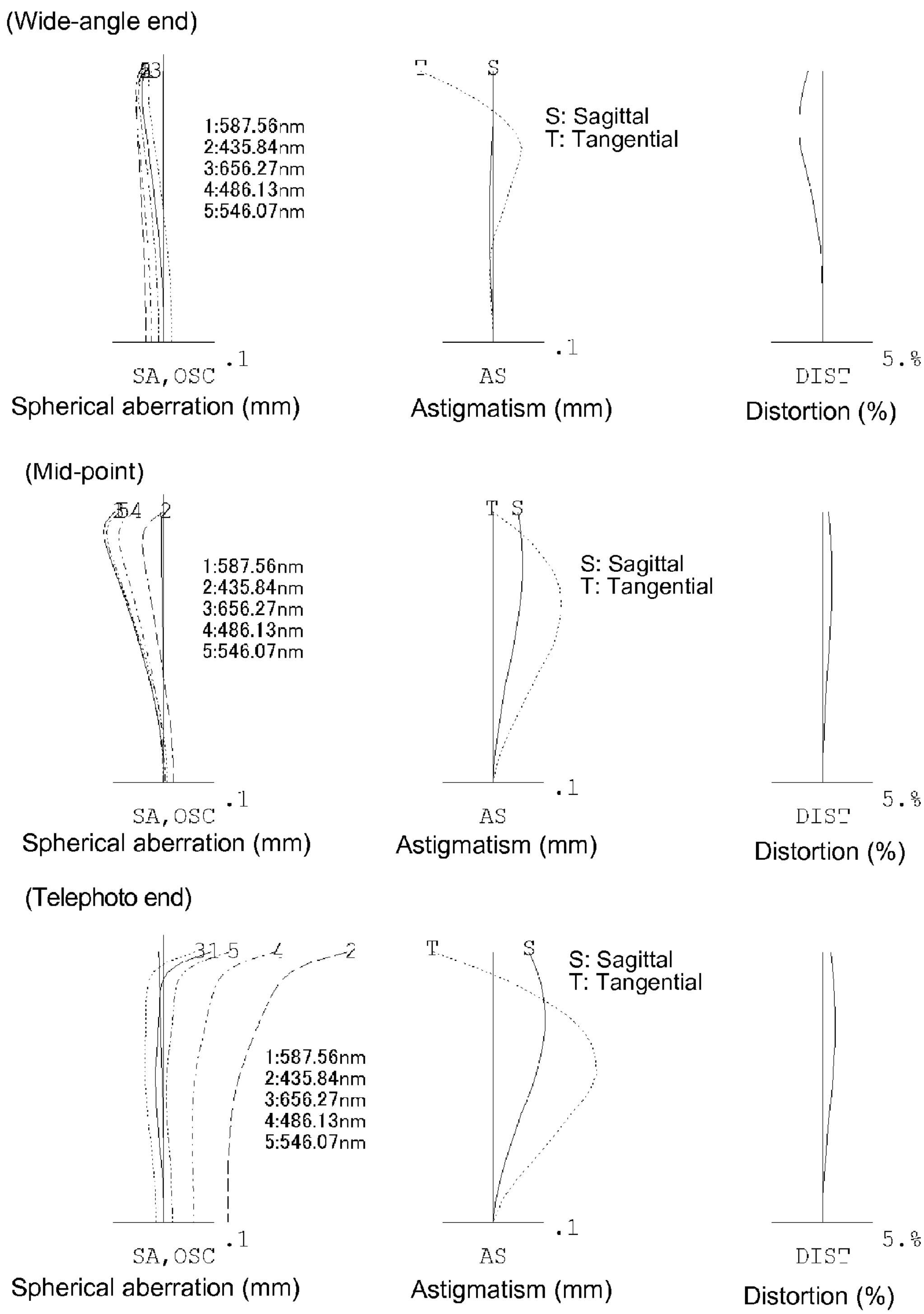
FIG. 25 is an aberration diagram showing a spherical aberration, an astigmatism, and a distortion of the zoom lens shown in FIG. 21.

FIGS. 22 to 24 show a lateral aberration that corresponds to a half angle of view ω in the zoom lens of Numerical Data Example 5, and FIG. 25 shows a spherical aberration SA (mm), an astigmatism AS (mm), and a distortion DIST (%), respectively. As shown in each diagram, even with the zoom lens of Numerical Data Example 5, it is possible to satisfactorily correct the image surface and suitably correct each aberration.

(Third Embodiment)

Figure 26:
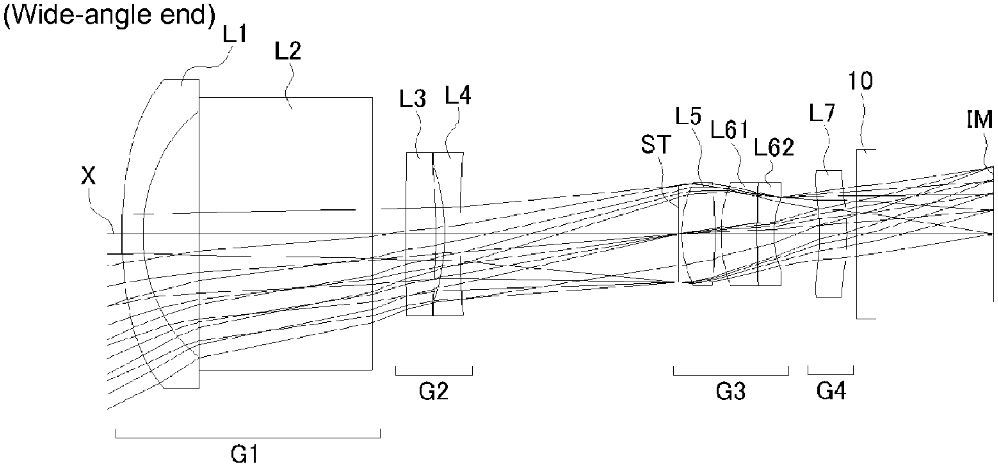
FIG. 26 shows sectional views of a zoom lens at a wide-angle end, a midpoint, and a telephoto end in Numerical Data Example 6 according to a third embodiment.
Figure 26:
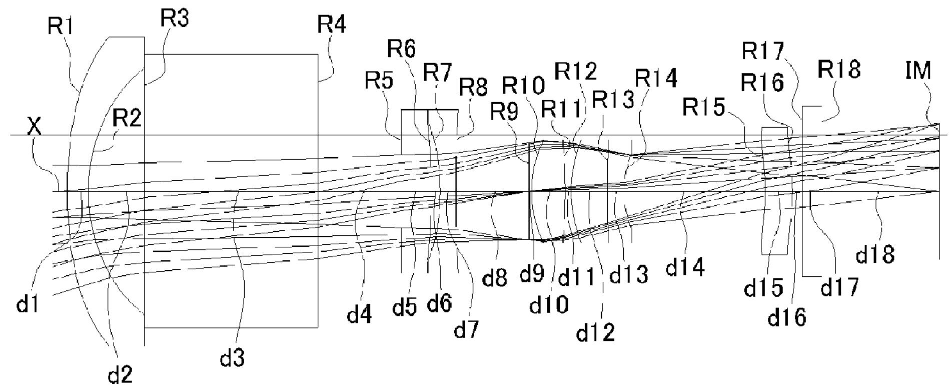
Figure 26:
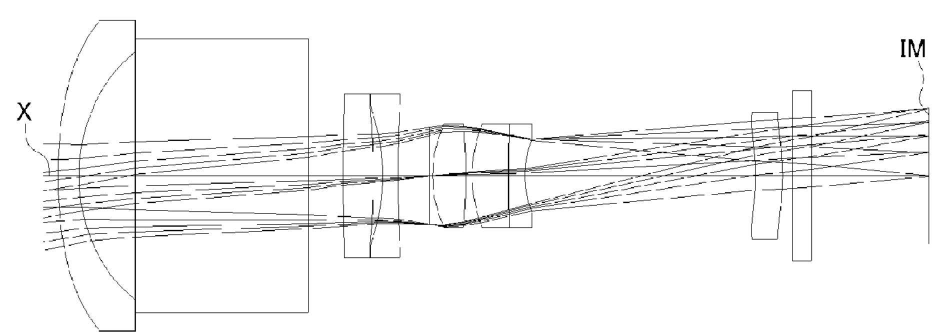

As shown in FIG. 26, similarly to the zoom lenses of the first and the second embodiments, the zoom lens of a third embodiment includes a first lens group G1 having negative refractive power; a second lens group G2 having negative refractive power; a third lens group G3 having positive refractive power; and a fourth lens group G4 having positive refractive power, arranged in the order from the object side. There is provided a cover glass 10 arranged between the fourth lens group G4 and an image plane of the imaging element.

The zoom lens of the embodiment is also configured so that the first lens group G1 and the fourth lens group G4 are fixed and the second lens group G2 and the third lens group G3 move along the optical axis. As the third lens group G3 moves, the magnification changes, and as the second lens group G2 move, focusing and back focus adjustment work.

Here, in the embodiment, the configuration of the third lens group G3 is different from those in the first and the second embodiments. The third lens group G3 of the embodiment includes a stop ST; the front group lens L5 that is a biconvex lens; and a rear group lens L6 that is composed bonding a positive and a negative meniscus lenses that direct their convex surfaces to the object side. More specifically, The rear group lens L6 is a bonded lens of an object-side rear group lens L61 that has a shape of a meniscus lens and positive refractive power; and an image plane-side rear group lens L62 that has negative refractive power and a shape of a meniscus lens.

As described above, in the zoom lens of the embodiment, since the rear group lens of the third lens group G3 is made of a bonded lens of a positive lens and a negative lens, it is possible to satisfactorily correct chromatic aberration. Here, the rear group lens can be any as long as it is a combination of a lens having positive refractive power and a lens having negative refractive power, and for example, it is composed of a bonded lens of a biconvex lens and a biconcave lens or two separate lenses, a positive lens and a negative lens.

The lens configurations of those other than that of the third lens group G3 is similar to that of the zoom lens of the second embodiment. More specifically, the first lens group G1 includes the first lens L1 that is a negative meniscus lens directing a convex surface thereof to the object side; a prism L2 (light path changing member) that reflects an incident light beam to perpendicularly bend the light path. The second lens group G2 is made of two lenses, the third lens L3 that is a biconvex lens and the fourth lens L4 that is a biconcave lens. Among them, an object-side surface of the third lens L3 is formed as an aspheric shape having an inflection point.

The fourth lens group G4 is made of a seventh lens L7 that is a positive meniscus lens directing a concave surface to the object side. Similarly to Numerical Data Example 2, the seventh lens L7 is also formed as an aspheric shape having an inflection point.

Hereunder, Numerical Data Example 6 of the zoom lens according to the embodiment will be described.

NUMERICAL DATA EXAMPLE 6

Basic lens data are shown below.

Unit: mm

Surface Data

| Surface Number i | R | d | Nd | νd |
|---|---|---|---|---|
| (Object) | ∞ | ∞ | | |
| 1* | 14.415 | 0.7000 | 1.52470 | 56.2 |
| 2* | 5.900 | 1.8500 | | |
| 3 | 0.000 | 5.7000 | 1.84666 | 23.8 |
| 4 | 0.000 | Variable | | |
| 5* | 68.510 | 1.0000 | 1.58500 | 29.0 |
| 6* | −23.782 | 0.3000 | | |
| 7 | −6.822 | 0.5000 | 1.61800 | 63.4 |
| 8 | 40.248 | Variable | | |
| 9 (Stop) | ∞ | 0.1000 | | |
| 10* | 3.866 | 1.1000 | 1.52470 | 56.2 |
| 11* | −17.947 | 0.2000 | | |
| 12 | 4.577 | 1.2000 | 1.74400 | 44.9 |
| 13 | 50.024 | 0.5500 | 1.80486 | 24.7 |
| 14* | 3.568 | Variable | | |
| 15* | −9.402 | 0.9000 | 1.52470 | 56.2 |
| 16* | −8.246 | 0.3200 | | |
| 17 | ∞ | 0.6400 | 1.51633 | 64.1 |
| 18 | ∞ | 3.8802 | | |
| (Image Plane) | ∞ | | | |

Other Data
Zoom Ratio: 2.800

| | Wide-Angle End | Midpoint | Telephoto End |
|---|---|---|---|
| Whole System Focal Length f | 3.968 | 7.360 | 11.110 |
| F number | 3.018 | 4.206 | 5.322 |
| Half Angle of View ω (°) | 29.55 | 17.00 | 11.45 |

-continued

| Unit: mm | | | |
|---|---|---|---|
| Image Height | 2.250 | 2.250 | 2.250 |
| Total Optical Track Length L | 28.52 | 28.52 | 28.52 |
| Back Focal Length BF | 4.622 | 4.622 | 4.622 |
| d4 | 1.100 | 2.747 | 1.155 |
| d8 | 7.200 | 2.411 | 1.052 |
| d14 | 1.500 | 4.643 | 7.594 |
| f1 = −19.590 | | | |
| f2 = −13.969 | | | |
| f3 = 5.678 | | | |
| f2p = 30.299 | | | |
| f3p = 6.169 | | | |
| f3n = −39.267 | | | |
| fw = 3.968 | | | |

| Aspheric Surface Data |
|---|
| First Surface |
| k = 3.385885, $A_4$ = 4.092968E−05, $A_6$ = 1.432691E−05 |
| Second Surface |
| k = 3.187257E−01, $A_4$ = −1.432532E−04, $A_6$ = 2.742424E−05 |
| Fifth Surface |
| k = −7.452501E+02, $A_4$ = 1.374952E−04, $A_6$ = −1.639130E−05, $A_8$ = −7.964808E−06, $A_{10}$ = 4.193447E−07 |
| Sixth Surface |
| k = 3.610333E+01, $A_4$ = −4.387079E−04, $A_6$ = 9.202254E−05 |
| Tenth Surface |
| k = −5.980257E−01, $A_4$ = 6.699893E−04, $A_6$ = 3.535932E−05 |
| Eleventh Surface |
| k = 1.427255E+01, $A_4$ = −4.948741E−04, $A_6$ = −1.816462E−05, $A_8$ = 2.092921E−05, $A_{10}$ = 9.623156E−06 |
| Fourteenth Surface |
| k = 1.555918, $A_4$ = 3.638314E−03, $A_6$ = 7.979062E−04, $A_8$ = −9.953868E−05, $A_{10}$ = −2.406644E−04 |
| Fifteenth Surface |
| k = 1.145594E+01, $A_4$ = 9.439475E−04, $A_6$ = 1.779935E−03 |
| Sixteenth Surface |
| k = −3.548695E+01, $A_4$ = −6.780052E−03, $A_6$ = 1.898977E−03 |

The values of the respective conditional expressions are as follows:

$$f3/f1=-0.290$$

$$f2/f2p=-0.461$$

$$f3/fw=1.431$$

$$|f3p/f3n|=0.157$$

Accordingly, the zoom lens of Numerical Data Example 6 satisfies the conditional expressions (1) to (4).

Figure 27:
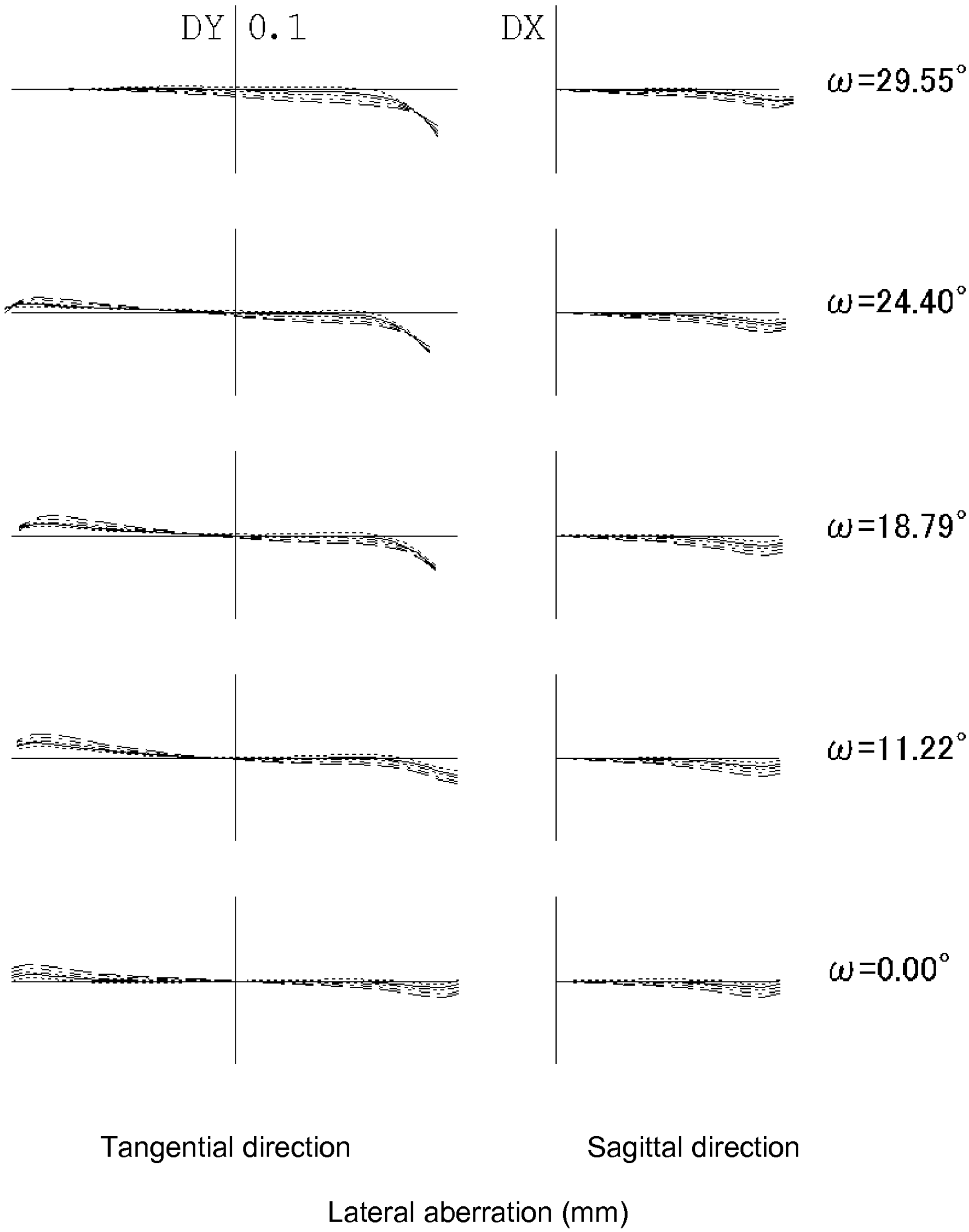
FIG. 27 is an aberration diagram showing a lateral aberration of the zoom lens shown in FIG. 26 at the wide-angle end.
Figure 28:
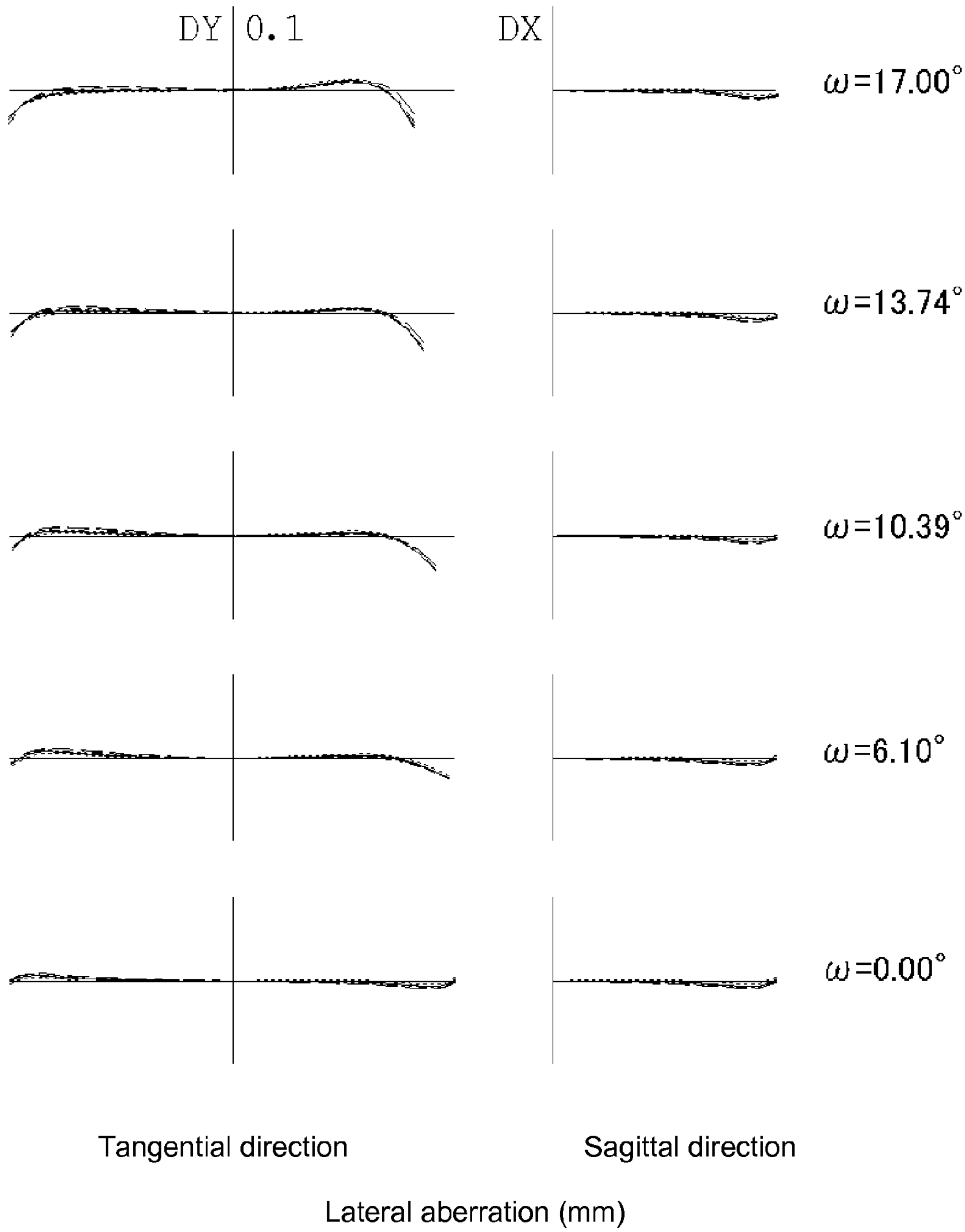
FIG. 28 is an aberration diagram showing a lateral aberration of the zoom lens shown in FIG. 26 at the midpoint.
Figure 29:
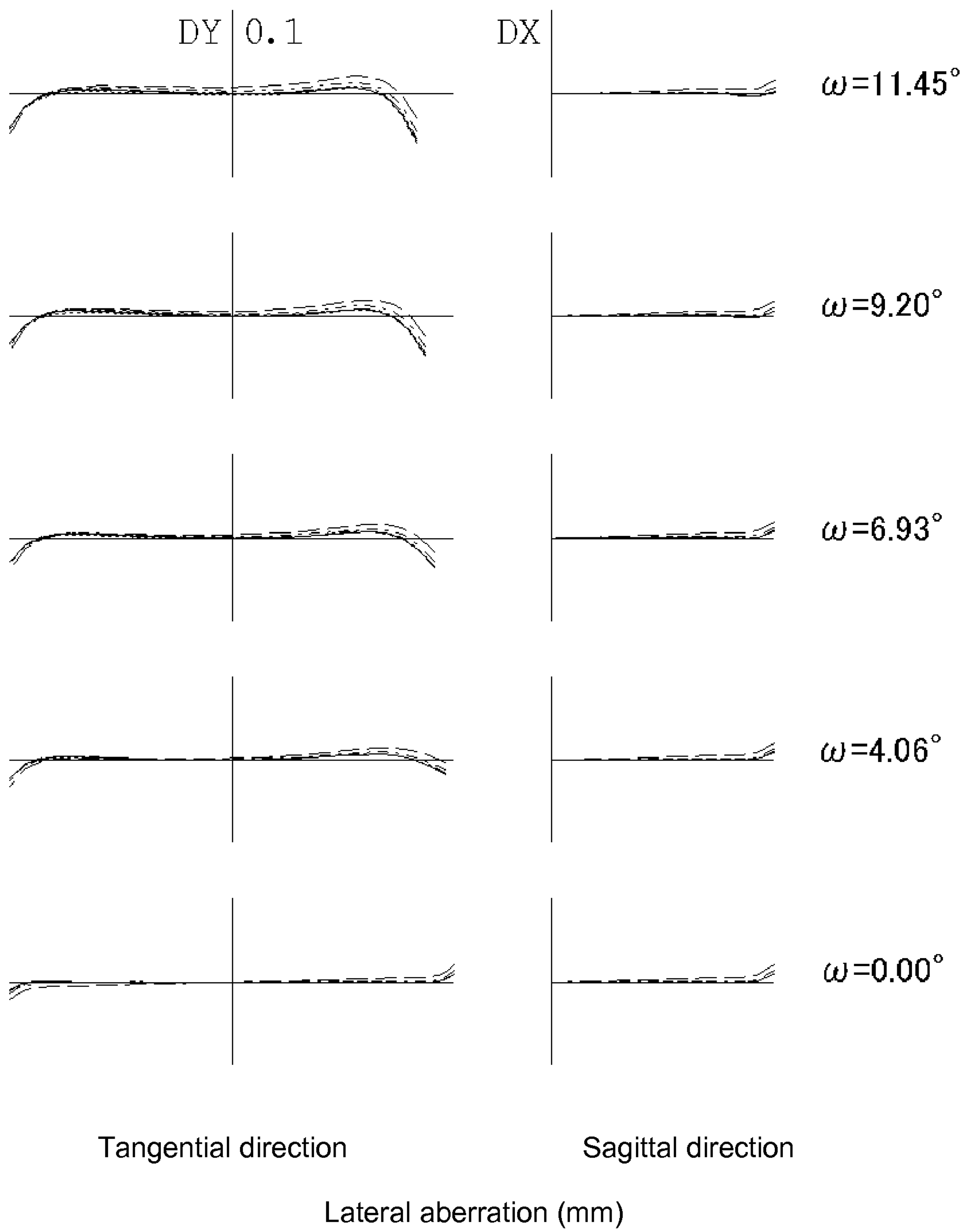
FIG. 29 is an aberration diagram showing a lateral aberration of the zoom lens shown in FIG. 26 at the telephoto end.
Figure 30:
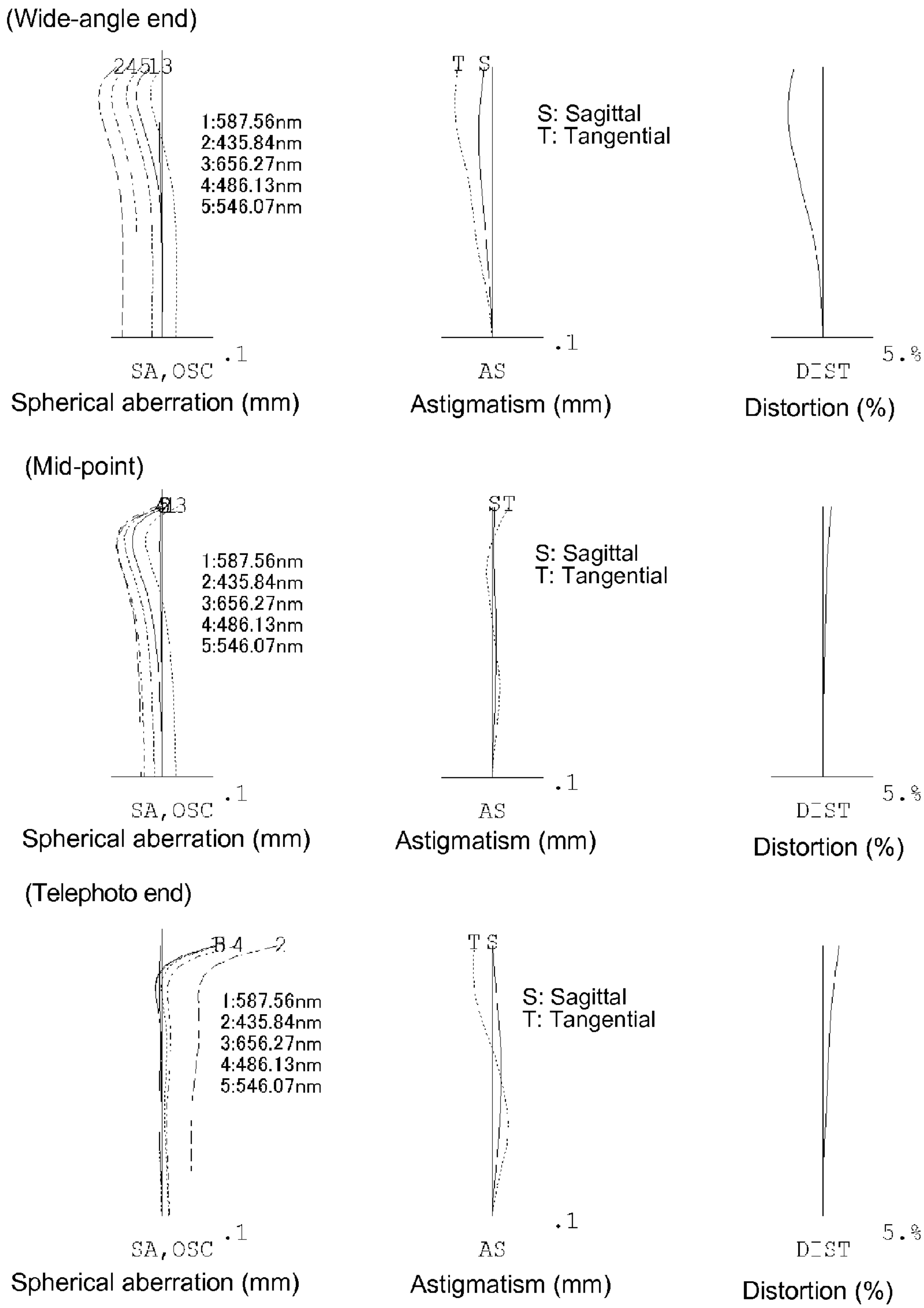
FIG. 30 is an aberration diagram showing a spherical aberration, an astigmatism, and a distortion of the zoom lens shown in FIG. 26.

FIGS. 27 to 29 show a lateral aberration that corresponds to a half angle of view ω in the zoom lens of Numerical Data Example 6, and FIG. 30 shows a spherical aberration SA (mm), an astigmatism AS (mm), and a distortion DIST (%), respectively. As shown in each diagram, even with the zoom lens of Numerical Data Example 6, it is possible to satisfactorily correct the image surface and suitably correct each aberration. Here, also in the embodiment, the refractive power of the seven lens L7 is not limited to positive, and can be negative.

Therefore, when the zoom lenses of the first to the third embodiments are applied in an imaging optical system such as cellular phones, digital still cameras, and portable information terminals, it is possible to attain both high performances and miniaturization of the camera.

The zoom lenses of the embodiments are configured so that a position of the second lens group G2 on the optical axis at the wide-angle end (W) and a position of the second lens group G2 on the optical axis at the telephoto end (T) are substantially agree to each other upon changing magnification, satisfying the above-described conditional expression (1). This characteristic is further described below.

Figure 31:
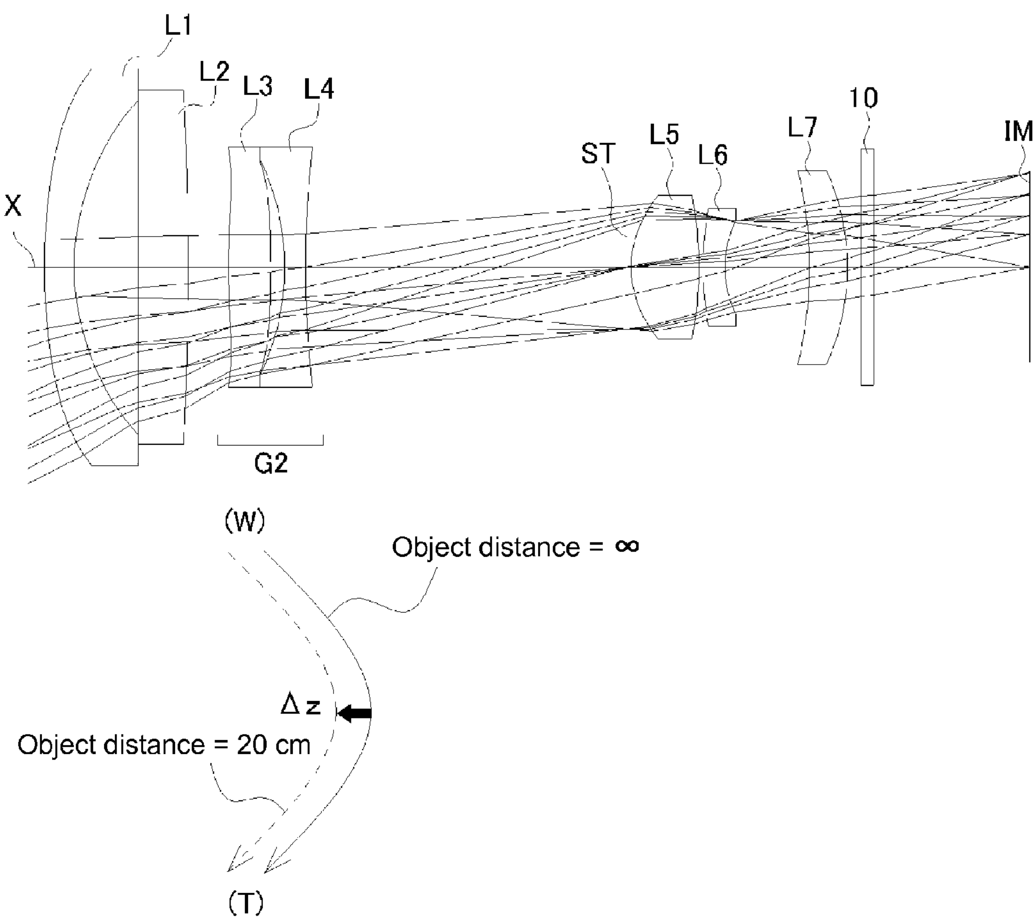
FIG. 31 is a schematic diagram of a track of movement of the second lens group in the zoom lens of Numerical Data Example 1 as an example of the zoom lenses according to the first to the third embodiments.
Figure 32:
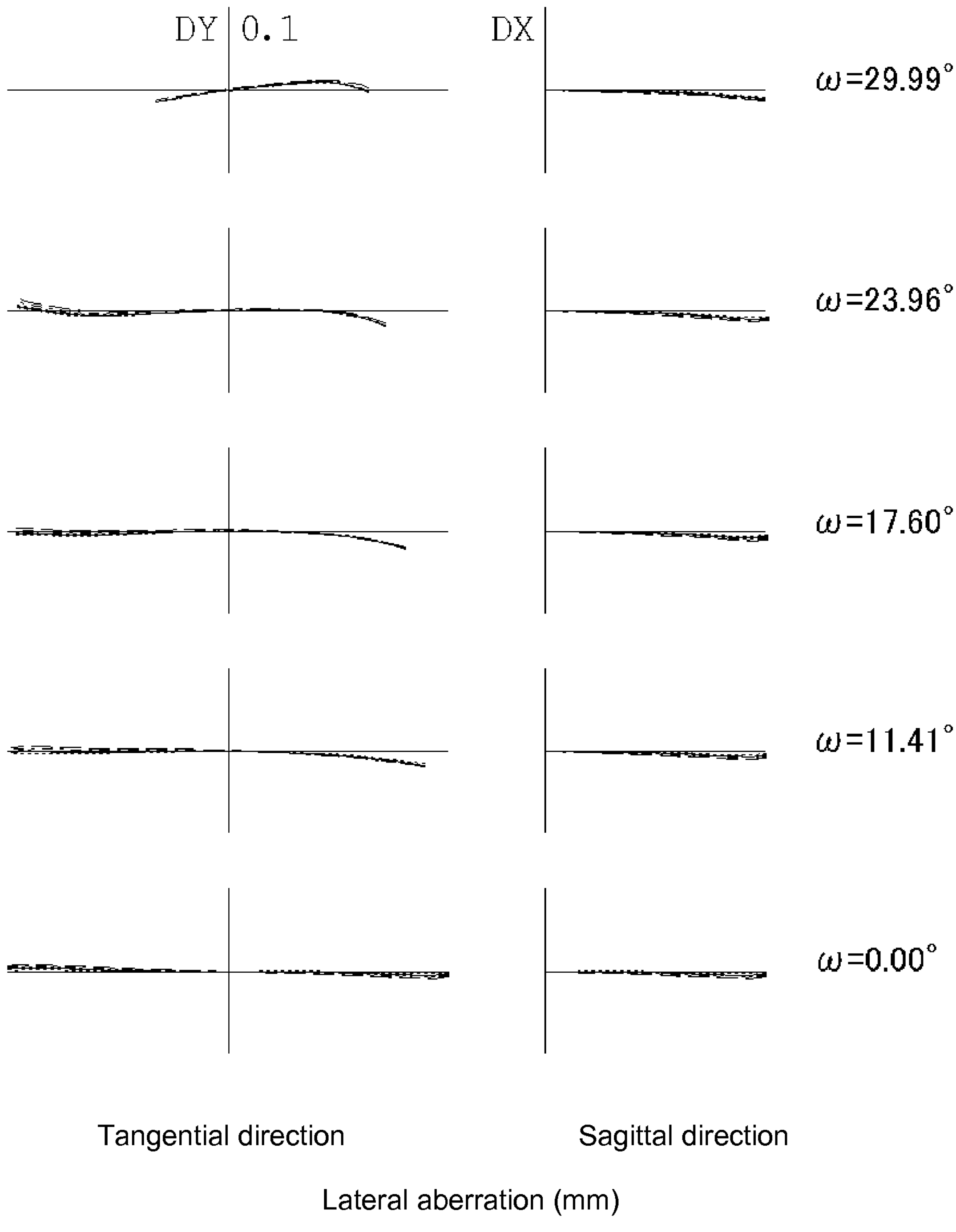
FIG. 32 is an aberration diagram showing a lateral aberration of the zoom lens shown in FIG. 1 at the wide-angle end when an object distance is 20 cm.
Figure 33:
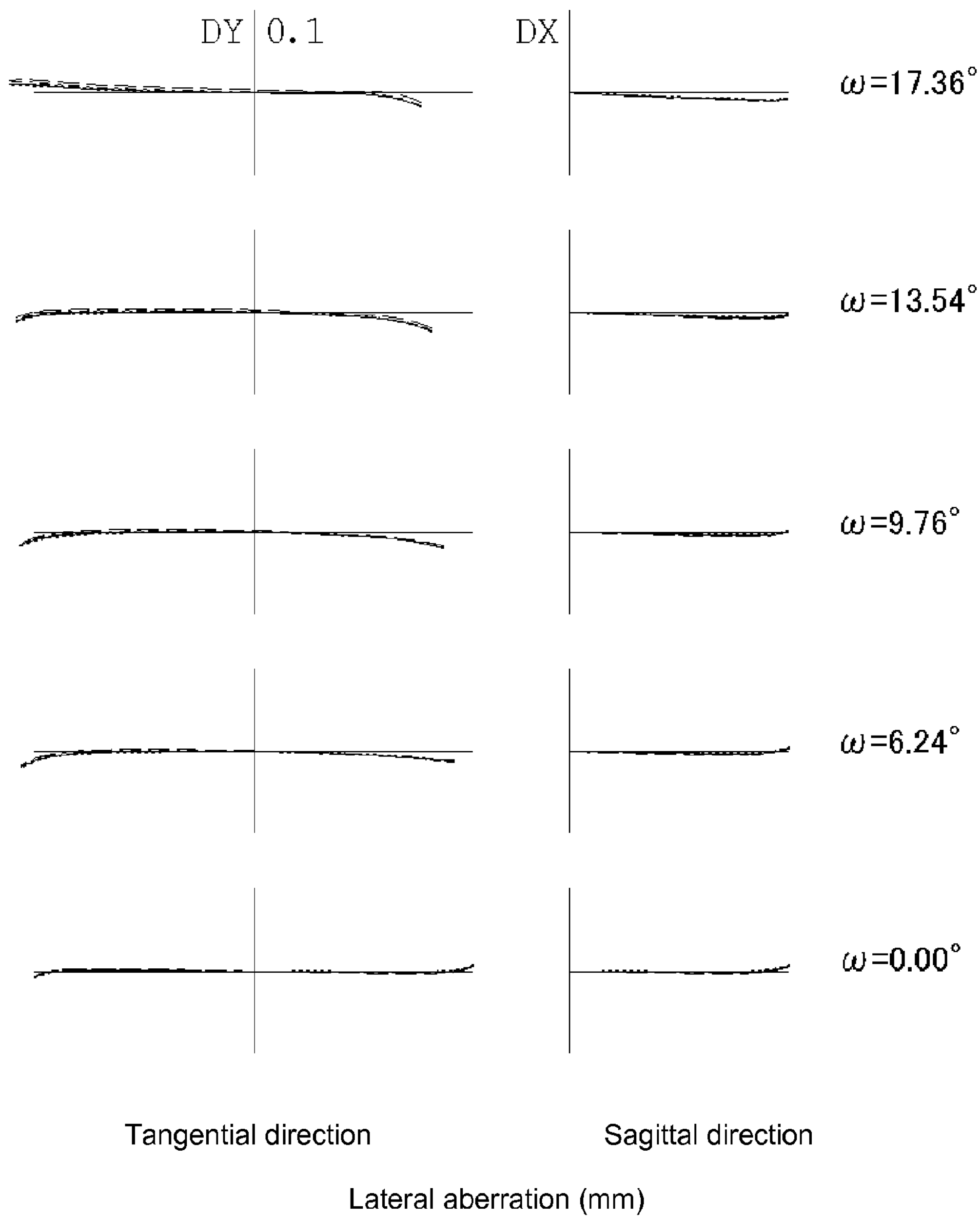
FIG. 33 is an aberration diagram showing a lateral aberration of the zoom lens shown in FIG. 1 at the midpoint when the object distance is 20 cm.
Figure 34:
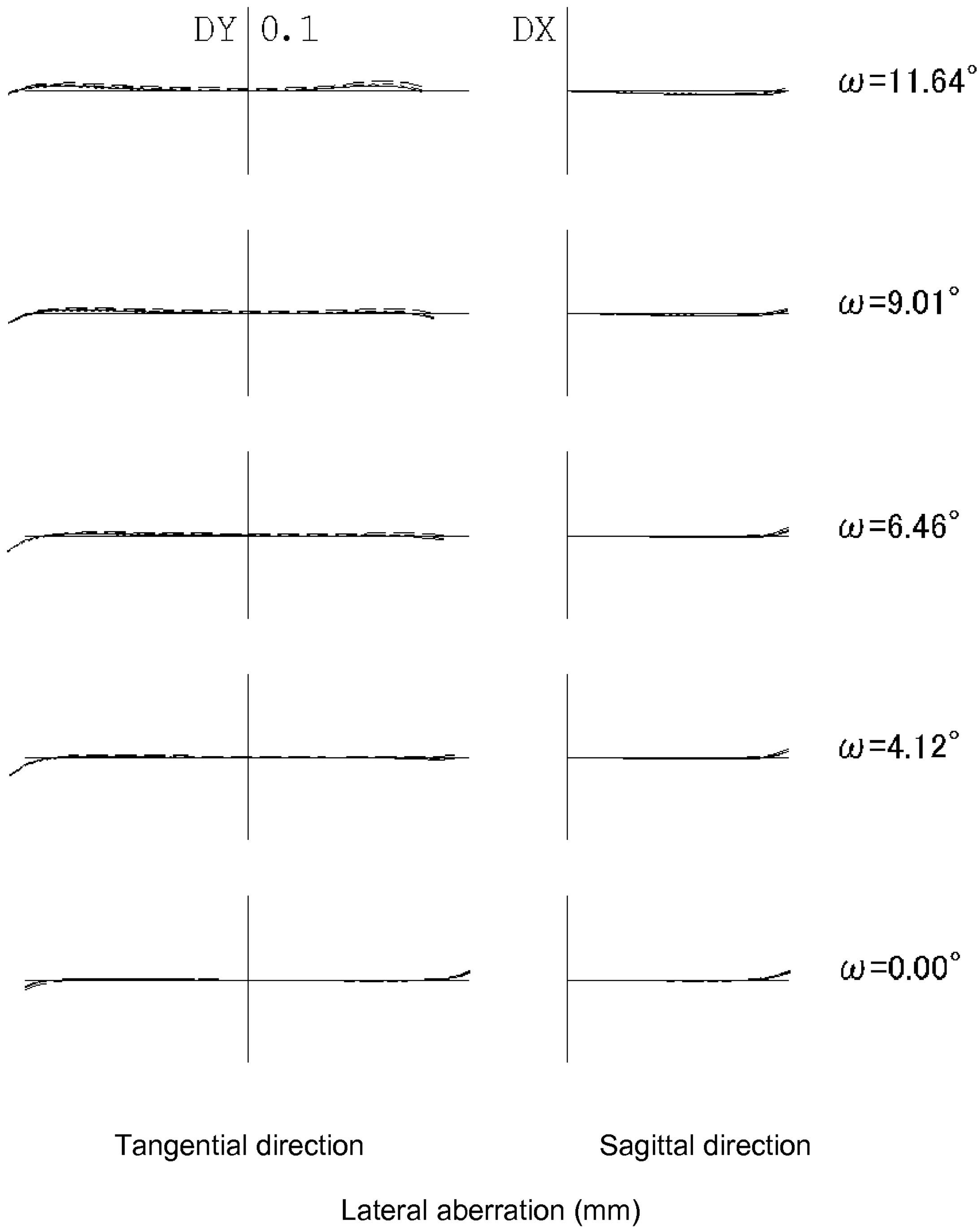
FIG. 34 is an aberration diagram showing a lateral aberration of the zoom lens shown in FIG. 1 at the telephoto end when the object distance is 20 cm.
Figure 35:
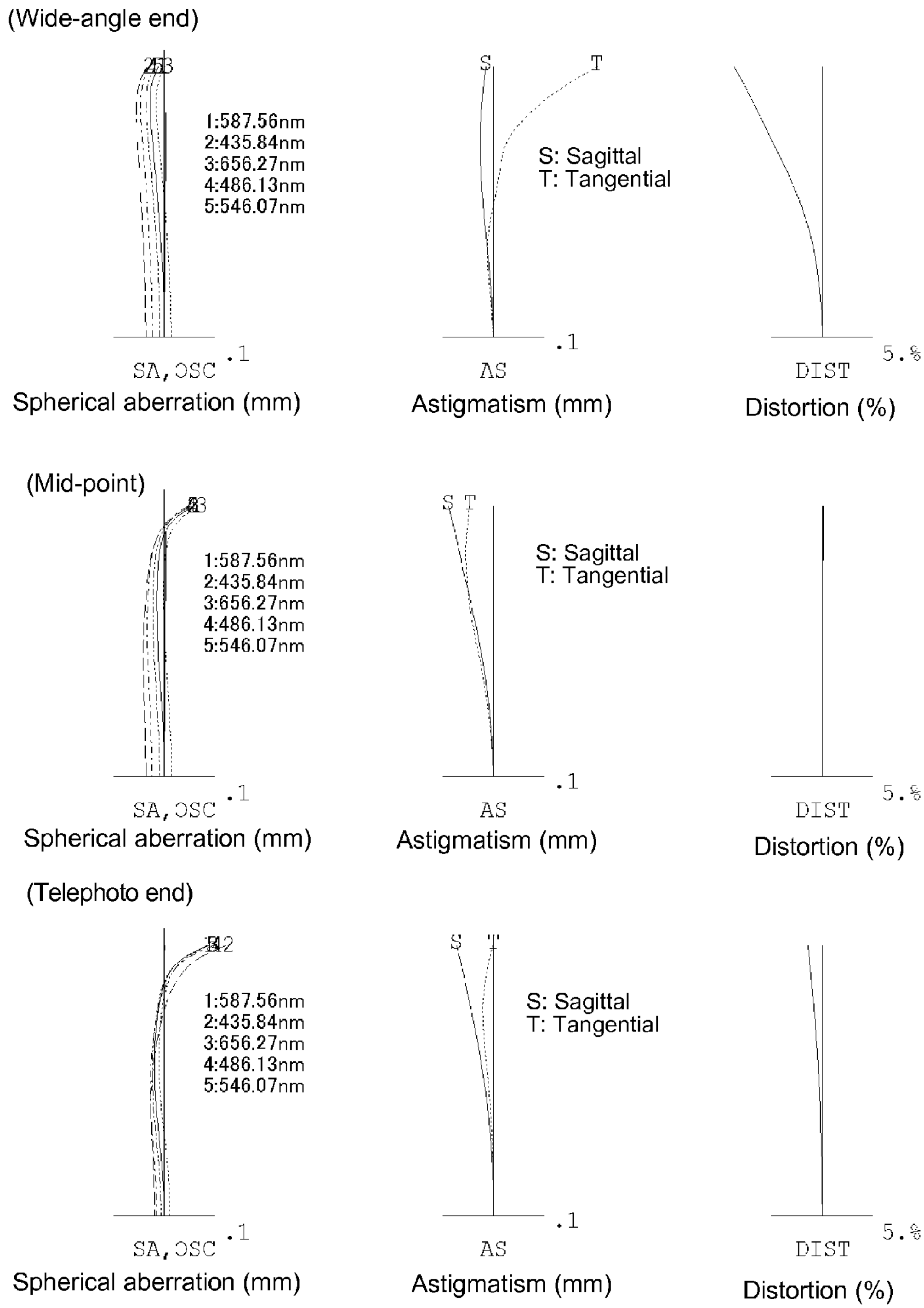
FIG. 35 is an aberration diagram showing a spherical aberration, an astigmatism, and a distortion of the zoom lens shown in FIG. 1 when the object distance is 20 cm.
Figure 36:
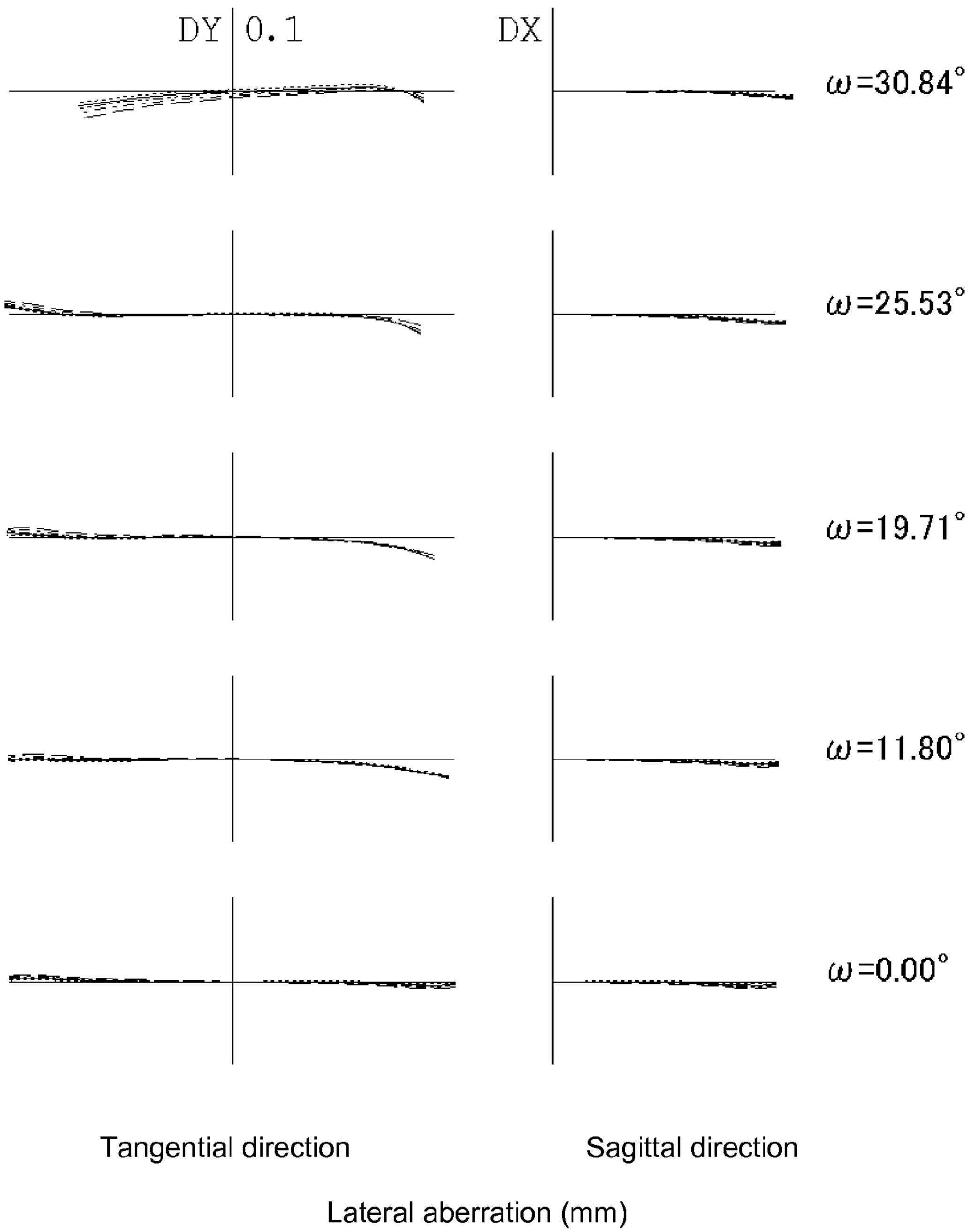
FIG. 36 is an aberration diagram showing a lateral aberration of the zoom lens shown in FIG. 6 at the wide-angle end when an object distance is 20 cm.
Figure 37:
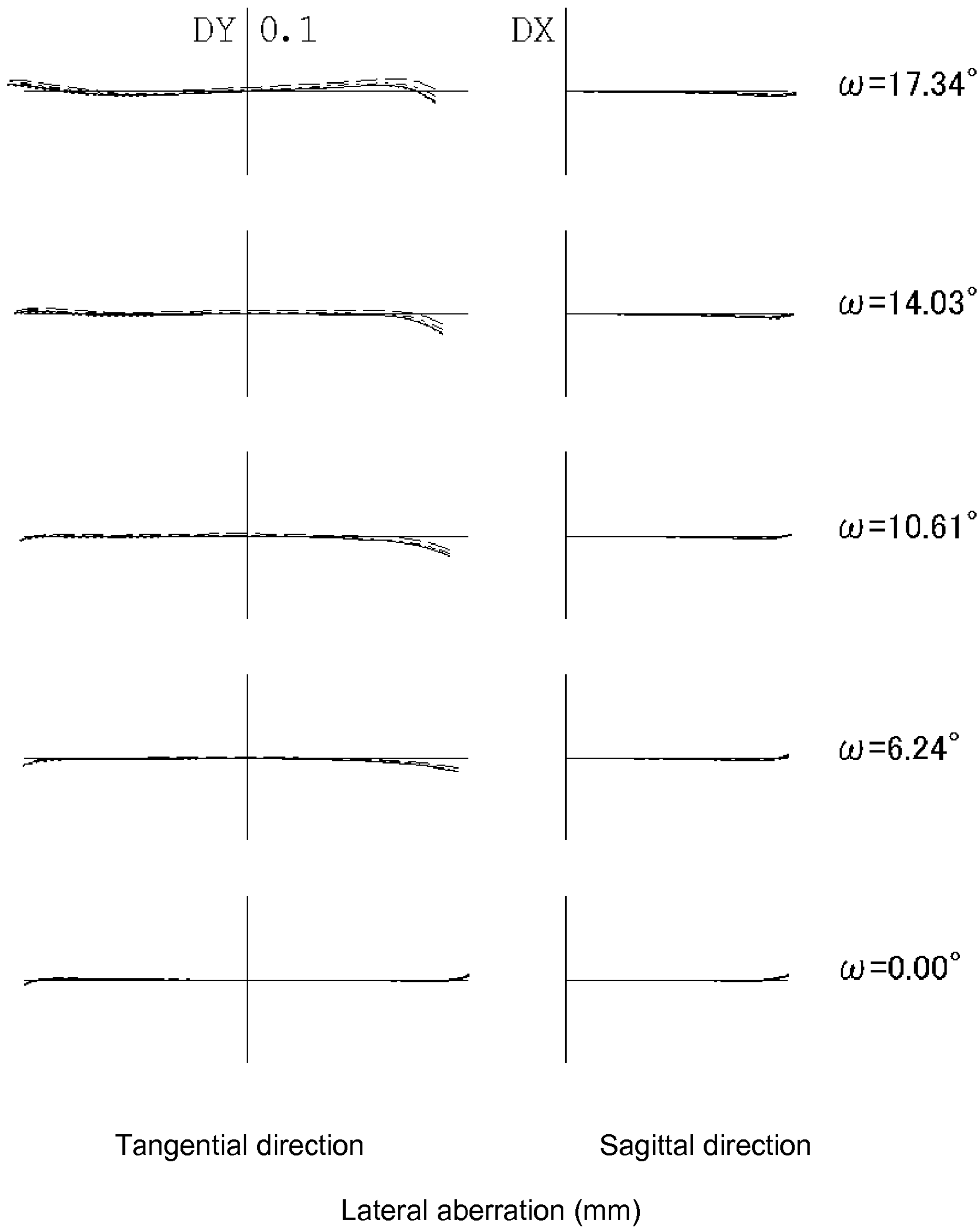
FIG. 37 is an aberration diagram showing a lateral aberration of the zoom lens shown in FIG. 6 at the midpoint when the object distance is 20 cm.
Figure 38:
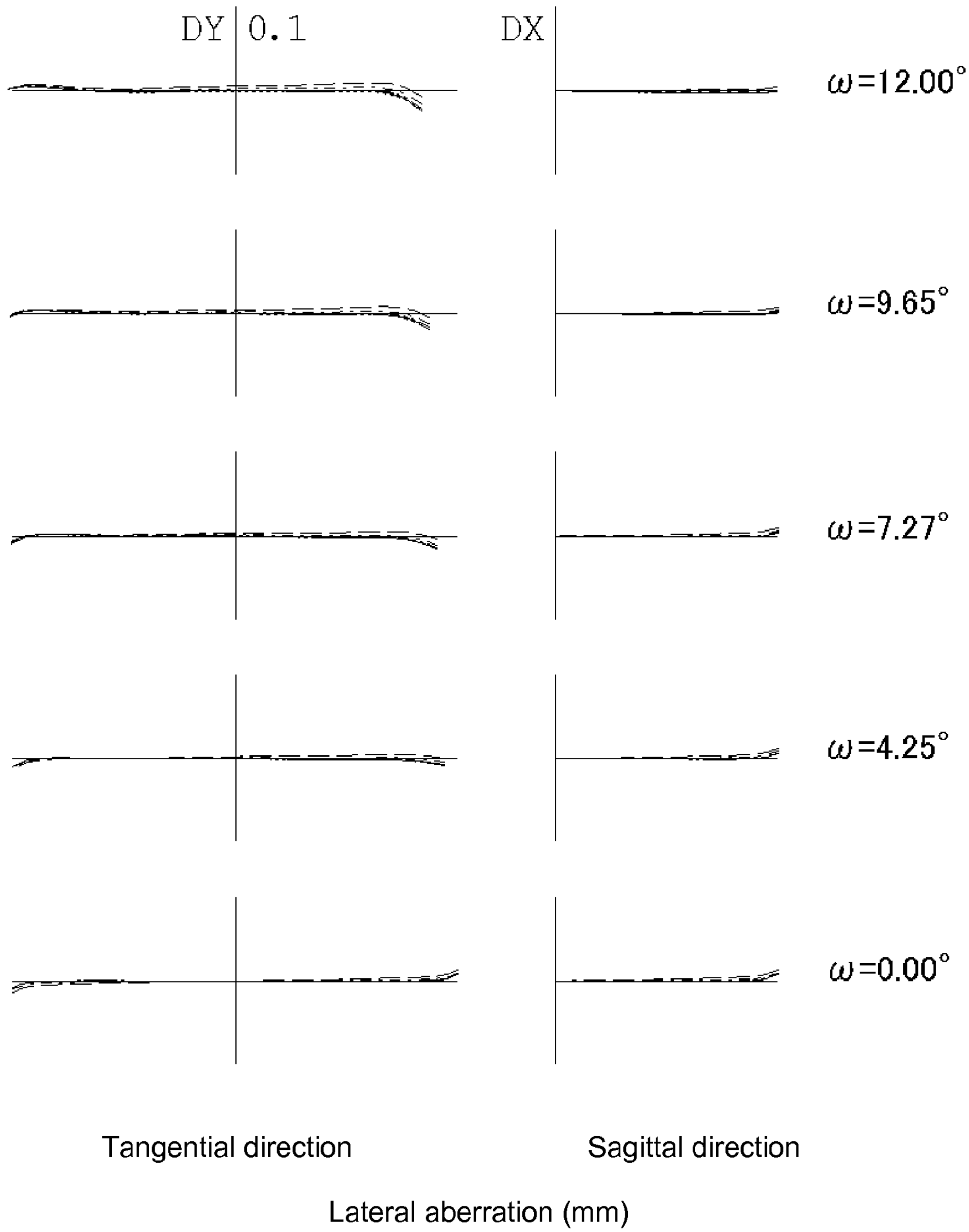
FIG. 38 is an aberration diagram showing a lateral aberration of the zoom lens shown in FIG. 6 at the telephoto end when the object distance is 20 cm.
Figure 39:
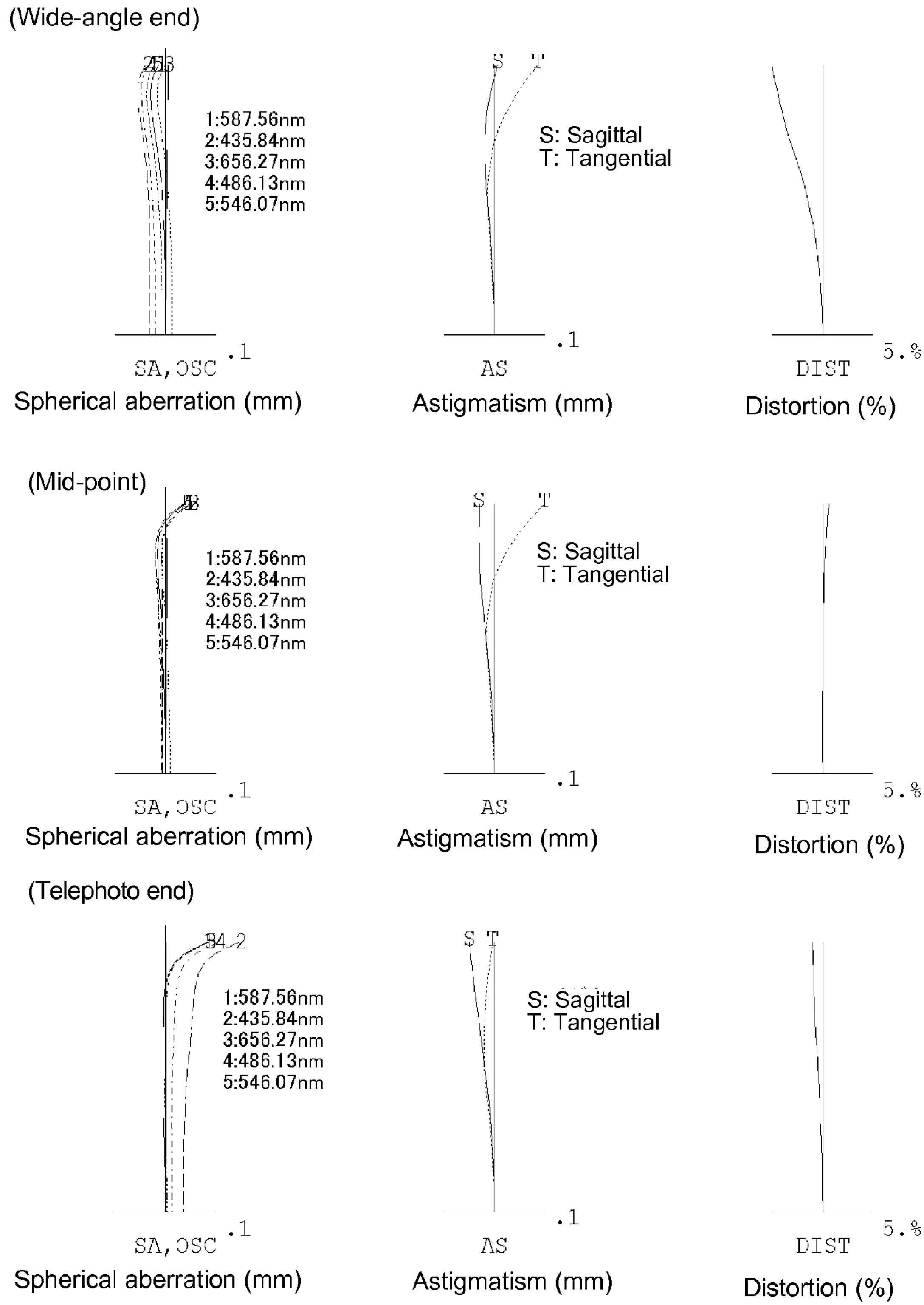
FIG. 39 is an aberration diagram showing a spherical aberration, an astigmatism, and a distortion of the zoom lens shown in FIG. 6 when the object distance is 20 cm.
Figure 40:
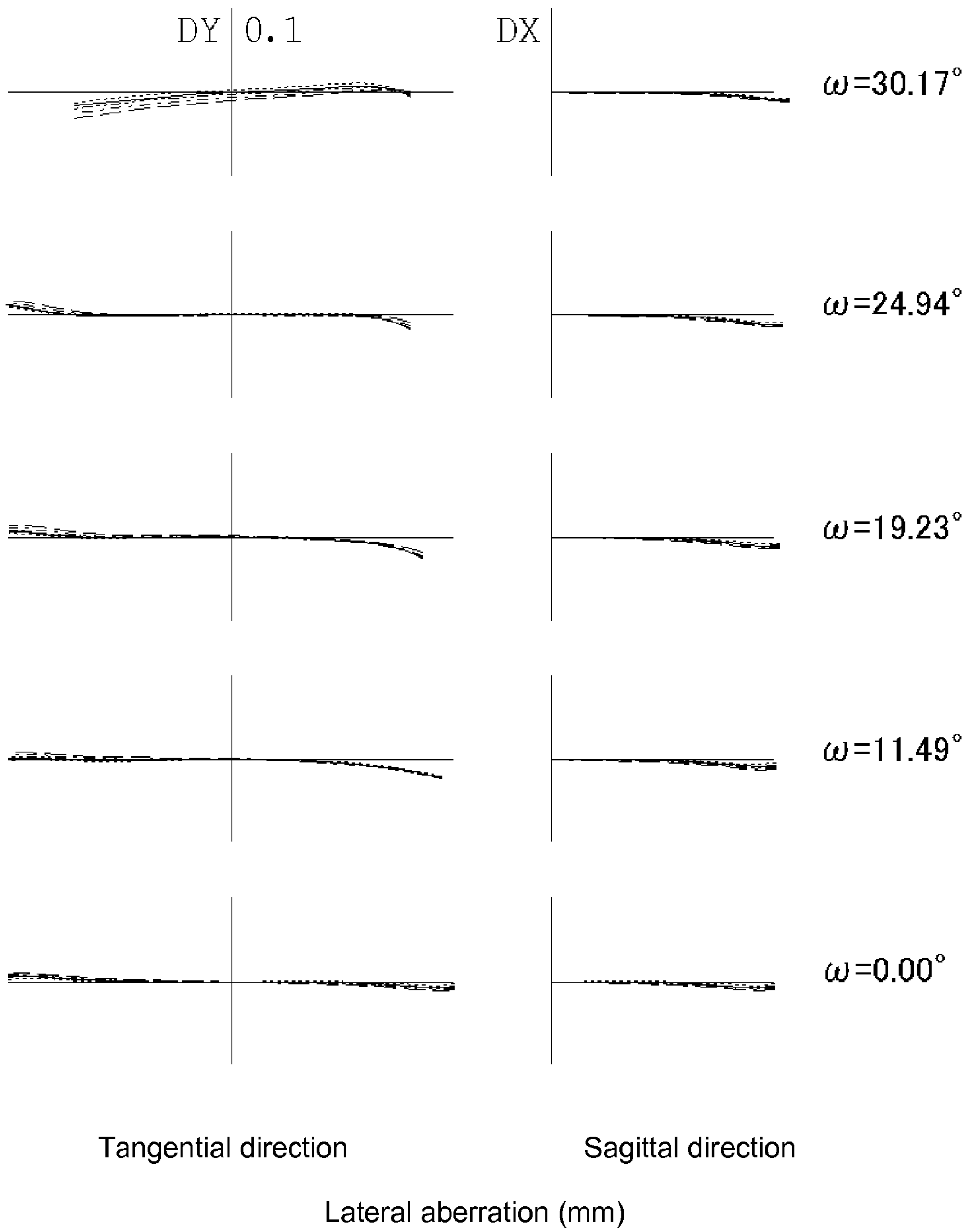
FIG. 40 is an aberration diagram showing a lateral aberration of the zoom lens shown in FIG. 11 at the wide-angle end when an object distance is 20 cm.
Figure 41:
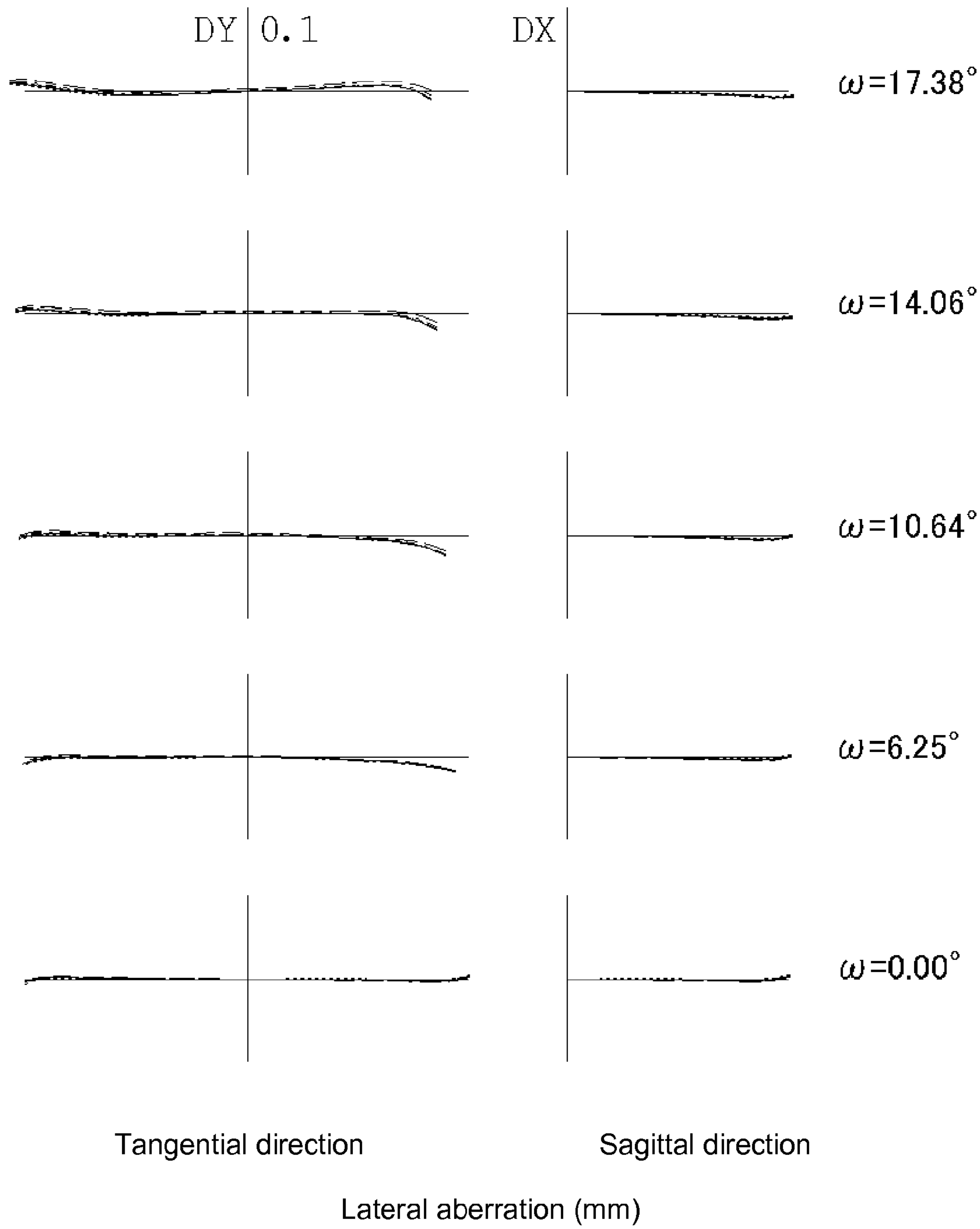
FIG. 41 is an aberration diagram showing a lateral aberration of the zoom lens shown in FIG. 11 at the midpoint when the object distance is 20 cm.
Figure 42:
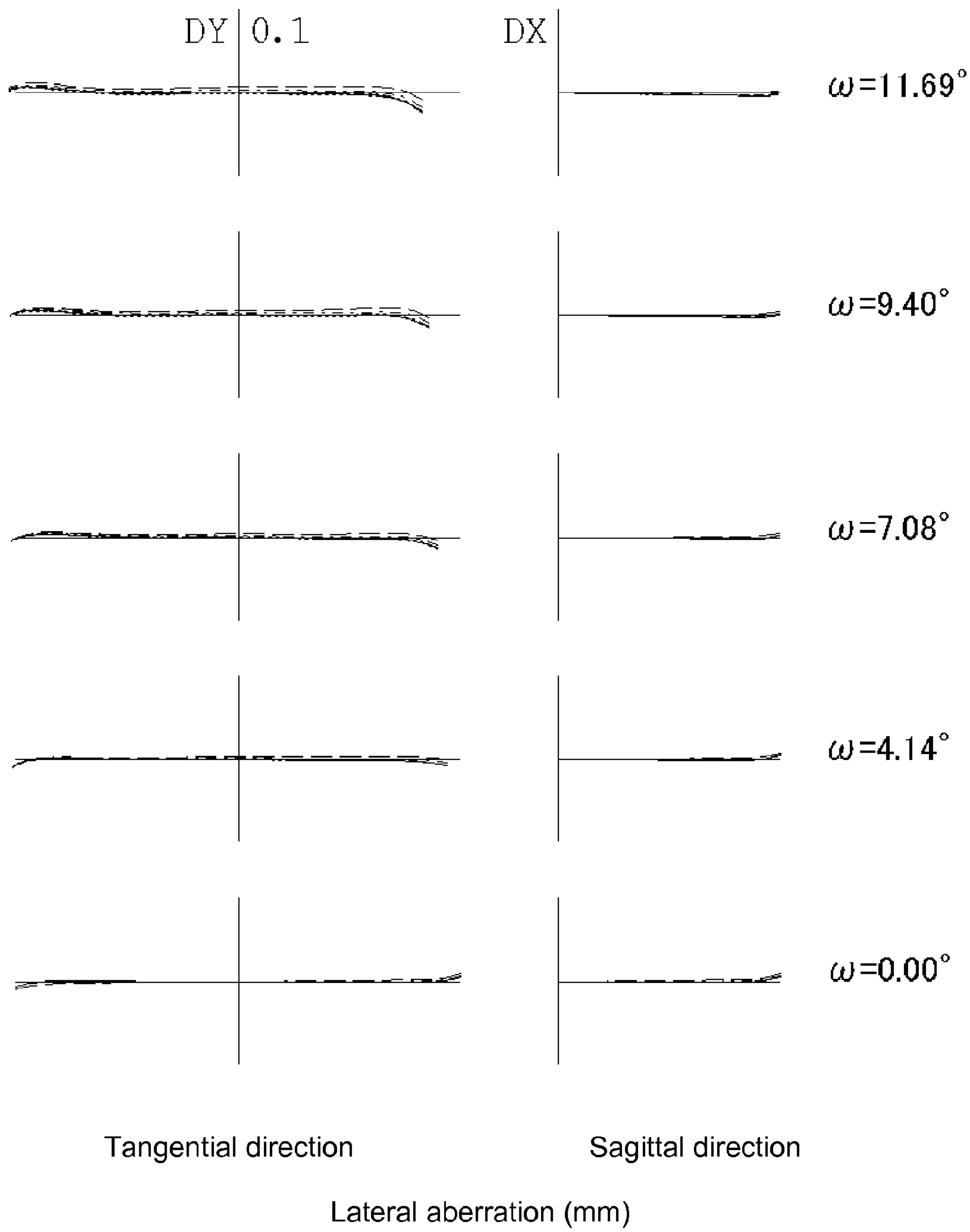
FIG. 42 is an aberration diagram showing a lateral aberration of the zoom lens shown in FIG. 11 at the telephoto end when the object distance is 20 cm.
Figure 43:
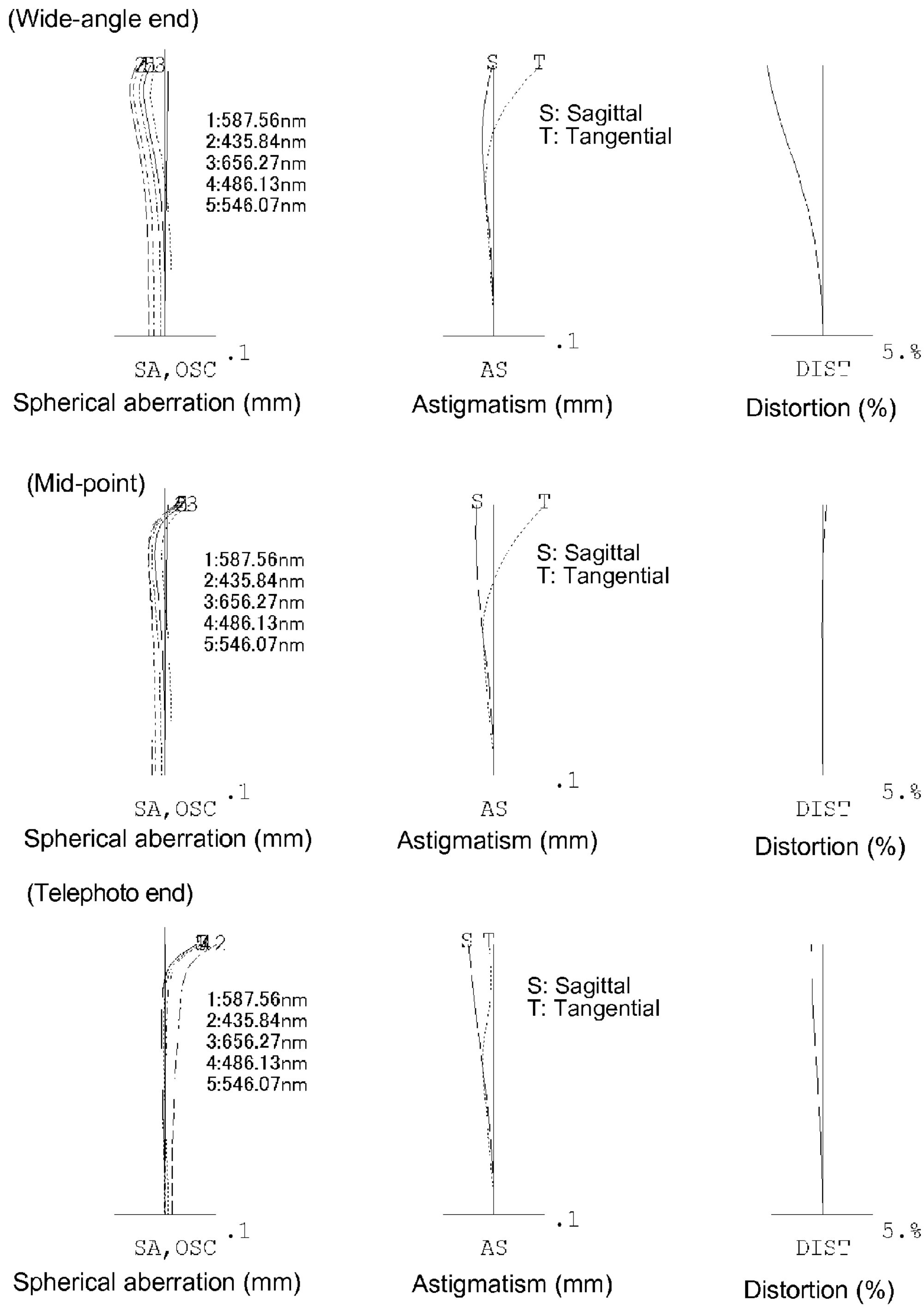
FIG. 43 is an aberration diagram showing a spherical aberration, an astigmatism, and a distortion of the zoom lens shown in FIG. 11 when the object distance is 20 cm.
Figure 44:
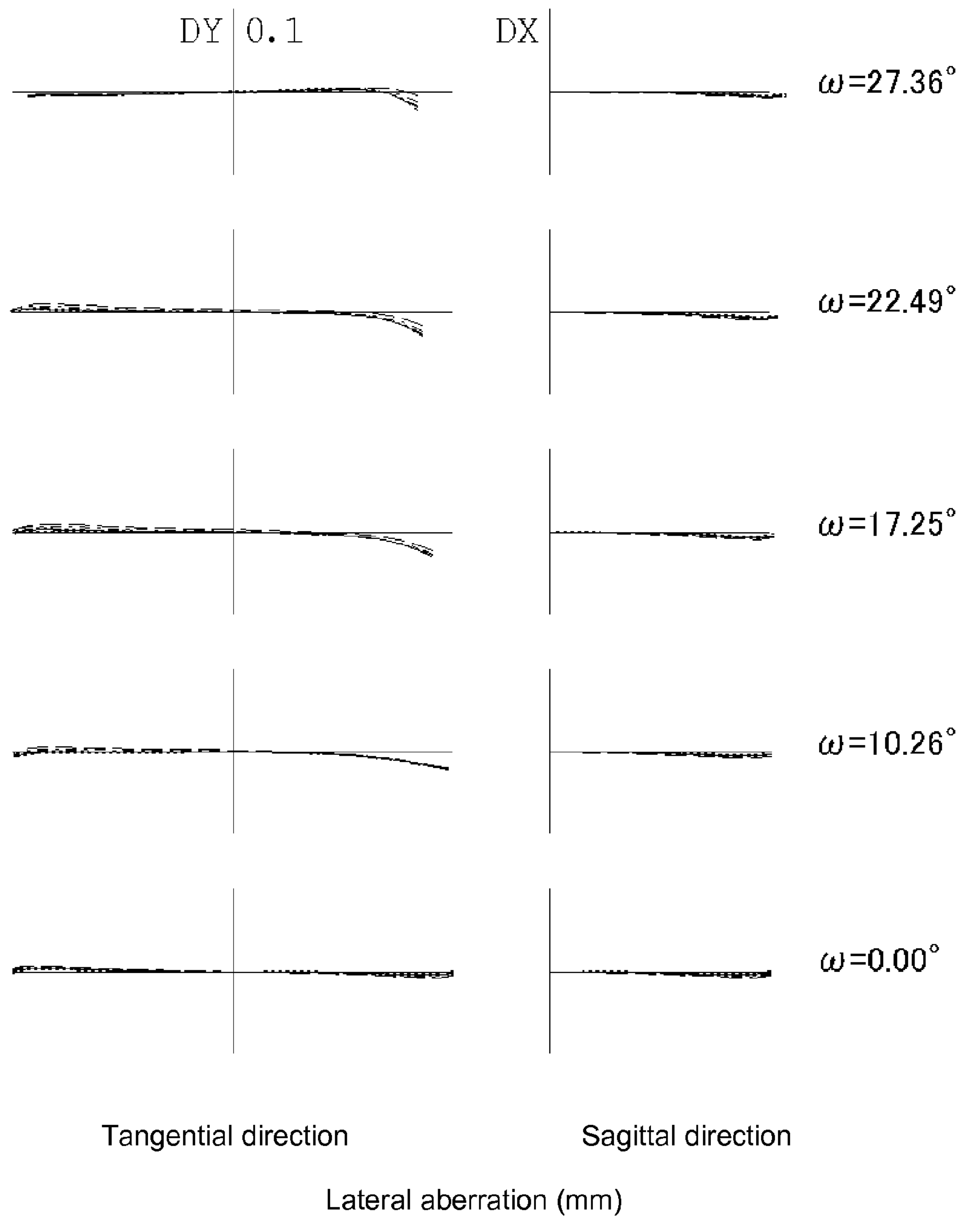
FIG. 44 is an aberration diagram showing a lateral aberration of the zoom lens shown in FIG. 16 at the wide-angle end when an object distance is 20 cm.
Figure 45:
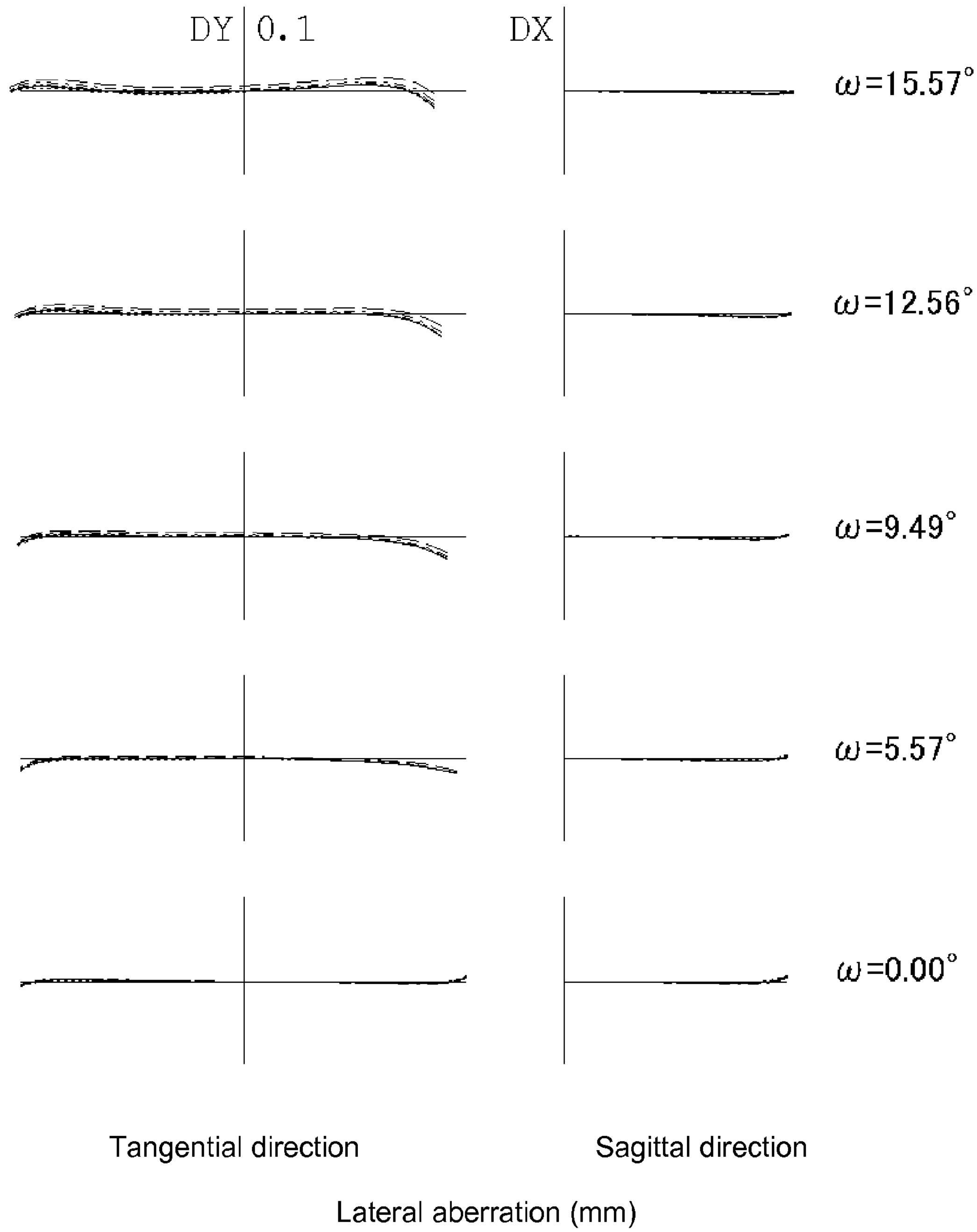
FIG. 45 is an aberration diagram showing a lateral aberration of the zoom lens shown in FIG. 16 at the midpoint when the object distance is 20 cm.
Figure 46:
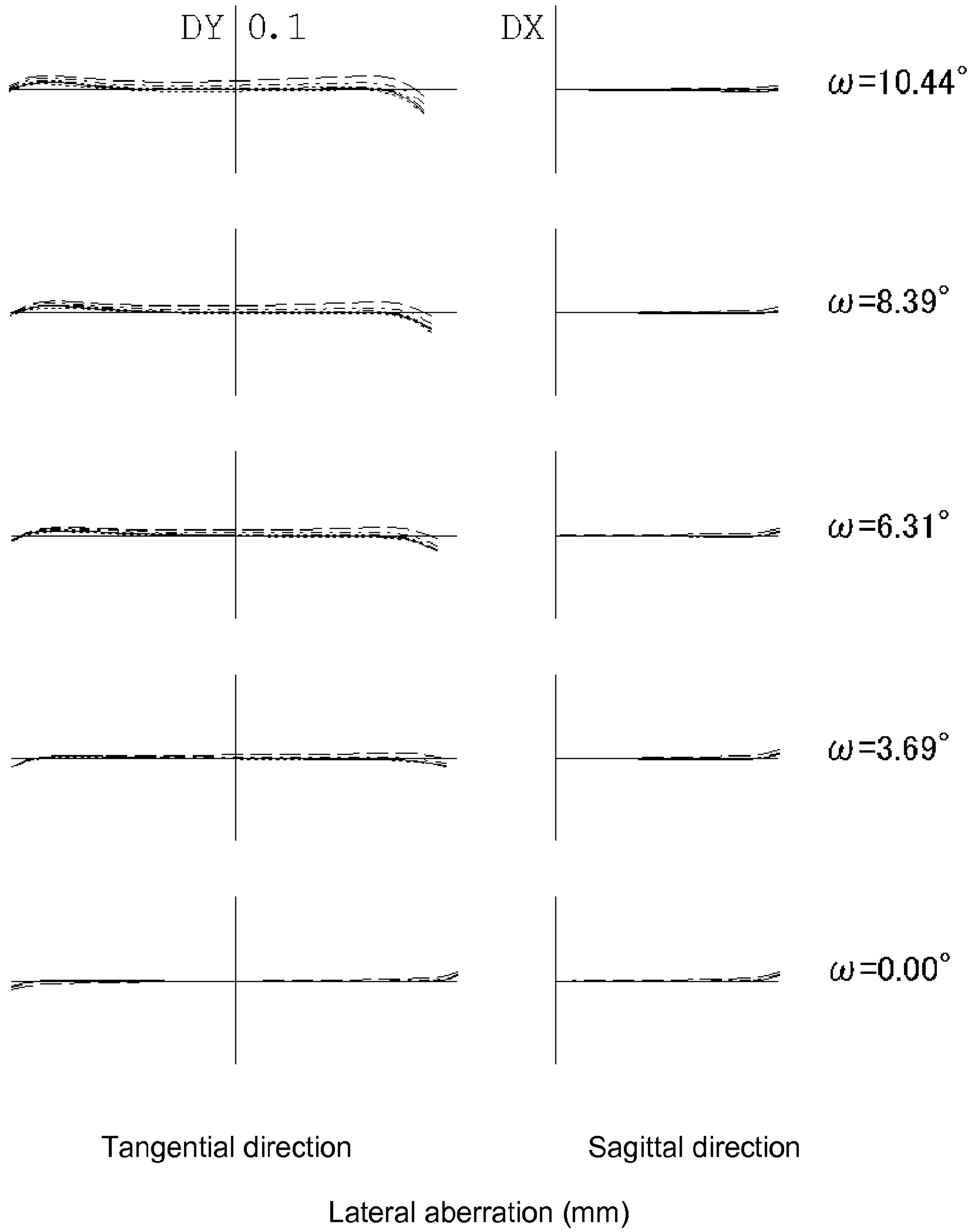
FIG. 46 is an aberration diagram showing a lateral aberration of the zoom lens shown in FIG. 16 at the telephoto end when the object distance is 20 cm.
Figure 47:
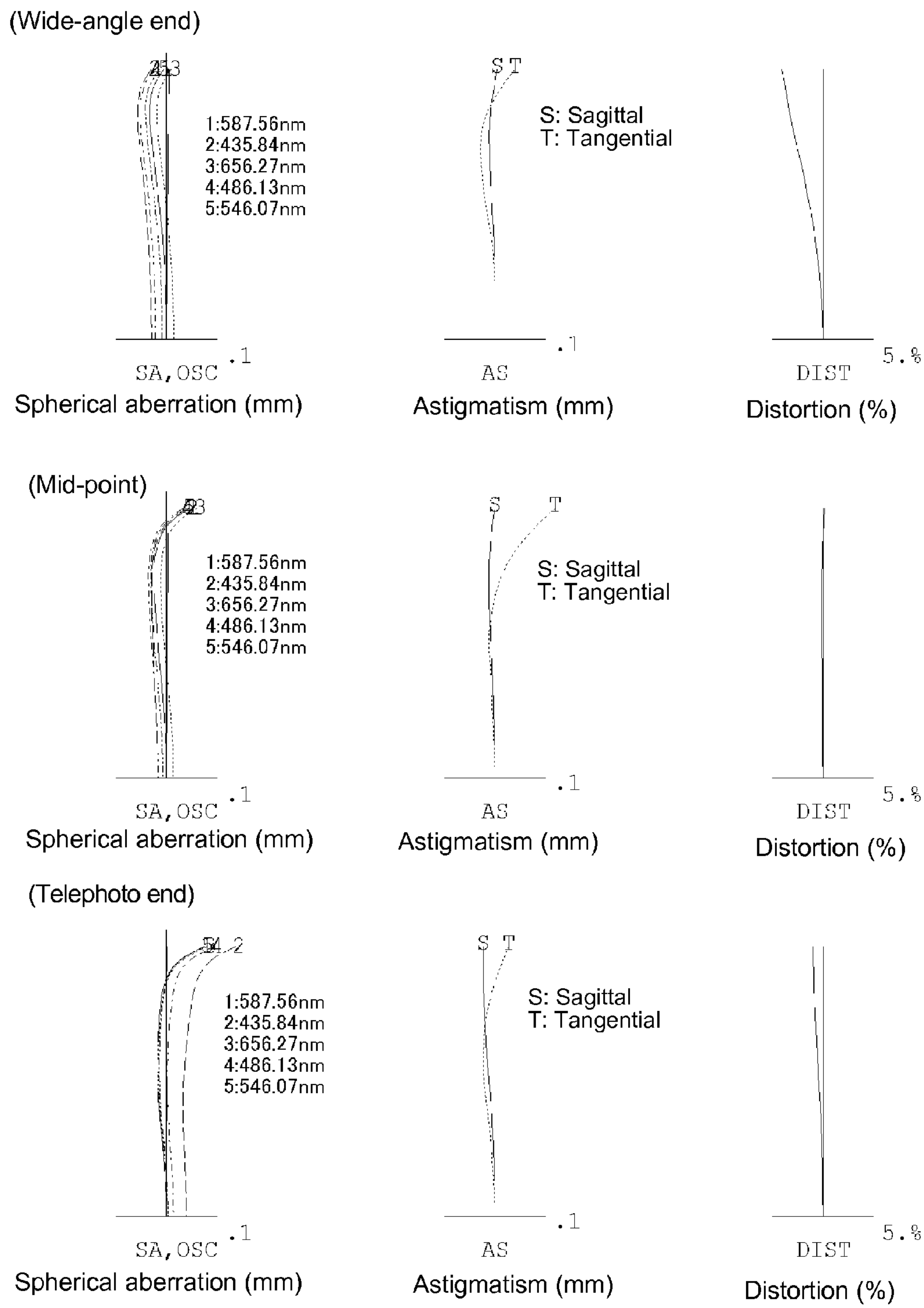
FIG. 47 is an aberration diagram showing a spherical aberration, an astigmatism, and a distortion of the zoom lens shown in FIG. 16 when the object distance is 20 cm.
Figure 48:
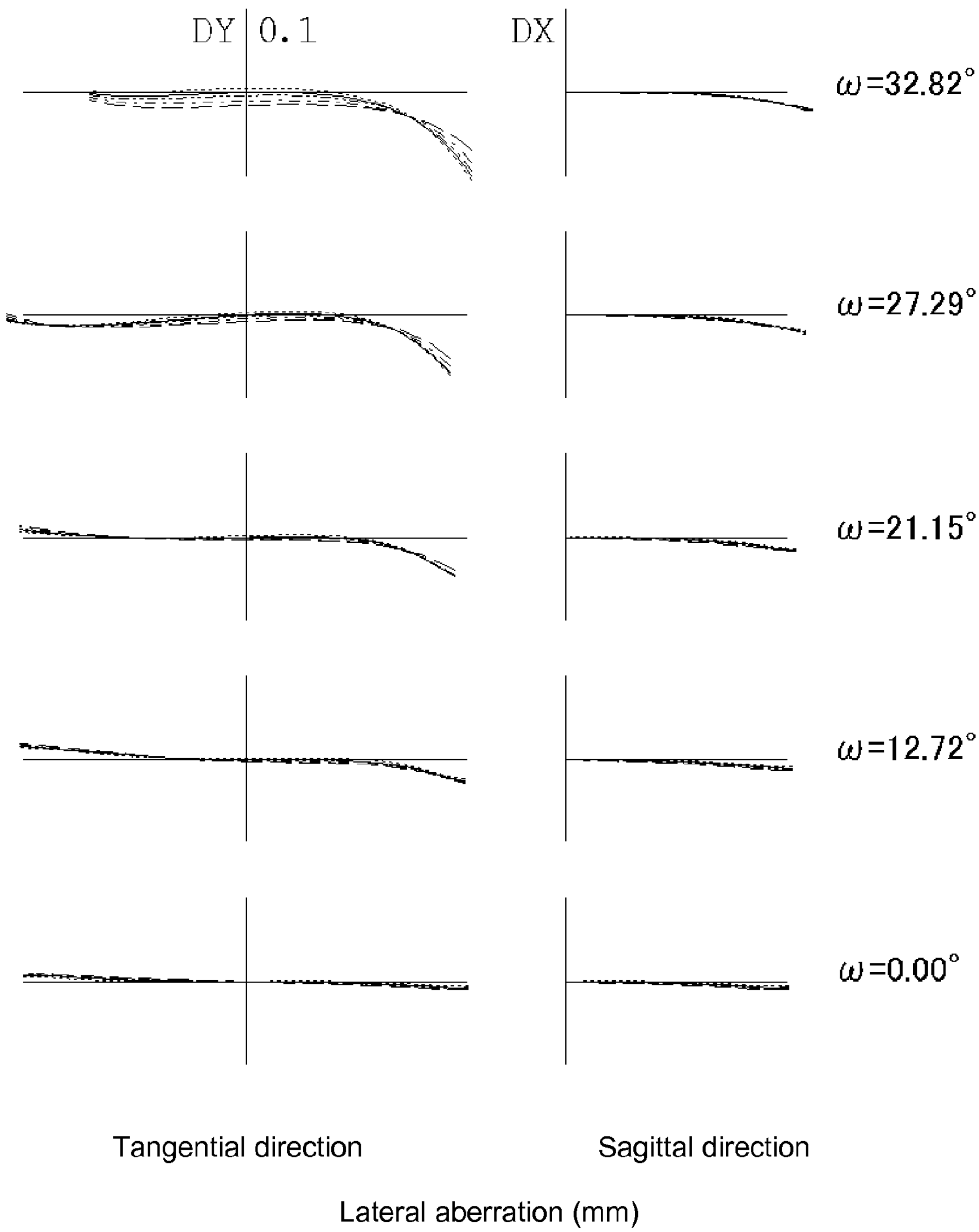
FIG. 48 is an aberration diagram showing a lateral aberration of the zoom lens shown in FIG. 21 at the wide-angle end when an object distance is 20 cm.
Figure 49:
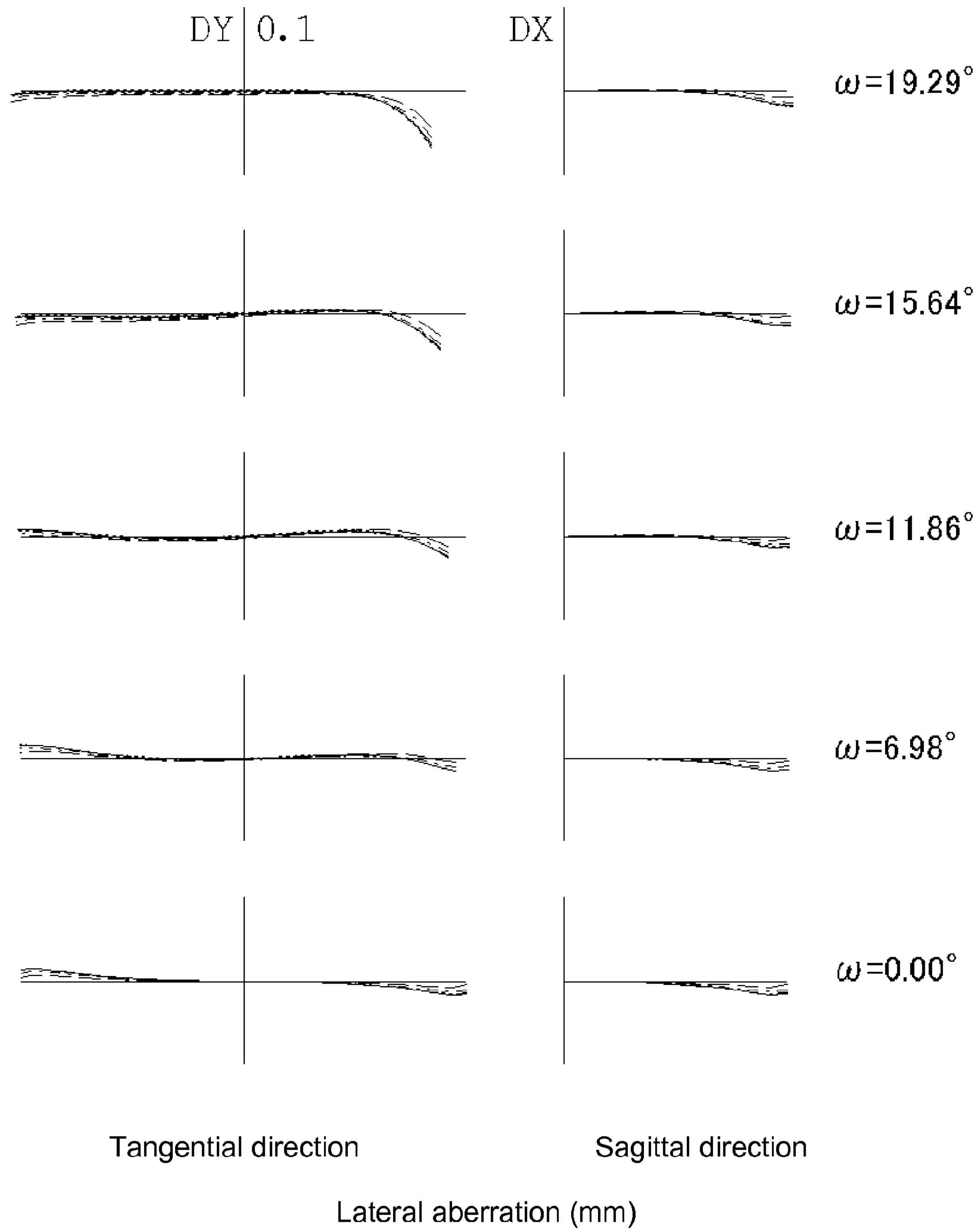
FIG. 49 is an aberration diagram showing a lateral aberration of the zoom lens shown in FIG. 21 at the midpoint when the object distance is 20 cm.
Figure 50:
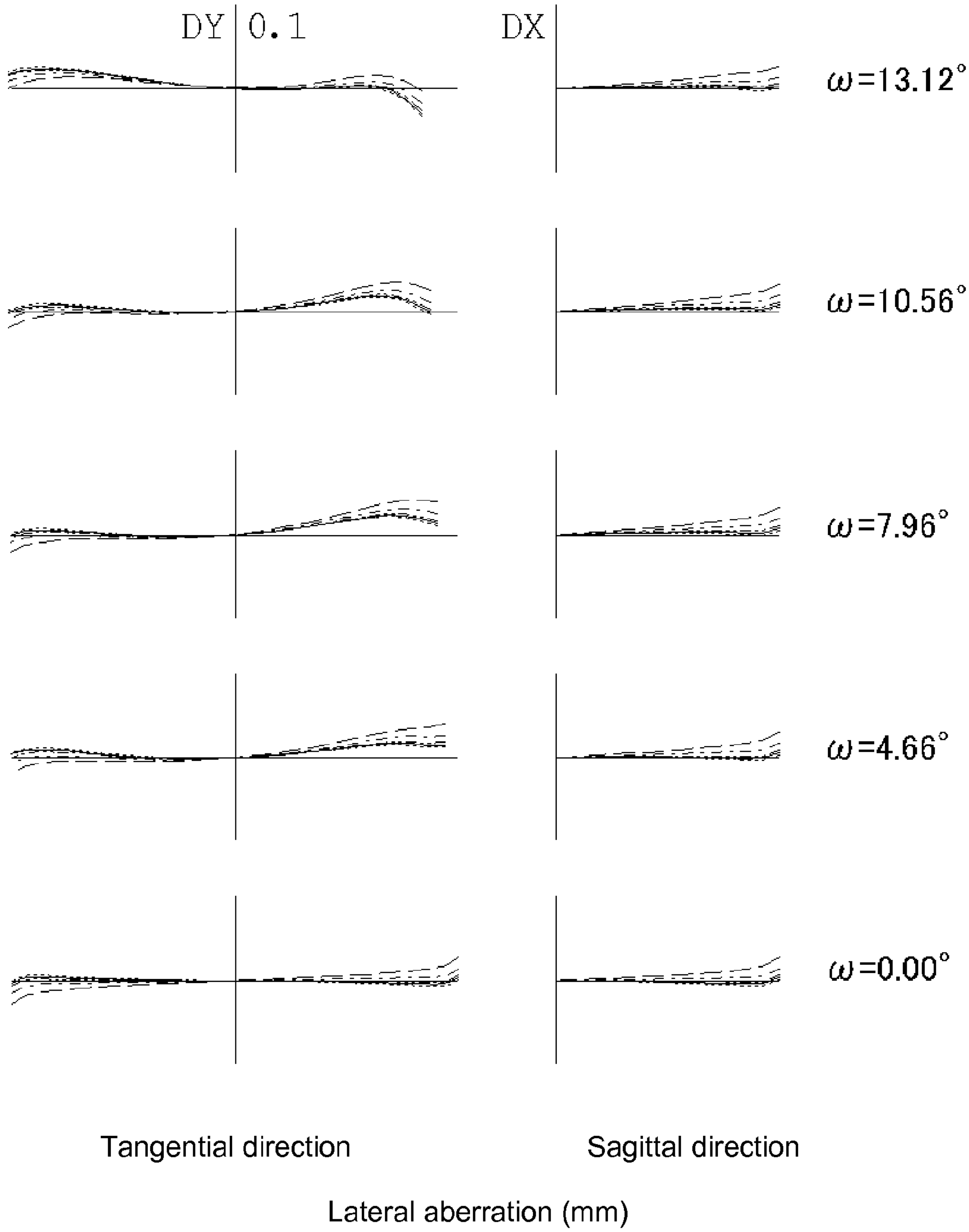
FIG. 50 is an aberration diagram showing a lateral aberration of the zoom lens shown in FIG. 21 at the telephoto end when the object distance is 20 cm.
Figure 51:
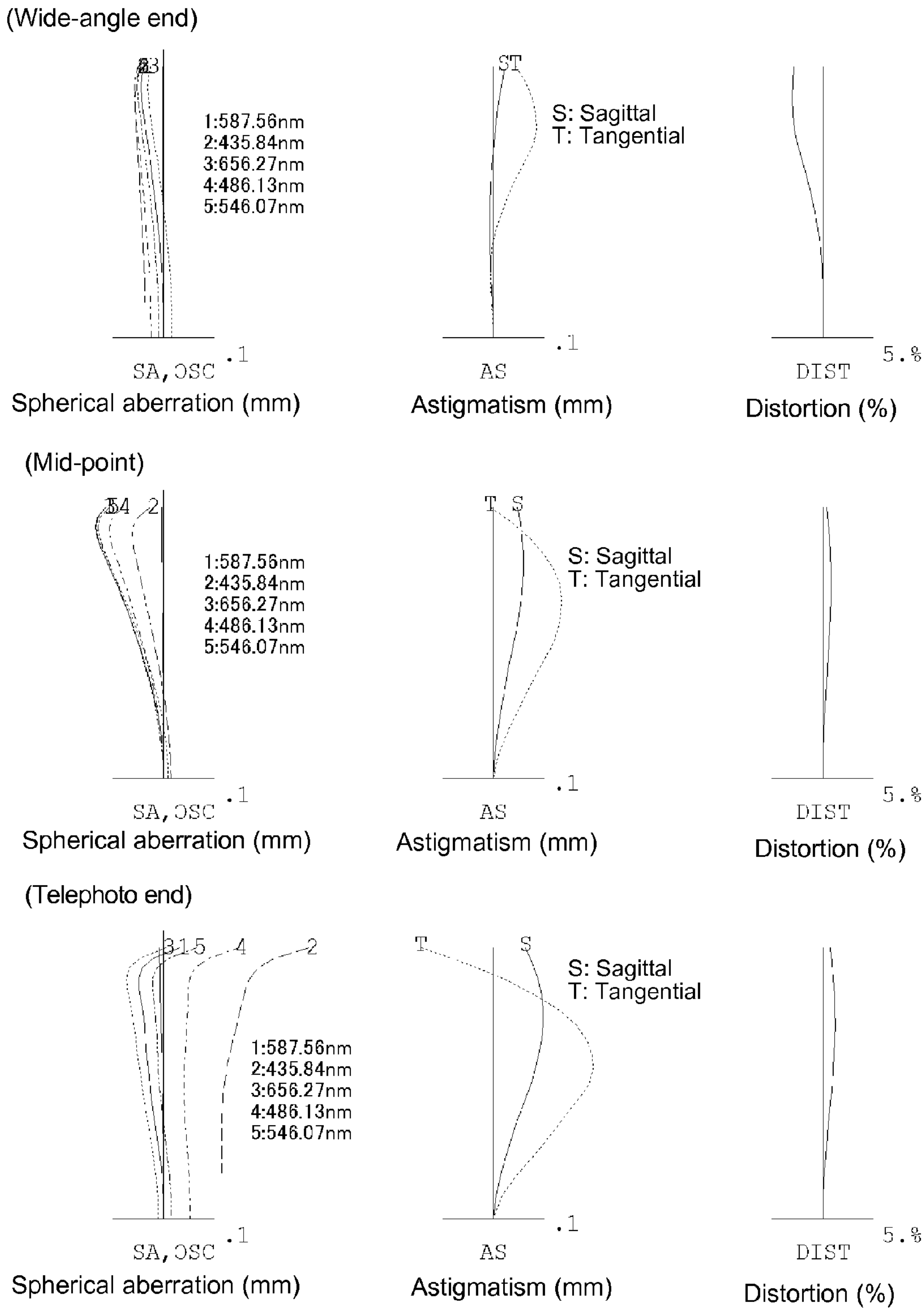
FIG. 51 is an aberration diagram showing a spherical aberration, an astigmatism, and a distortion of the zoom lens shown in FIG. 21 when the object distance is 20 cm.
Figure 52:
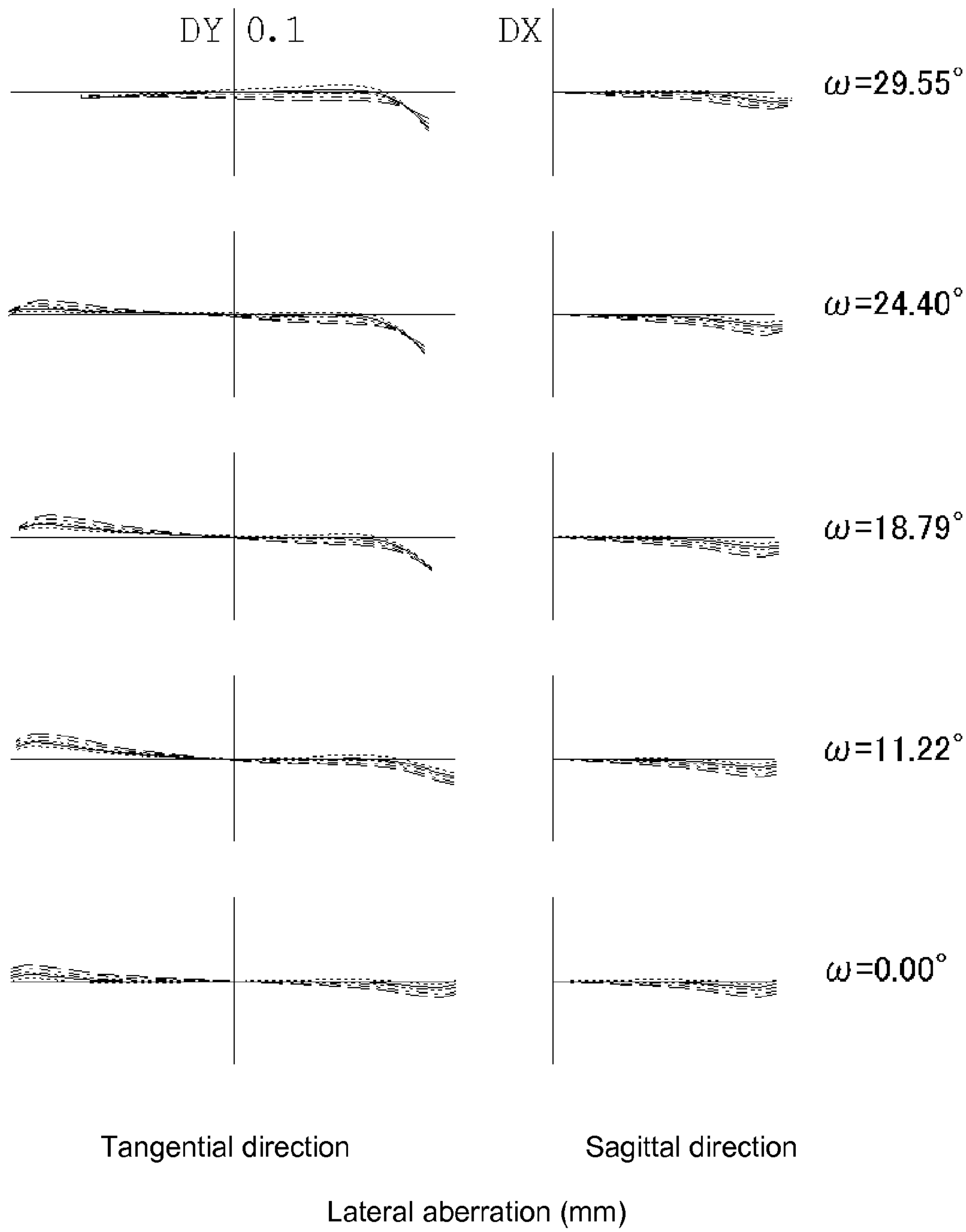
FIG. 52 is an aberration diagram showing a lateral aberration of the zoom lens of FIG. 26 at the wide-angle end when an object distance is 20 cm.
Figure 53:
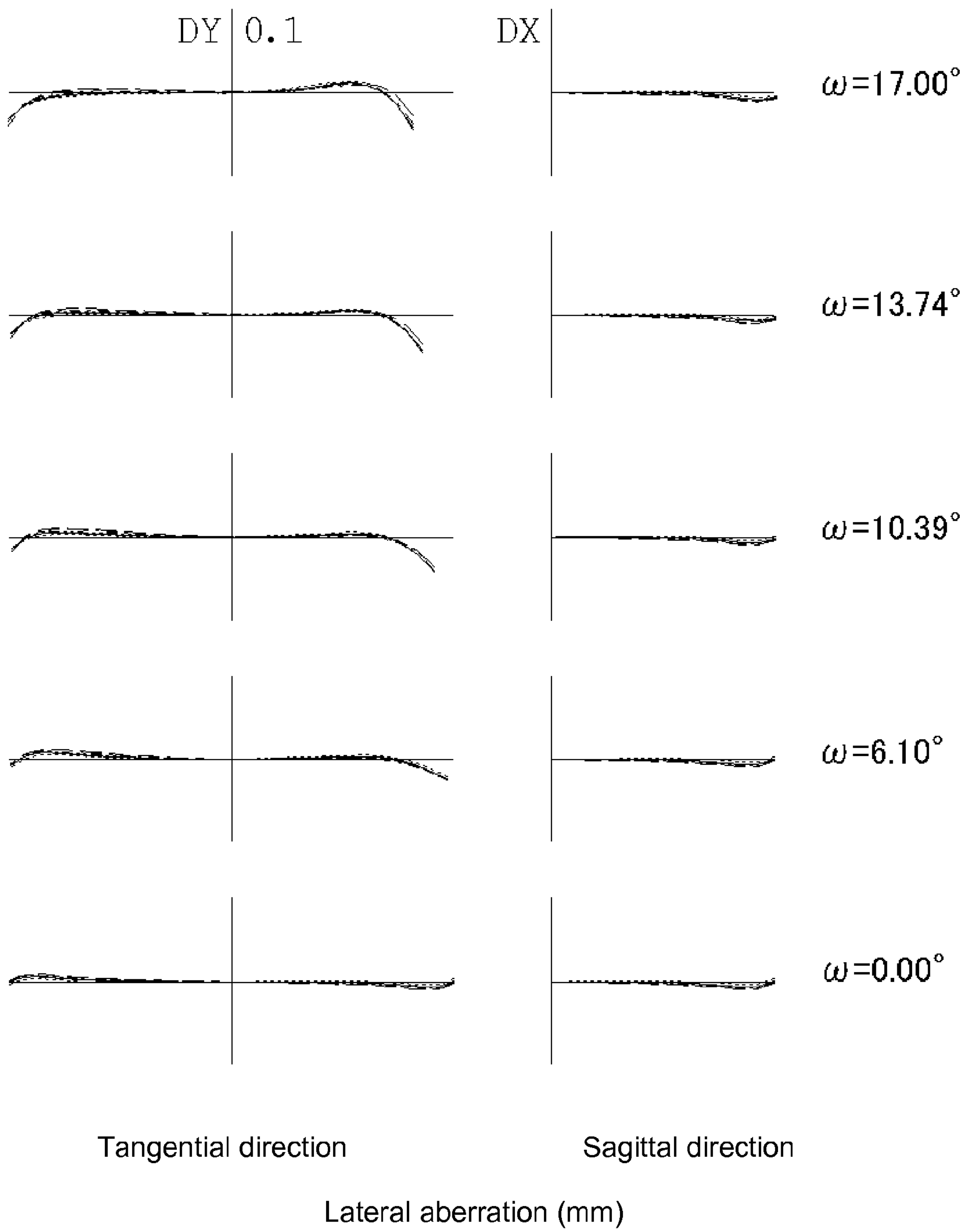
FIG. 53 is an aberration diagram showing a lateral aberration of the zoom lens shown in FIG. 26 at the midpoint when the object distance is 20 cm.
Figure 54:
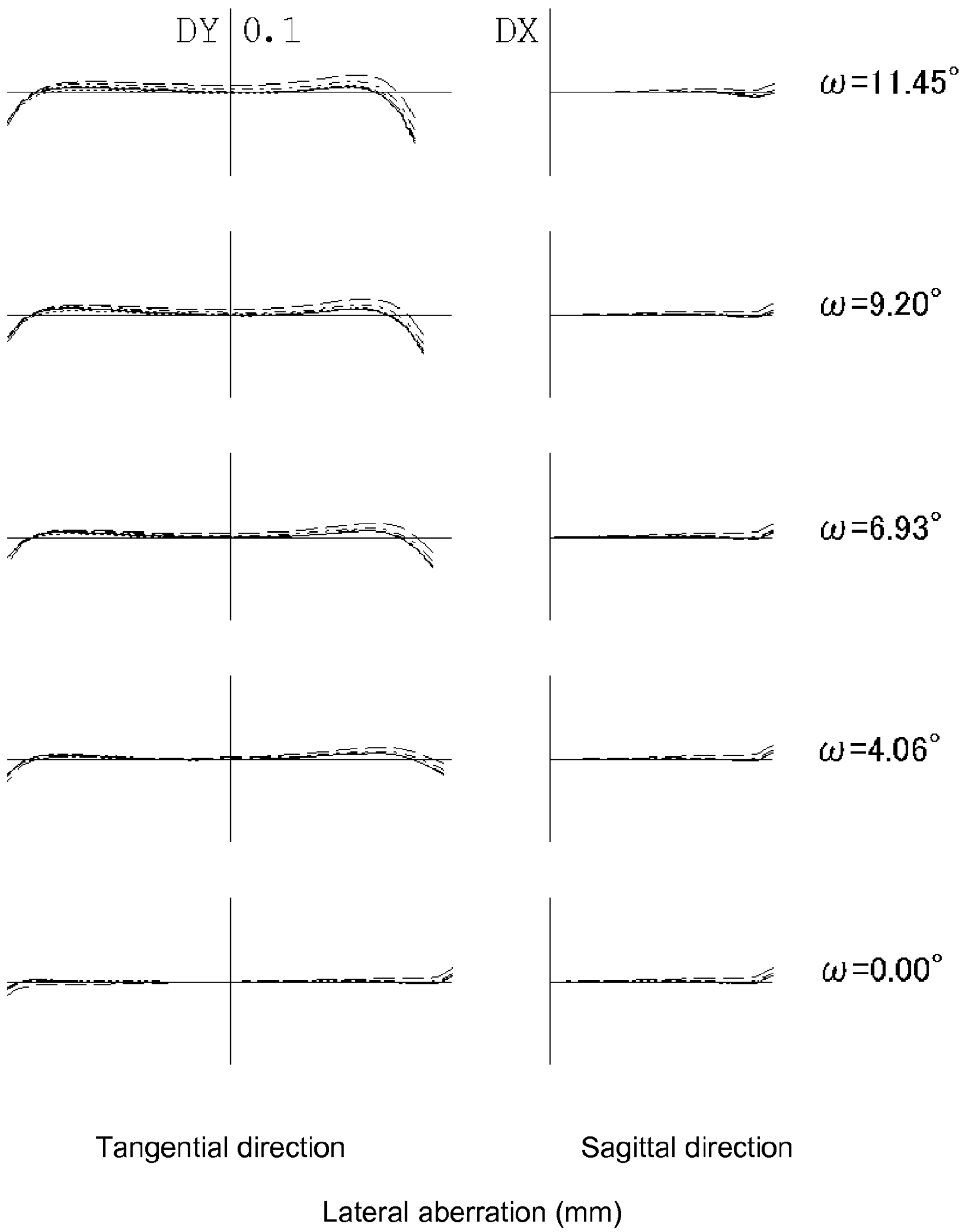
FIG. 54 is an aberration diagram showing a lateral aberration of the zoom lens shown in FIG. 26 at the telephoto end when the object distance is 20 cm.
Figure 55:
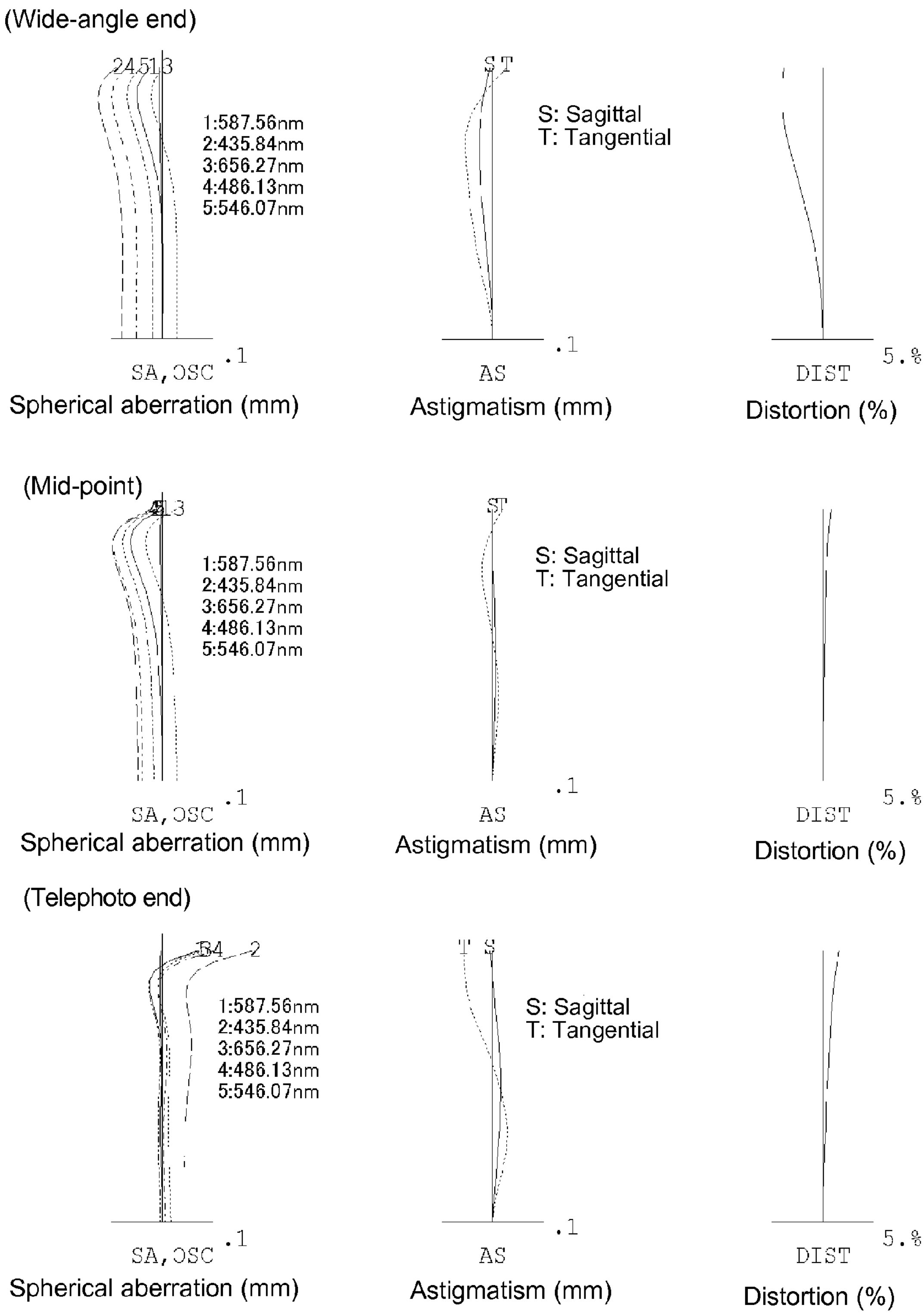
FIG. 55 is an aberration diagram showing a spherical aberration, an astigmatism, and a distortion of the zoom lens shown in FIG. 26 when the object distance is 20 cm.

The zoom lenses of the first to the third embodiments are configured so that the focusing and back focus adjustment work by moving the second lens group G2. For this reason, as shown in FIG. 31, while the second lens group G2 moves along the track as indicated with a solid line when the object distance is infinite)(∞), it moves along the track that is shifted for a moving distance of the lens for focusing Δz to the object side, i.e. the track indicated with a broken line in the figure, when the object distance is point-blank range, e.g. when the object distance is 20 cm.

Table 1 shows a moving distance of the lens for focusing Δz, i.e. a difference between a position of the second lens group G2 on the optical axis when the object distance is infinite and a position of the second lens group G2 on the optical axis when the object distance is 20 cm.

TABLE 1

| | Position | | |
|---|---|---|---|
| | Wide-Angle End (W) | midpoint (N) | Telephoto End (T) |
| Numerical Data Example 1 | 0.3234 | 0.2955 | 0.3232 |
| Numerical Data Example 2 | 0.2290 | 0.2164 | 0.2289 |
| Numerical Data Example 3 | 0.2620 | 0.2405 | 0.2618 |
| Numerical Data Example 4 | 0.2574 | 0.2363 | 0.2573 |
| Numerical Data Example 5 | 0.3147 | 0.2877 | 0.3148 |
| Numerical Data Example 6 | 0.2491 | 0.2269 | 0.2483 |

As shown in Table 1, according to the zoom lenses of Numerical Data Examples 1 to 6, the lens moving distance for focusing Δz is substantially identical at the wide-angle end (W) and the telephoto end (T). FIGS. 32 to 55 are aberration diagrams of the zoom lenses of the respective above-described Numerical Data Examples when the object distance is 20 cm.

As shown in the aberration diagrams, according to the zoom lenses of the first to the third embodiments, there is hardly deterioration of aberrations when the object distance is infinite and point-blank range and the aberrations are satisfactorily corrected over the whole magnification change from the point-blank range to infinite.

The invention may be applicable to a zoom lens to be mounted on a device that requires satisfactory aberration correcting ability in addition to a small size thereof, for example, a device such as cellular phones or digital still cameras.

What is claimed is:

1. A zoom lens comprising:

a first lens group including a lens having negative refractive power and a light path changing member for changing a traveling direction of an incident light beam, said first lens group having negative refractive power as a whole;

a second lens group including two lenses, i.e., a lens having positive refractive power and a lens having negative refractive power, and having negative refractive power, as a whole;

a third lens group including a stop, a front group lens having positive refractive power, and a rear group lens having negative refractive power arranged in this order, and having positive refractive power as a whole; and a fourth lens group having positive or negative refractive power arranged in this order from an object side, wherein said first lens group and said fourth lens group are fixed, said second lens group moves to the object side after the second lens group moves to an image side, said third lens group linearly moves to the object side upon changing a magnification of the zoom lens from a wide-angle end to a telephoto end, and said second lens group has a focal length f2, the lens having positive refractive power in the second lens group has a focal length f2*p* so that the following conditional expression is satisfied:

$$-1.0<f2/f2p<-0.1$$

said front group lens having positive refractive power in the third lens group has a focal length f3 and said rear group lens having negative refractive power in the third lens group has a focal length f3*n* so that the following conditional expression is satisfied:

$$|f3p/f3n|<0.7.$$

2. The zoom lens according to claim 1, wherein said light path changing Member is formed of a lens having positive refractive power or negative refractive power.

3. The zoom lens according to claim 1, wherein said light path changing member is formed of a prism for reflecting an incident light beam to bend a light path thereof.

4. The zoom lens according to claim 1, wherein said third lens group includes the front group lens and the rear group lens each formed of one lens.

5. The zoom lens according to claim 1, wherein said first lens group has a focal length f1 and said third lens group has a focal length f3 so that the following conditional expression is satisfied:

$$-0.5<f3/f1<-0.1.$$

6. The zoom lens according to claim 1, wherein said third lens group has a focal length f3, and said first lens group to said fourth lens group have a composite focal length fw at the wide-angle end so that the following conditional expression is satisfied:

$$1.0<f3/fw<2.0.$$

7. The zoom lens according to claim 1, wherein said third lens group has a focal length f3, and said first lens group to said fourth lens group have a composite focal length fw at the wide-angle end so that the following conditional expression is satisfied:

$$1.357\leq f3/fw<2.0.$$

8. The zoom lens according to claim 1, wherein said front group lens having positive refractive power in the third lens group has a focal length f3*p* and said rear group lens having negative refractive power in the third lens group has a focal length f3*n* so that the following conditional expression is satisfied:

$$|f3p/f3n|<0.519.$$

* * * * *